INVENTORS
J.H. AUER JR. AND
H.C. KENDALL

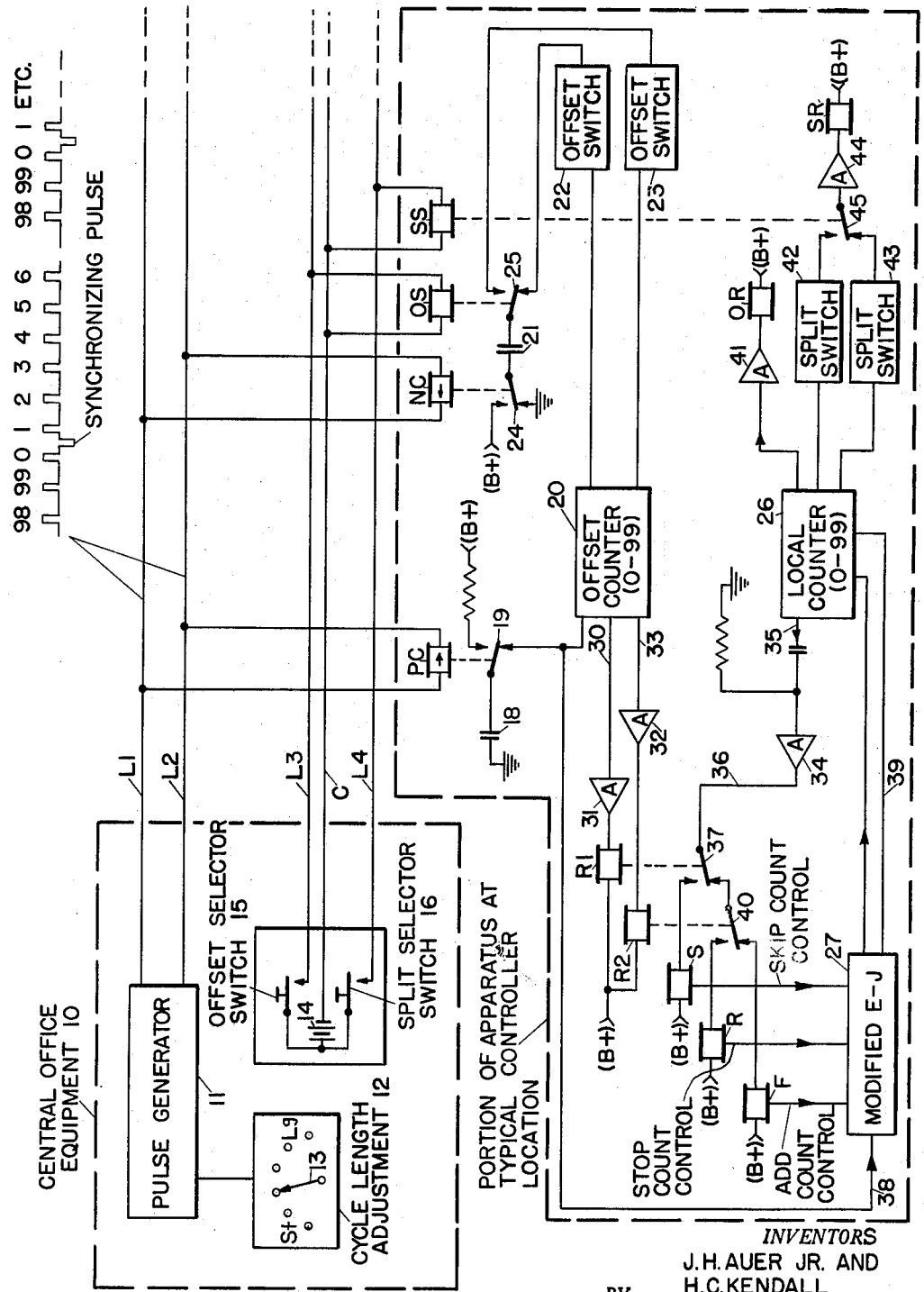

THEIR ATTORNEY

May 17, 1966 J. H. AUER, JR., ET AL 3,252,133
CONTROL SYSTEM FOR VEHICLE TRAFFIC SIGNALS
Filed Nov. 23, 1962 18 Sheets-Sheet 3

INVENTORS
J.H. AUER JR. AND
H.C. KENDALL
BY
THEIR ATTORNEY

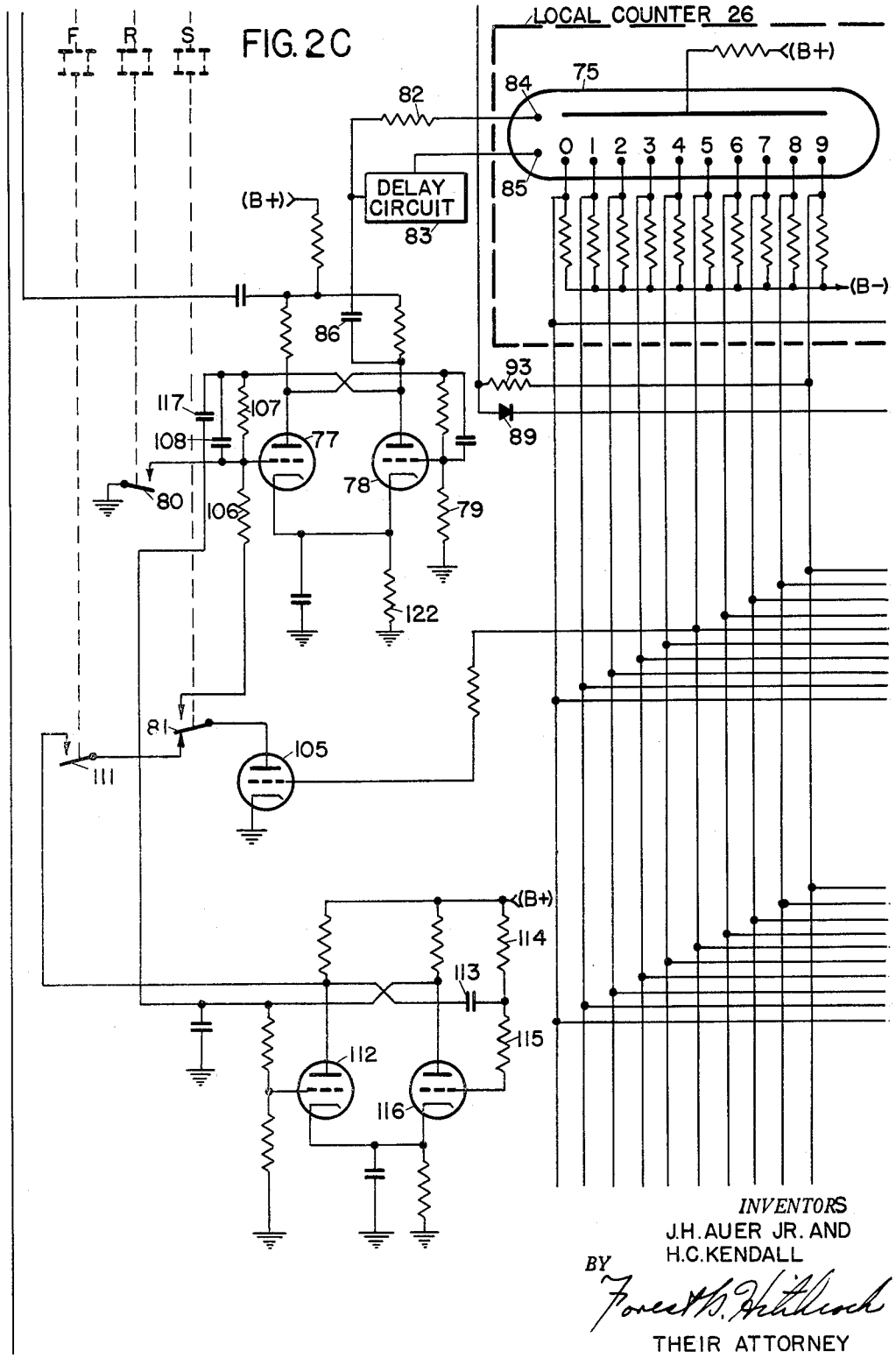

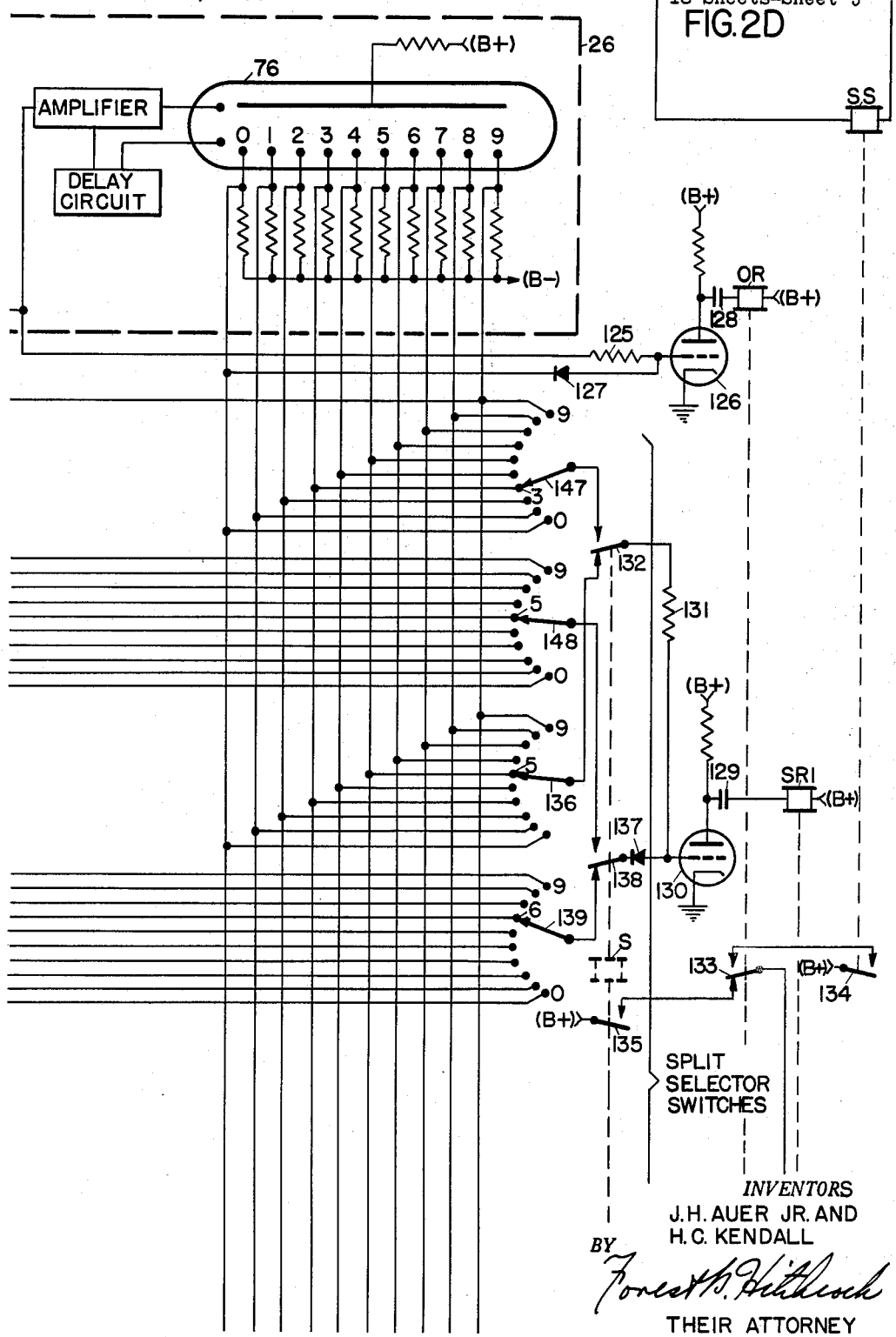

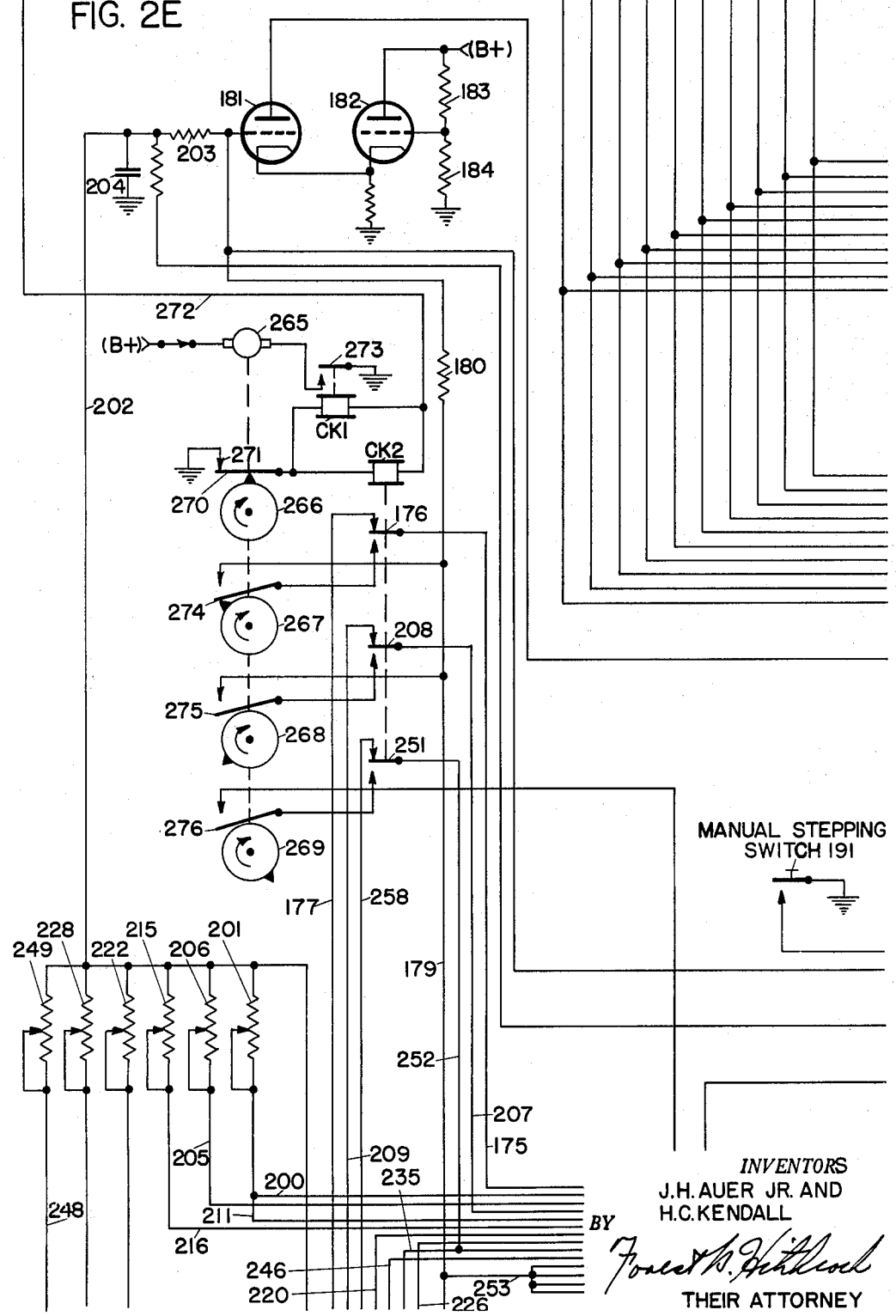

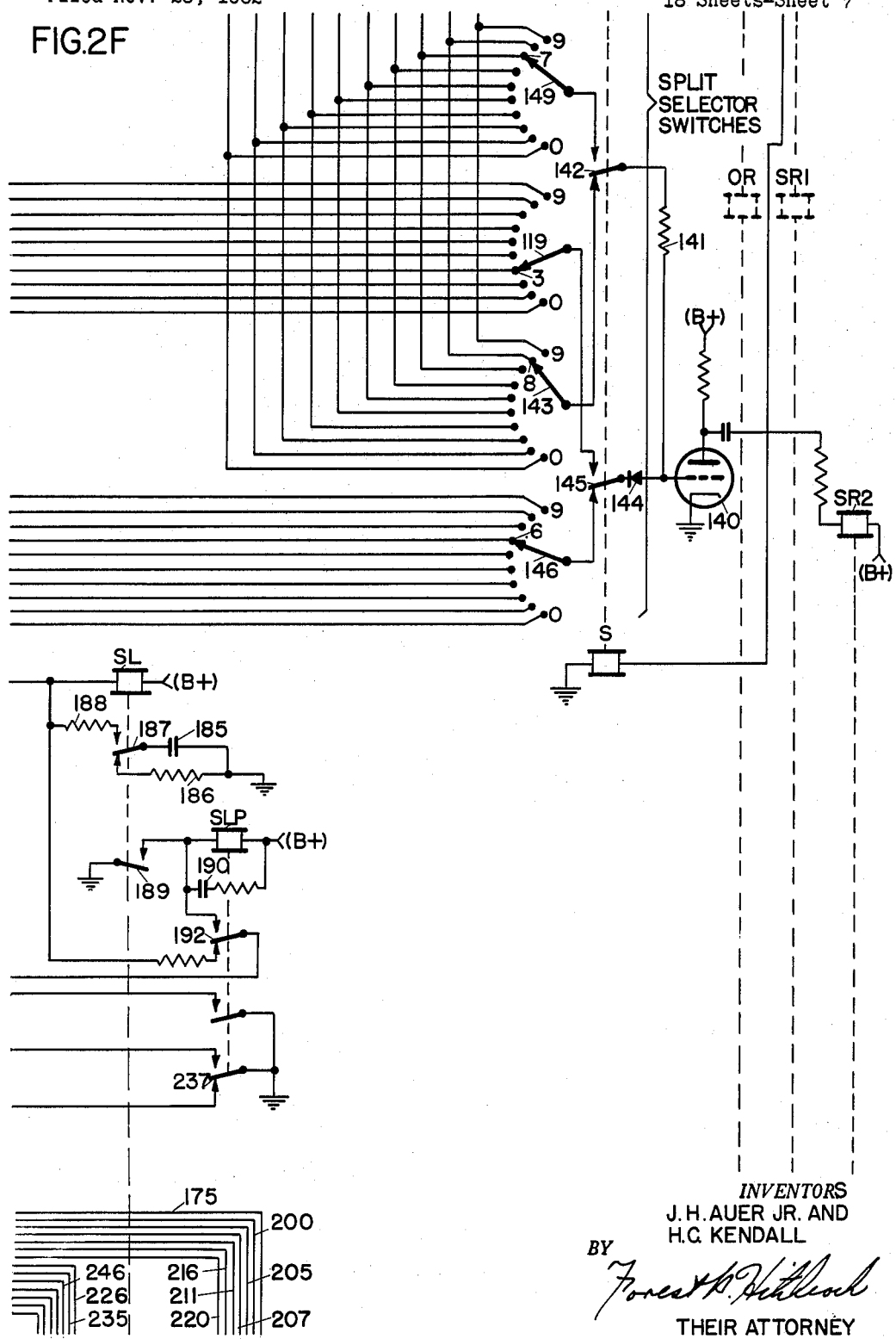

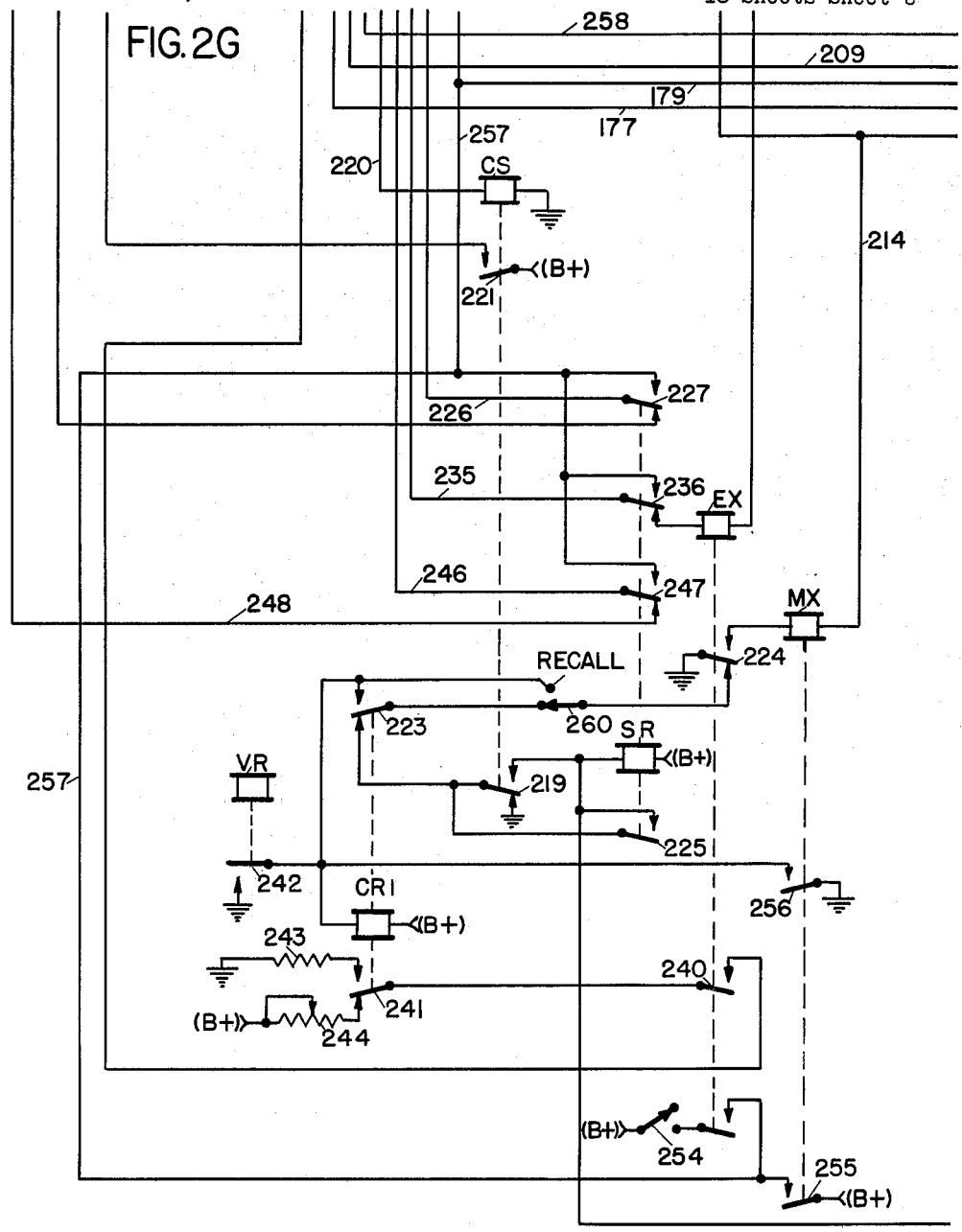

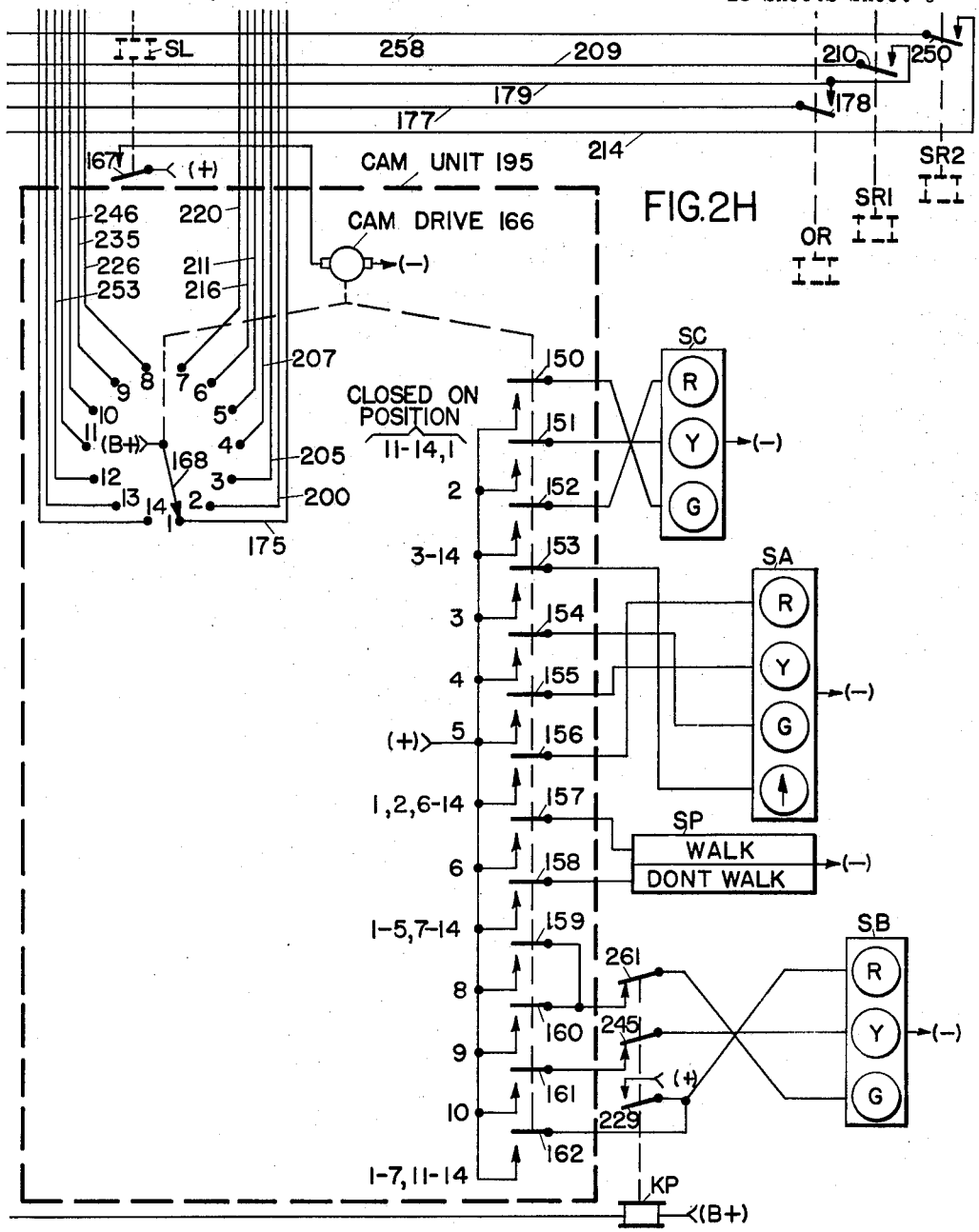

May 17, 1966    J. H. AUER, JR., ET AL    3,252,133
CONTROL SYSTEM FOR VEHICLE TRAFFIC SIGNALS
Filed Nov. 23, 1962    18 Sheets-Sheet 10

FIG. 3A

A. LINE PULSES 

B. OFFSET COUNTER TRIGGERS 

C. OFFSET COUNTER

| 18 | 19 | 20 | 21 | 22 | 23 | 24 | 25 |

D. MODIFIED E-J 

E. LOCAL COUNTER TRIGGERS 

F. LOCAL COUNTER

| 33 | 34 | 35 | 36 | 37 | 38 | 39 |

G. UNITS COUNTER NO.5 STAGE 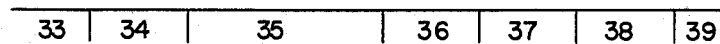

FIG. 3B

A. LINE PULSES 

B. OFFSET COUNTER TRIGGERS 

C. OFFSET COUNTER

| 65 | 66 | 67 | 68 | 69 | 70 | 71 | 72 |

D. MODIFIED E-J 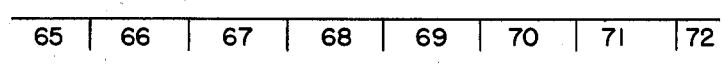

E. LOCAL COUNTER TRIGGERS 

F. LOCAL COUNTER

| 53 | 54 | 55 | 56 | 57 | 58 | 59 | 60 | 61 |

G. UNITS COUNTER NO.5 STAGE 

H. FLIP-FLOP 

FIG. 3C

A. LINE PULSES 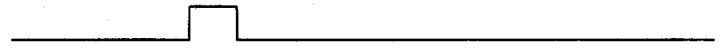

B. OFFSET COUNTER TRIGGERS 

C. OFFSET COUNTER

| 95 | 96 | 97 | 98 | 99 | 00 | 01 | 02 |

D. MODIFIED E-J 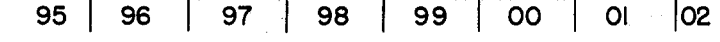

E. LOCAL COUNTER TRIGGERS 

F. LOCAL COUNTER

| 97 | 98 | 99 | 00 | 01 | 02 |

G. RELAY R 

May 17, 1966    J. H. AUER, JR., ET AL    3,252,133
CONTROL SYSTEM FOR VEHICLE TRAFFIC SIGNALS
Filed Nov. 23, 1962    18 Sheets-Sheet 11

INVENTORS
J.H. AUER JR. AND
H.C. KENDALL
BY
THEIR ATTORNEY

May 17, 1966   J. H. AUER, JR., ET AL   3,252,133
CONTROL SYSTEM FOR VEHICLE TRAFFIC SIGNALS
Filed Nov. 23, 1962   18 Sheets-Sheet 12
FIG. 8
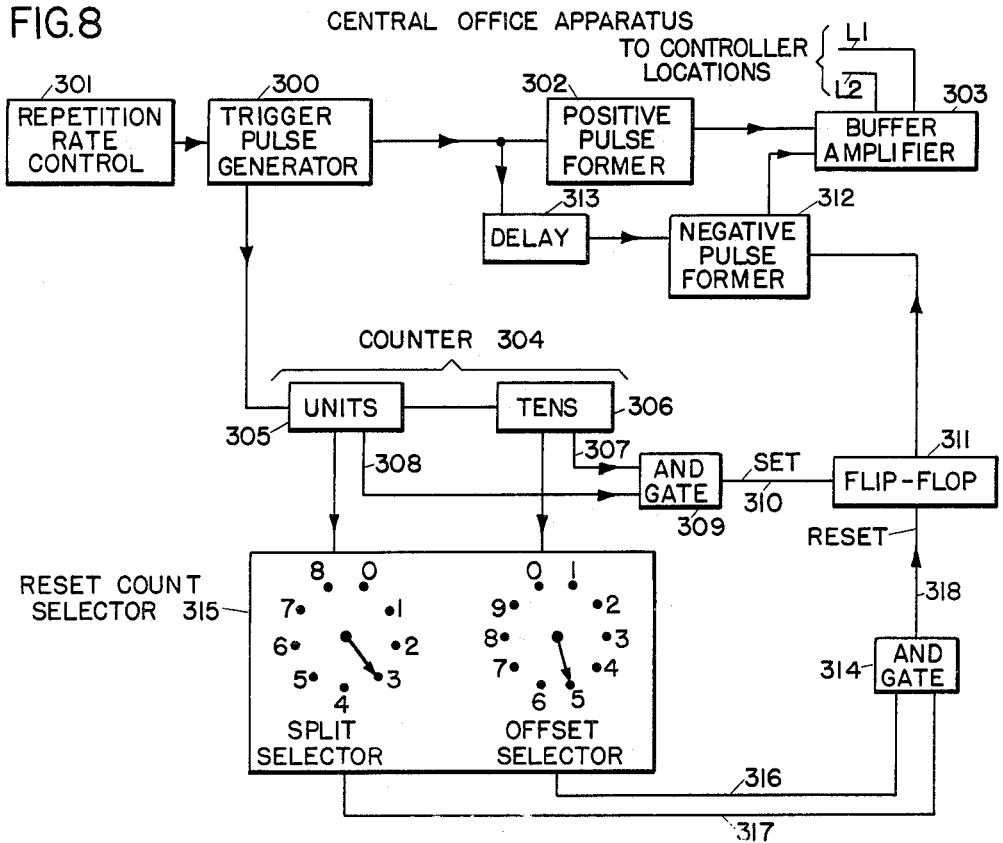
FIG. 7
| FIG. 2A | FIG. 2B |
|---------|---------|
| FIG. 2C | FIG. 2D |
| FIG. 2E | FIG. 2F |
| FIG. 2G | FIG. 2H |
FIG. 6
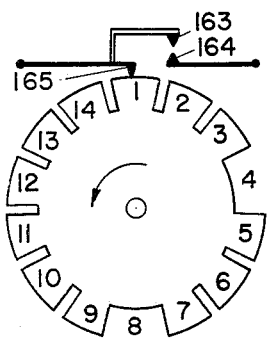
*INVENTORS*
J. H. AUER JR. AND
H. C. KENDALL
BY
*Forest B. Hitchcock*
THEIR ATTORNEY

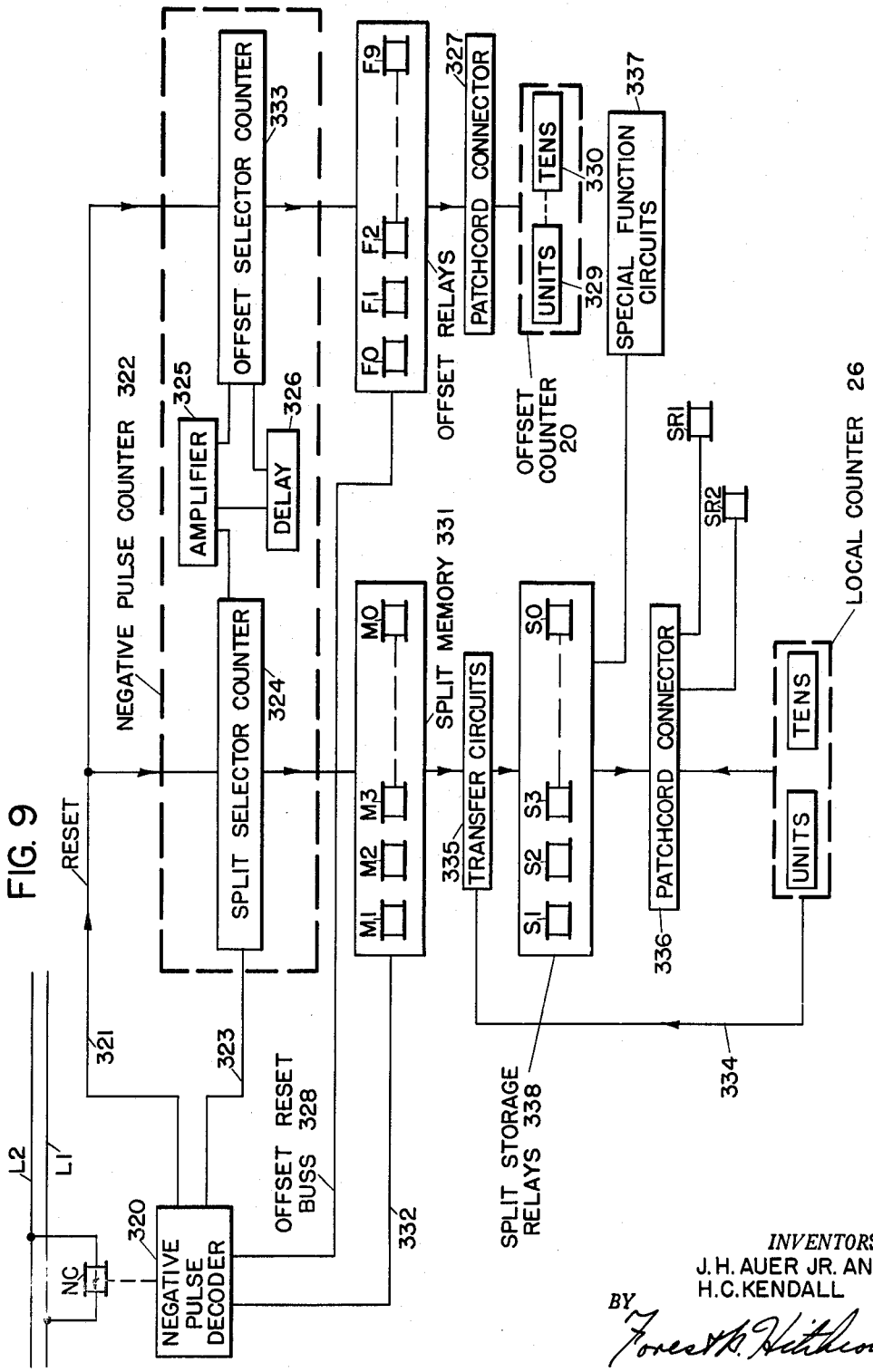

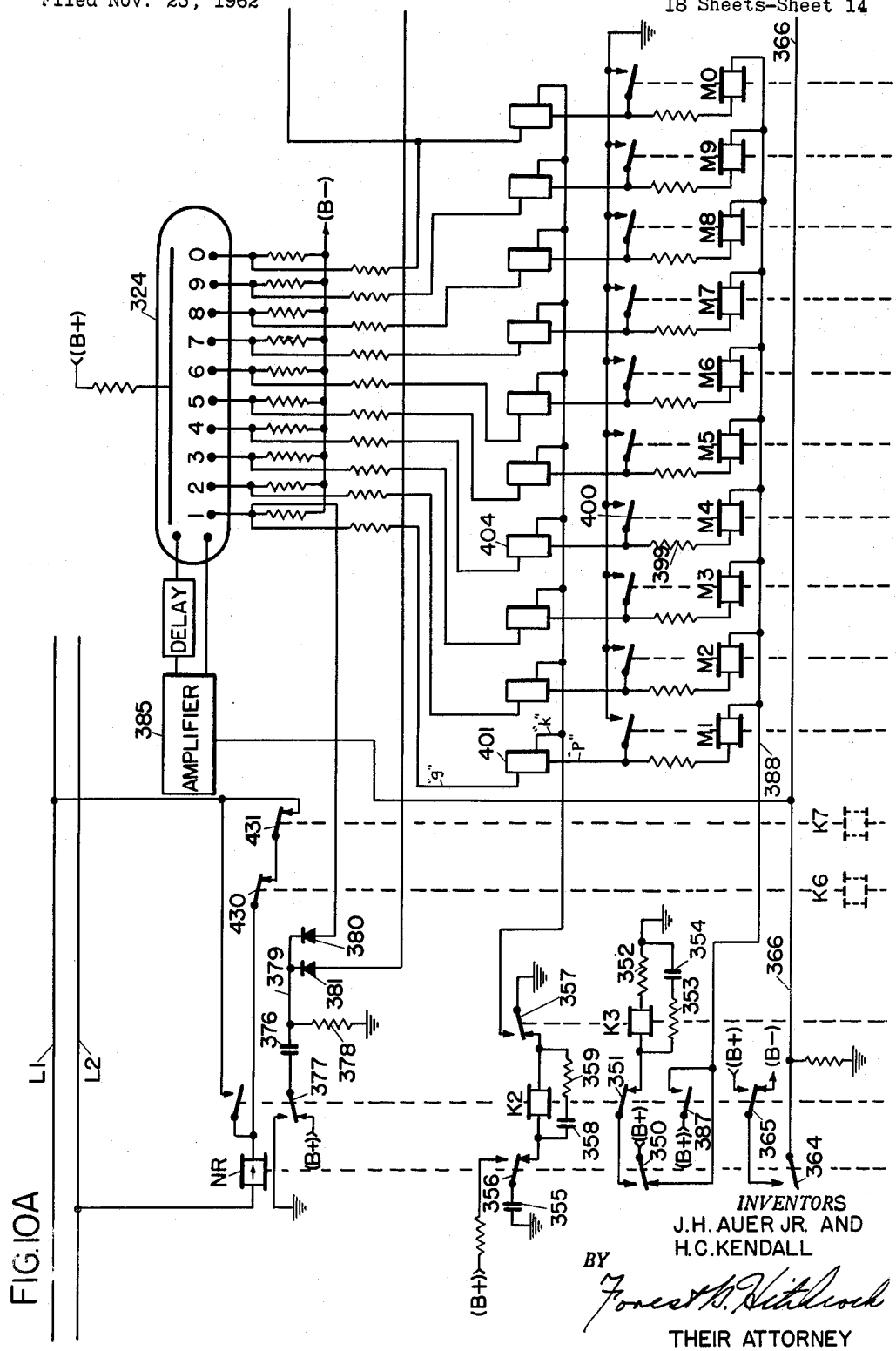

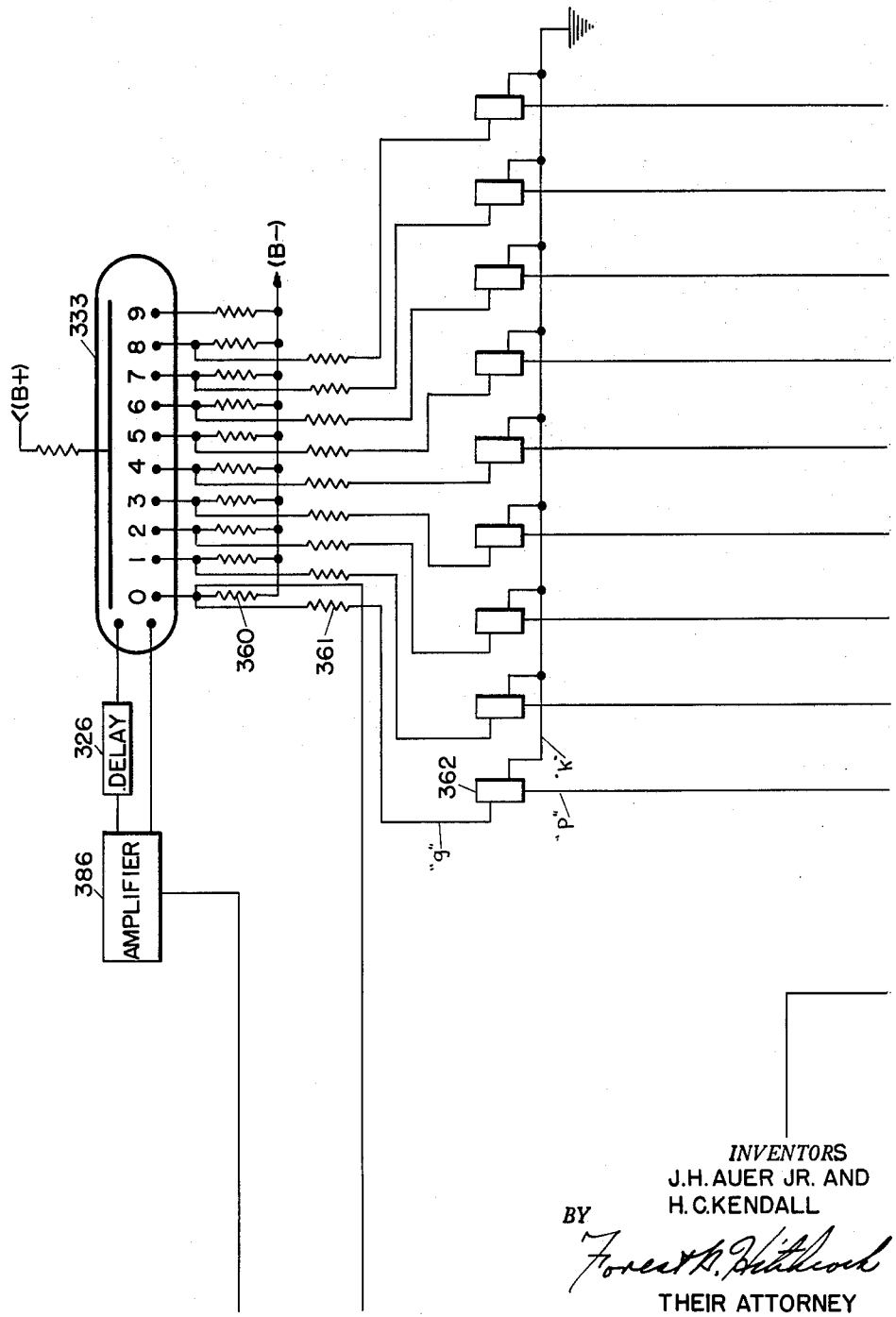
FIG. IOB

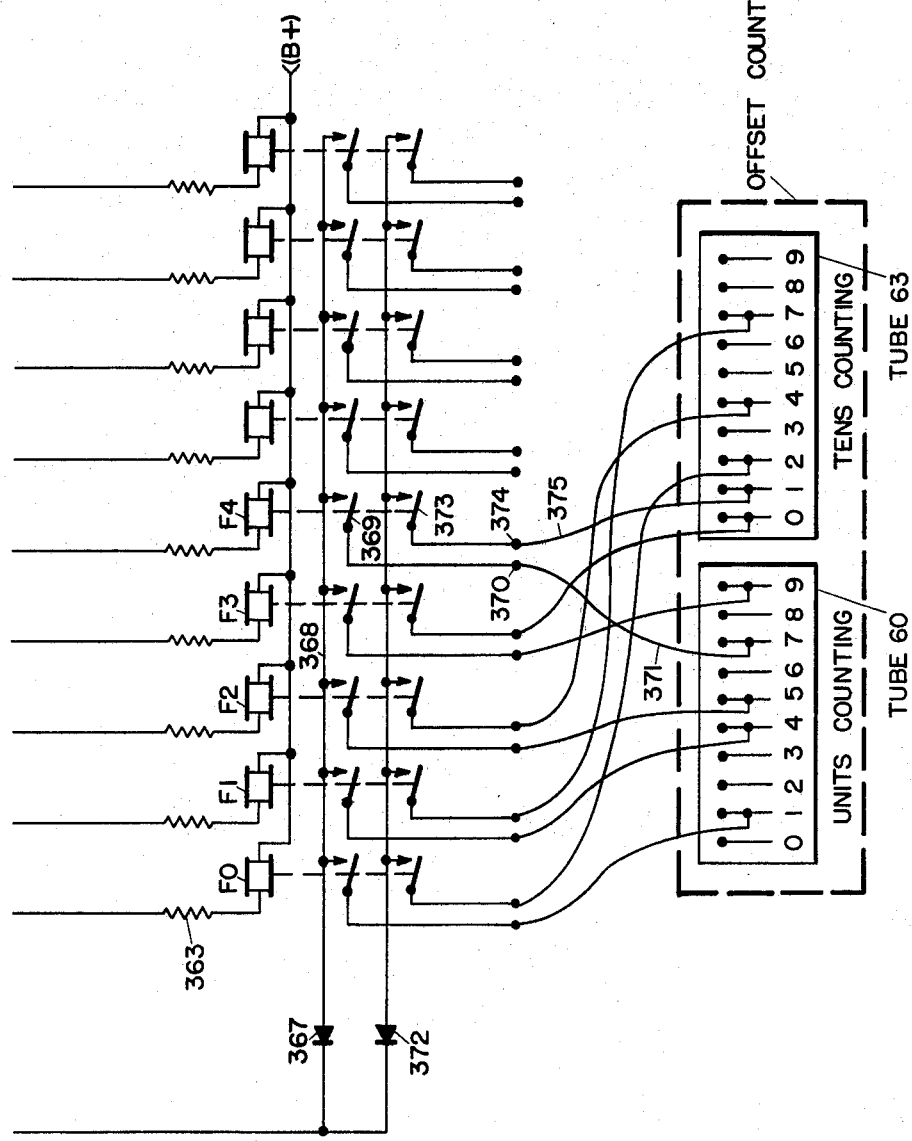

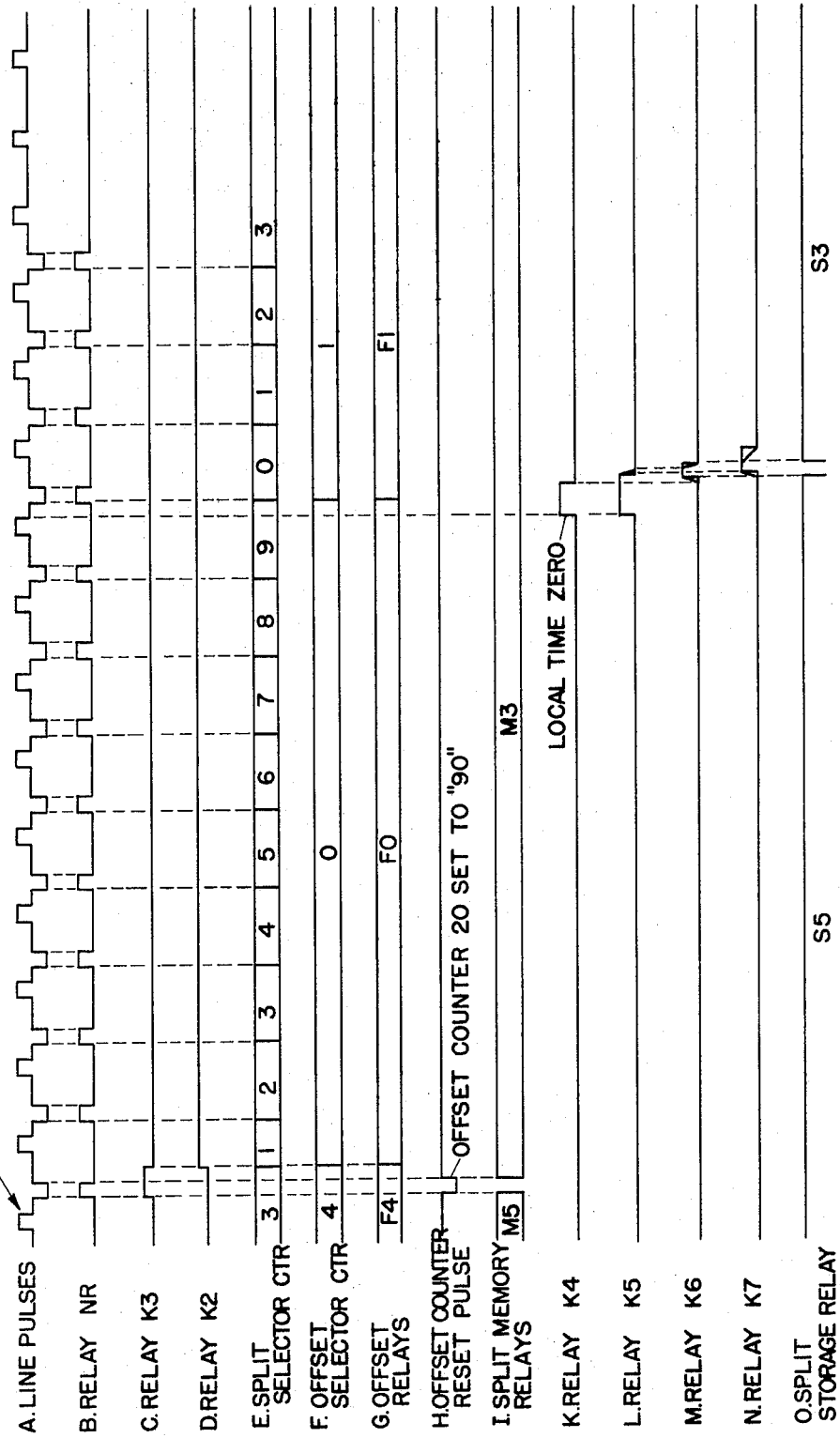

3,252,133
CONTROL SYSTEM FOR VEHICLE TRAFFIC SIGNALS
John H. Auer, Jr., and Hugh C. Kendall, Rochester, N.Y., assignors to General Signal Corporation
Filed Nov. 23, 1962, Ser. No. 239,714
24 Claims. (Cl. 340—35)

This invention relates to an integrated traffic control system and, more particularly, pertains to a control system which governs from a central location, the cycle length, the offset, and the cycle split as well as other miscellaneous functions for each of a plurality of signal controllers.

In many instances, the efficient handling of traffic can be obtained only by providing for the integrated control of a number of individual traffic controllers located, respectively, at related intersections. This makes it possible to have a "progressive" signalling system in which the successive signals along an artery are so timed that traffic arriving at each signal and travelling with a predetermined velocity will tend to encounter a green signal at each successive intersection. The result of this is, generally, that each vehicle which has once encountered a red signal and been forced to wait at one of the cross streets, will thereafter encounter all green signals at successive intersections provided that it travels along the artery with the predetermined design velocity. This necessarily requires that the controller for each of the successive signals be so timed that it will cause the traffic signal at the associated intersection to display a green signal period to artery traffic only throughout a predetermined interval whose starting time is delayed by the proper amount from the start of the artery green period for the last-encountered signal. One manner in which the desired delay or "offset" as it is commonly called, may be obtained at each controller is to establish a reference or "system zero" time for the entire system and then require the cycle timing means for each of the respective controllers to be time-phased with respect to the system timing so that, although the same length of cycle is demarcated at each controller, the local zero time at any controller will bear a predetermined phase relationship with the system zero time. This predetermined phase relationship may be different for each controller location so that any predetermined offset may be obtained at any such location.

The speed of traffic ordinarily varies with the amount of traffic congestion, generally being relatively high when congestion is low and decreasing substantially as congestion increases. This means that the offsets for the various controllers must be adjustable so that the particular offset values in effect at any time can readily be set in accordance with traffic congestion.

The offset times for the several controllers must usually be made adjustable also in accordance with whether inbound or outbound traffic is to be favored at a given time. The offsets which must be established at the various intersections to provide the proper progression for one direction of traffic may be quite different from those which must be put into effect to effect a proper progression for traffic in the other direction. Naturally, a selection of offset times which is most favorable to traffic in one direction may produce somewhat unsatisfactory progression for traffic moving in the opposite direction, but this condition is often tolerated where the traffic in the favored direction is very much heavier than that in the opposite direction. However, it is often necessary to favor one direction of traffic at one period of the day and to favor the opposite direction of traffic at other times, since the relative traffic loads may shift quite appreciably between different periods. Quite commonly, it is desirable to select one set of offset values for the morning rush hour, a different set for the evening rush, and a third set for other times when it is best to favor both directions equally insofar as possible. In any event, an integrated traffic signal control system should provide a means by which a particular one of two or more offset values can be selected at each individual controller location. For example, the system may be so organized that one set of offset values is selected for the several controllers in response to one kind of central signal received from the central office, and a second set of offset values in response to a second different signal.

The orderly adjustment of offset values at each controller location when the offset times are changed from one value to another has long been recognized as a quite difficult problem. It is obviously not possible to shift instantaneously from one offset value to the other since this might involve the skipping of a significant portion of the cycle if the timing means is shifted forwardly, or it might cause the repeating of a portion of the cycle if the new offset requires a shift backward by the local cycle timing means; an amber period or even an entire phase might be repeated or skipped. To accommodate this situation, any change in offset values at a controller location must be accomplished gradually, preferably over a period of at least several cycles so that no phase is unduly lengthened or shortened and such change must be accomplished by temporary increase or decrease in local cycle timing means rather than an instantaneous jump forward or backward so that no timing interval is omitted or repeated.

Another requirement of an integrated control system is that of being able to control the cycle length for the entire system from the control office. In a progressive signal system, the complete cycle length at each of the intersections is ordinarily the same in order that the predetermined time relationships can be maintained on successive cycles. However, it is entirely feasible to vary the cycle length for the entire system, and it is often of considerable advantage to do so in accordance with the amount of traffic congestion. When the amount of traffic is relatively light, the cycle length may be reduced to some minimum value so that traffic on either the artery or on cross streets will encounter only a minimum waiting time before a red signal turns to green. However, when traffic becomes heavy, it is then desirable to lengthen the cycle since the system's traffic handling capacity in terms of cars per unit time becomes considerably higher when traffic is permitted to stay in motion rather than being stopped and started frequently. Also, when signal cycles are short so that there are quite frequent changes in any given period of time, the portion of the over-all time which must be allotted to amber periods is increased, and this is inefficient since traffic flow naturally is less on the amber period than on the green time. It is, therefore, an essential characteristic of an integrated control system that there be an efficient means by which the control office may vary the cycle length.

Another desirable characteristic of the control system is that of being able to control the time of occurrence of the cycle split at any controller. By "cycle split" is meant the relative amounts of time allocated by any controller to the several phases at the associated intersection. At a simple intersection where there is only the artery and a side street, a typical cycle split might provide for sixty percent of the cycle time to be allotted to main street traffic and forty percent to cross street traffic. It is frequently desirable that this split also be capable of being adjusted in accordance with traffic conditions. At a particular location, for example, it may be known that the side street traffic will be even less in proportion to main street traffic than ordinarily and it may then be desirable to allocate a smaller portion of the cycle length to side street traffic at such times. Ideally, therefore, the control system should make it possible to select one of at least two or more different values of cycle split at each of the various controllers.

Until now, there has been discussed only a control system for traffic signals which are of the non-vehicle-actuated type. However, it is frequently desirable to provide for semi-actuated control at one or more intersections. By "semi-actuated-control" is meant a system wherein vehicle detection apparatus is employed on at least one of the approaches to the intersection and the length of time that a green signal is displayed to traffic travelling in such direction is a function of the number of vehicles detected, varying from some minimum value when there is but one vehicle waiting for a green signal up to a maximum when a substantially unbroken stream of traffic seeks to enter the intersection from that direction.

The controller at any intersection may further be so organized that the associated signal will display a green aspect to the direction of traffic monitored by the vehicle detectors only provided that there are one or more vehicles awaiting a green signal. When no traffic has been detected, the controller will then merely skip that phase and pass onto the next phase. Alternatively, if there are but two phases at that intersection, the controller will then simply continue to display a green signal for the other direction of traffic. Although various semi-actuated systems are known in the art, the present invention provides a novel system of this kind which is readily adaptable for use in the integrated control system of this invention.

GENERAL DESCRIPTION

It is contemplated by the present invention to provide an integrated control system which may be considered to be of a digital type in that a continuous code of discrete electrical pulses is transmitted from the control office over a pair of line wires or other suitable communication channel to each controller. The repetitive pulses establish by their repetition rate a "clock" for the entire system, and the pulse repetition rate is made adjustable so that the cycle length may be readily adjusted as desired. Between successive cycles, each of which may consist of 100 pulses, a distinctive pulse is sent out to demarcate the beginning of a new cycle of 100 pulses and the time of occurrence of this pulse may be considered as establishing a reference or zero time for the system. At each controller, a counter responds to the repetitive pulses and, when each complete cycle transmitted from the control office comprises 100 pulses, two decade counters may be employed at each controller, one being a "units" counter and the other a "tens" counter. Upon each occurrence of the distinctive synchronizing pulse, both units and tens counters are reset to a predetermined count if they are not already registering that count. Thus, each "offset counter" operates with a predetermined phase relationship relative to the cycles demarcated at the control office and this establishes the offset for that controller. For example, by switch selection, the offset counter may be required to be on Step No. 40 when the distinctive synchronizing pulse occurs which establishes the system zero time. At the next controller location, the selecting switches may be so adjusted that, upon the occurrence of the distinctive synchronizing pulse, the offset counter will be required to be on Step No. 55. This establishes a predetermined phase relationship between the offset counters at these respective controller locations which, in turn, establishes predetermined relative offset times at these two locations. These offset times are checked on each successive cycle upon the occurrence of the synchronizing pulse. By means of additional communication circuits extending between the control office and each controller location, any one of several alternative switch selections to the offset counter may be made so that, upon the occurrence of the synchronizing pulse, the offset counter at each controller location will be reset to a different step, thereby establishing different relative offset times. More specifically, if one particular offset control is transmitted to each controller location, a corresponding particular preset switch selection will be in effect at each controller and this will force the offset counter at each controller to assume a respective count upon the occurrence of the synchronizing pulse. If some other offset control is in effect at some other time, a different preset switch selection will become effective at each controller so that the offset counter will assume a different count upon the occurrence of the synchronizing pulse.

The aforementioned offset counter cannot itself be used for direct control of the traffic signals since this counter is subject to an abrupt shift in count at any time that the offset is changed. If the signals were governed directly by the offset counter, an abrupt shift in the count registered might very well cause a signal phase to be repeated or skipped as previously mentioned. Instead, a second decade counter which ordinarily runs in synchronism with the first is provided and this latter counter, termed a "local counter," controls the signals directly. Once each cycle, the counts of the two counters are compared. If they are both displaying the same count at the instant of comparison, they will then continue to operate in synchronism through the next cycle, each advancing one step in response to the further application of an input pulse received from the control office over the line wires. If, however, there has been an abrupt shift in count of the offset counter, the comparison between the two counters will reveal the difference in their respective counts, and this will cause a slow correction in counting rate of the local counter to take place, with the direction of change and its amount being dependent upon the extent and direction of difference between the two counts.

The invention also provides for the electronic timing of various portions of the signal cycle at any controller location, using, in effect, only a single timing circuit to accomplish any desired number of timing operations. In addition, the invention contemplates the integration into the system of a mechanical dial unit which is normally held inoperative as long as the centralized control system is operating properly but comes into effect automatically upon the failure of the centralized control system. When this dial becomes operative, it demarcates the successive cycles and also the signal phases of each cycle, and accomplishes this independently of any control from the control office. The system provides that the various dial units at the respective controller locations will operate in a synchronized manner so that an orderly progression may be maintained. This is accomplished by providing that upon the restoration of normal control from the control office, each of the respective dial units will be operated to a preselected condition before it becomes inoperative so that each such unit will be capable of maintaining a predetermined phase relationship relative to the other dial units in the event that the centralized control system becomes inoperative and all the dial units automatically are energized. In this way, an orderly signal progression may be maintained even in the absence of any centralized control.

According to the previous description, communication circuits, in addition to the one which provides for the transmission of the counting pulses from the control office to each controller location may be provided in order to transmit a plurality of offset and/or cycle split controls. This is a practical arrangement when the additional communication circuits are already available or can be provided at low cost. Under some circumstances, however, it may be preferable to provide a complete system in which the additional offset and cycle split controls may be transmitted over the same communication circuit which transmits the cycle and synchronizing pulses to the various controller locations. Various means may be employed for transmitting these additional controls without interfering with the transmission of the cycle counting pulses. In an alternative embodiment of this invention, as disclosed herein, this is accomplished by transmitting a variable number of negative pulses each similar to and occurring in succession after the synchronizing pulse. The synchronizing pulse is still recognizable as such because it is the first pulse of negative polarity to occur after a predetermined interval when no such pulses are transmitted. To one skilled in the art, it will be apparent that various code combinations of the negative pulses might be employed to transmit the offset and cycle split controls and/or such additional miscellaneous controls as might be desired. In the disclosed embodiment, the system is one wherein the number of negative pulses transmitted represents both the offset and cycle split controls, but the invention is, of course, not limited to this particular code arrangement.

It is an object of this invention to provide a centralized traffic control system for vehicular traffic signals which is of a digital type.

It is another object of this invention to provide a centralized control system for traffic controllers wherein the cycle length and also a predetermined offset for each signal controller may be provided for each controller location over a single communication circuit connecting each controller location with a central office.

It is another object of this invention to provide a centralized control system for traffic controllers in which an orderly adjustment of the offsets at each signal location will occur over a time interval whose duration may be at least several signal cycles.

It is another object of this invention to provide a centralized control system for traffic signals which includes a novel organization providing for semi-actuated control over any preselected controller.

It is another object to provide a centralized traffic control system in which each controller is so organized that a predetermined signal progression alternatively becomes effective in the event of a breakdown in the centralized control system.

Still another object of the invention is to provide a control system for a plurality of traffic signals in which cycle length, cycle split, offset, and other miscellaneous controls may be transmitted over a single communication circuit connecting each signal controller to a control office and be effective to govern the operation of each controller.

Other objects, purposes and characteristic features of the invention will, in part, be obvious from the accompanying drawings and, in part, pointed out as the description progresses.

In the description of the invention which follows, reference will be made to the accompanying drawings in which:

FIG. 1 is a diagrammatic illustration of a part of the system of the present invention;

FIGS. 2A–2H comprise a detailed circuit drawing of the integrated control system of the invention when the individual sheets are assembled in the manner shown in FIG. 7;

FIGS. 3A–3C, when placed vertically in order, comprise a waveform diagram showing various voltage waveforms appearing at various places in the circuit of FIGS. 2A–2H;

FIG. 6 illustrates one of the cams embodied in the cam unit of FIGS. 2A–2H;

FIG. 7 illustrates the layout of the individual sheets comprising the circuit drawing of FIG. 2;

FIG. 8 is a block diagram of the central office apparatus which may be used to provide for the transmission of offset, cycle split, and other controls over the same communication circuit as is used for the transmission of the cycle counting and synchronizing pulses;

FIG. 9 is a block diagram of the apparatus which may be used at a controller location and incorporated with the apparatus of FIGS. 2A–2H so as to respond to cycle split, offset, and other commands which may be received from the control office apparatus of FIG. 8;

FIGS. 10A–10D are a circuit diagram corresponding generally to the block diagram of FIG. 9; and FIG. 11 is a waveform diagram showing various timing relationship in the operation of the apparatus of FIG. 10.

DESCRIPTION OF BLOCK DIAGRAM—FIG. 1

Figure 2A:
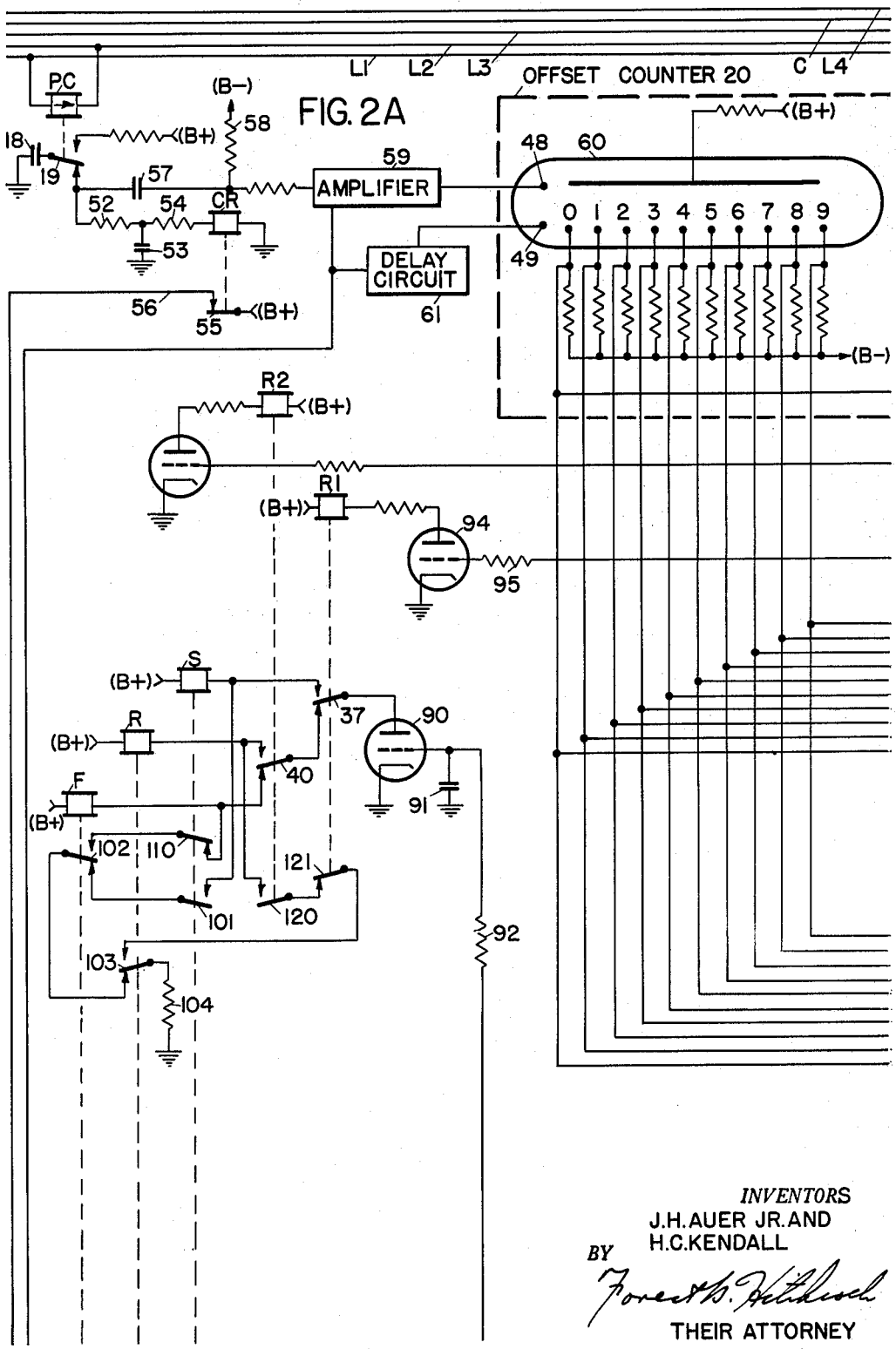

FIG. 1 illustrates diagrammatically central office equipment which is connected over a plurality of communication circuit to apparatus located at and governing each signal controller.

The central office equipment 10 of FIG. 1 includes a pulse generator 11 which is connected to line wires L1 and L2. The pulse generator is so organized that it will transmit over the line wires L1 and L2 repetitive voltage pulses, such as those shown graphically in FIG. 1, all of which may be substantially identical in amplitude and duration, except that after each group of one hundred pulses, one pulse of opposite polarity is transmitted to demarcate successive cycles of these voltage pulses. The pulses may be square-wave pulses of positive polarity, but with each synchronizing pulse being of negative polarity, as shown in FIG. 1.

Associated with the pulse generator 11 is cycle length adjustment apparatus 12 which may include a manually-adjustable control knob 13 that can be set to any of a plurality of different positions. The effect of this adjustment is to vary the repetition rate of the output pulses applied by pulse generator 11 to line wires L1 and L2. Movement of knob 13 to the lefthand or "St" position, denoting a short cycle length, has the effect of increasing the repetition rate of the pulses provided by pulse generator 11, thereby shortening the time required to transmit a full cycle of one hundred pulses. Similarly, movement of knob 13 to the righthand or "Lg" position has the effect of decreasing the repetition rate and thereby lengthening the cycle.

Additional communication channels may be provided from the central office to each controller location to select the desired offset and cycle split for each controller. In FIG. 1, these additional communication circuits comprise line wires L3, L4 and the common wire C. A battery 14 is shown which has one terminal connected to the common wire C and its opposite terminal selectively connected to wires L3 and L4. As will later appear, if switch 15 is open, there will be zero voltage between wires L3 and C and one particular predetermined value of offset will be selected at any controller location; whereas, if this switch is closed, wires L3 and C will be energized and a different offset value will be selected. In a similar manner, the selective application of electrical energy between wires L4 and C by the open or closed condition of split selector switch 16 makes it possible to choose either of two cycle split values at any controller location.

The apparatus at each controller location includes two relays, each of which has its winding connected across line wires L1 and L2. One of these relays is a positive pulse counting relay PC and is a polar relay with the polarity of connection of its winding to the line wires being such that it will be actuated only in response to the positive line pulses. The other relay is a negative pulse counting relay NC and is also a polar relay but has its winding so connected to the line wires that it will be actuated only by the negative voltage synchronizing pulses.

Before proceeding with the description of the block diagram of FIG. 1, it should be recognized that this block diagram is primarily provided to aid in the description of this invention and is not intended to provide a complete and detailed disclosure, nor is it intended to represent in block diagram form, all of the apparatus of this invention. A more complete disclosure which is adequate in detail to enable one skilled in the art to practice the invention is shown in FIG. 2.

Each time that relay PC picks up in response to a positive line pulse, capacitor 18 is charged through closed front contact 19. When relay PC drops away at the end of the pulse, back contact 19 closes so that a voltage pulse is applied to the offset counter 20. This decade counter may comprise a plurality of stages so that the complete counter will have a counting capacity equal to the number of positive voltage pulses appearing in each of the successive cycles of pulses applied to the lines wires i.e., a capacity of one hundred in the assumed embodiment. Also, the counter is of a cyclical type in that it repeatedly goes through the same counting cycle, advancing at the end of each cycle of one hundred counts to its zero state so as to start a new cycle.

Relay NC, which is the negative or synchronizing count pulse relay, charges capacitor 21 through closed front contact 24 each time relay NC picks up. When the pulse has terminated and relay NC drops away, capacitor 21 discharges and thereby supplies a voltage pulse through either offset switch 22 or offset switch 23 to offset counter 20. If wires L3 and C are deenergized so that relay OS is dropped away and its back contact 25 is closed, the pulse provided by the closure of back contact 24 will be applied through switch 22 to counter 20; but this pulse will instead be applied, when relay OS is picked up and its front contact 25 closed, through offset switch 23 to counter 20. Both these switches 22 and 23 may be set to any desired count between zero and ninety-nine and, depending upon the particular position at which the switch is set, the voltage pulse applied therethrough will forcibly reset counter 20 to that particular count at the instant relay NC drops away. For example, assuming that relay OS is dropped away and that switch 22 is preset to count number 25, upon the termination of the negative synchronizing pulse (which may be considered as being system time zero of the pulse code applied to line wires L1 and L2), counter 20 will bet set to count 25. At some different time of the day perhaps, energy may be applied between wires L3 and C at the central office by closure of switch 15 so that relay OS at each controller will be picked up. If switch 23 at a particular controller is set to count number 62, for example, then counter 20 will be reset to register 62 in response to the actuation of relay NC.

Once upon each recurring cycle of 100 positive pulses applied to line wires L1 and L2, the condition of counter 20 will be checked since, upon each occurrence of the synchronizing pulse, the counter will be left in a condition which is determined by the then-existing condition of the selected offset switch. Ordinarily, when there is no change in the offset selection, counter 20 will readily keep in synchronism and no resetting need take place. However, each time there is a change in the offset control resulting from an actuation of relay OS, counter 20 will abruptly shift from one count to another in response to the synchronizing pulse. For this reason, counter 20 cannot itself be used to advance the controller through its several phases constituting a complete signal cycle since an abrupt shift forward might result in a drastic curtailment of a particular phase or the complete skipping of a phase, whereas an abrupt shift backward might well unduly lengthen the then-current phase or result in the reception of a just-completed phase.

To overcome this effect, a second decade counter 26, also having a capacity of one hundred counts, is provided. Counter 26 ordinarily receives input pulses from a modified Eccles-Jordan circuit 27 which, in turn, receives an input pulse in response to each actuation of the positive pulse counting relay PC. Ordinarily, counter 26 is operated in exact synchronism with counter 20. When this condition exists, the modified Eccles-Jordan circuit 27 produces one output pulse for each input pulse resulting from an actuation of relay PC so that counters 20 and 26 are advanced simultaneously.

Once each cycle, the count registered by local counter 26 is compared with that registered by offset counter 20. If there is any discrepancy, control is immediately exercised over the further counting operations of counter 26 in order to bring this counter into synchronism with counter 20. It is intended, however, that counter 26 actually demarcate the different phases of the signal cycle and it is, therefore, impractical to change the count registered by counter 26 immediately from one value to the other for the reasons already given. Therefore, when a discrepancy between the states of the respective counters 20 and 26 has been detected, counter 26 is either operated more rapidly or more slowly than counter 20, dependent upon whether it is then ahead of or behind counter 20. Also, the change in counting speed of counter 26 when a discrepancy has been noted is preferably made to be relatively slight so that ordinarily at least several cycles will elapse before the two again come into synchronism. If the discrepancy in counts between counters 26 and 20 is relatively slight, with counter 26 being ahead of counter 20, as may occur initially or as a result of an original discrepancy having been reduced by a change in counting speed of counter 26, then counter 26 is merely prevented from responding to further input counts for a brief interval until counter 20 has had a chance to catch up. Thereafter, counter 26 is released so that both counters can continue in synchronism. Consequently, any change in the counting speed of counter 26 is quite slight and the effect upon the duration of the signal phases as experienced by a motorist is almost undetectable.

More specifically, an output lead 30 of counter 20 is energized whenever that counter is registering any of the counts 50–89, inclusive. Energized lead 30 connects to the input of amplifier 31, causing it to energize relay R1. A similar amplifier 32 is energized by an output lead 33 of counter 20 whenever counter 20 registers any of counts 90–99, inclusive, and picks up relay R2. Another amplifier 34 receives an input signal from local counter 26 over lead 35 which is energized only when counter 26 registers count 99.

When amplifier 34 supplies energy to its output lead 36 as local counter 26 reaches its count number 99, the then-existing status of offset counter 20 can be ascertained through the conditions of relays R1 and R2 and, from this determination, a selected one of the relays, F, R or S can be energized. Thus, assuming that, upon reaching count number 99 by counter 26, relay R1 is picked up, this is an indication that counter 20 is then in the range of 50–89 and is behind counter 26 which means, of course, that counter 26 must be slowed up in order to permit count 20 to catch up. Under these conditions, the energy on output lead 36 of amplifier 34 is supplied through front contact 37 of relay R1 to the winding of relay S. When relay S picks up, a stick or holding circuit is provided to maintain it energized at least until counter 26 again reaches count 99. This stick or holding circuit has not been shown in FIG. 1 but is illustrated in the detailed circuit of FIG. 2. In the description that follows with respect to this FIG. 1, it should be understood that similar holding circuits are provided for relays R and F even though they are not shown in FIG. 1.

When relay S is picked up, a control is provided through a contact of this relay to the Eccles-Jordan circuit 27, and this control is designated as a "skip count" control. This Eccles-Jordan circuit 27 receives a voltage pulse over load 38 in response to each actuation of relay PC, and normally, in response to each pulse, supplies one corresponding pulse to counter 26. However, the Eccles-Jordon circuit also receives an input control from counter 26 over lead 39 each time that counter 26 reaches a particular count in each group of 10 consecutive counts such as at counts 15, 25, 35, 45, etc. Each time such a pulse appears on lead 39 at a time when relay S is picked up, the next-occurring voltage pulse on lead 38 will not be delivered onto counter 20. In other words, as long as relay S is picked up, counter 26 will miss one count in every ten so that its speed of operation will, in effect, be slowed by 10 percent.

After one or more cycles have elapsed, the discrepancy in counts registered by counters 20 and 26 will finally be narrowed to the point where, when counter 26 reaches count 99, counter 20 will be in the range of 90–99 so that relay R2 is picked up by amplifier 32 and relay R1 is dropped away. When this condition is reached, the output of amplifier 34 will energize relay R through back contact 37 of relay R1 and front contact 40 of relay R2.

The picking up of relay R, first of all, acts upon the Eccles-Jordon circuit 27 in such a manner that a pulse is delivered to counter 26, advancing it to count zero. Thereafter, a "stop counter" control becomes effective on the Eccles-Jordan circuit 27 so that no output pulses will appear at the input of counter 26 in response to actuations of relay PC. Counter 26 will then stay in condition zero and remain there until counter 20 has reached condition zero at which time relay R2 will be released, thereby permitting relay R to be dropped away as well when front contact 40 of relay R2 opens. The "stop counter" control is then removed and further line pulses which operate counter 20 will operate counter 26 as well so that the two counters will thereafter remain in synchronism.

If, at the time counter 26 reaches count 99, counter 20 is at that instant registering any count between zero through 49, inclusive, both relays R1 and R2 will be dropped away so that the output signal of amplifier 34 will be applied through back contacts 37 and 40 to the winding of relay F. Since counter 20 is then ahead of counter 26, it is necessary that counter 26 operate somewhat more rapidly than counter 20 on following cycles until the two again come into synchronism. To accomplish this, a control is provided, effective upon the picking up of relay F, which causes the modified Eccles-Jordan circuit 27 to periodically supply an additional input pulse to decade counter 26. More specifically, once for each 10 pulses counted by counter 26, a signal appears on wire 39 and, when this happens, one additional pulse is provided to counter 26 so that counter 26 will operate at a speed which is substantially 10 percent greater than that of counter 20.

To summarize, if the counter 26 is ahead of counter 20 by anywhere from ten to forty-nine counts, counter 26 is slowed down to such an extent that, on successive cycles, counter 26 will require 110 line pulses to complete one cycle of 100 counts. When this difference is detected at the end of any cycle as being less than ten counts, counter 26 is stopped completely until counter 20 catches up. If, on the other hand, counter 26 lags counter 20 by anywhere from one to fifty counts when the comparison is made, counter 26 will thereafter register 100 counts for each 90 line pulses. It is unlikely that the two counters will be put into exact synchronism at the end of a cycle by this means; rather, it is more likely that counter 26 will "overshoot," i.e., go ahead of counter 20. However, by reason of being sped up only to the extent of an extra ten counts per cycle, the amount by which counter 26 will exceed counter 20 will not be greater than nine counts and, when this narrow difference is reached, counter 26 will be stopped as previously explained until counter 20 catches up.

Counter 26 controls the energization of relay OR through amplifier 41. Each time that counter 26 reaches the zero condition, an input signal is applied to amplifier 41 and the resulting output signal of amplifier 41 causes relay OR to pick up, thereby denoting the beginning of a signal cycle at that controller location. From the description already given, it will be obvious that the time at which relay OR at any controller location is actuated relative to the system zero time established by the negative synchronizing pulse will be dependent upon the particular count that offset counter 20 is forced to assume upon the occurrence of the synchronizing pulse, and that the cycle offset thus determined can be chosen to be either of two different values dependent upon whether relay OS is picked up or dropped away. Obviously, by providing additional offset control relays, more than two offsets may be made available at any controller.

The controller must also govern the time of occurrence of the cycle split, i.e., the division of the cycle time between the different phases. When the controlled intersection requires only a two-phase system to accommodate only artery and side street phases, only a single relay such as relay SR in FIG. 1, may provide the required demarcation. Of course, when a three-phase system is being considered, it is necessary to provide two separate cycle split controls since the two, together with the cycle demarcation resulting from actuation of relay OR, will fully demarcate three successive phases.

In FIG. 1, two separate split switches 42 and 43 are shown as being connected to the output of counter 26, and a selected one of these switches controls the application of an input signal to amplifier 44 whose output signal energizes relay SR. Assuming that there is no energy applied between line wires L4 and C, relay SS will be dropped away and its back contact 45 closed. Consequently, the input circuit of amplifier 44 will be coupled to counter 26 through switch 43, and amplifier 44 will receive an input signal only on the particular count of counter 26 which is selected by switch 43. If, for example, switch 43 is set at "60," amplifier 44 will receive an input signal from counter 26 each time that counter 26 registers count 60; thus, the first 60 percent of the signal cycle will be allotted to the first phase starting with count 0 of counter 26 and the remaining 40 percent to the other phase. If relay SS is picked up because of the application of energy to line wires L4 and C, then the application of an input signal to amplifier 44 will be dependent upon the pre-set condition of switch 42 instead of switch 43 and, if switch 42 is set to position 72, for example, then relay SR will pick up to denote the beginning of the second phase only when counter 26 reaches count 72. The first phase will then comprise 72 percent of the cycle, with the remaining 28 percent allotted to the second phase.

DESCRIPTION OF DETAILED CIRCUITS—
FIGS. 2A–2H

FIGS. 2A–2H comprise a circuit diagram for a typical embodiment of the apparatus at a controller location. Similar apparatus is provided at each controller location, and the various line wires which connect the central office with the controller apparatus of FIGS. 2A–2H extend as well as to the apparatus at each other controller location.

Figure 2B:
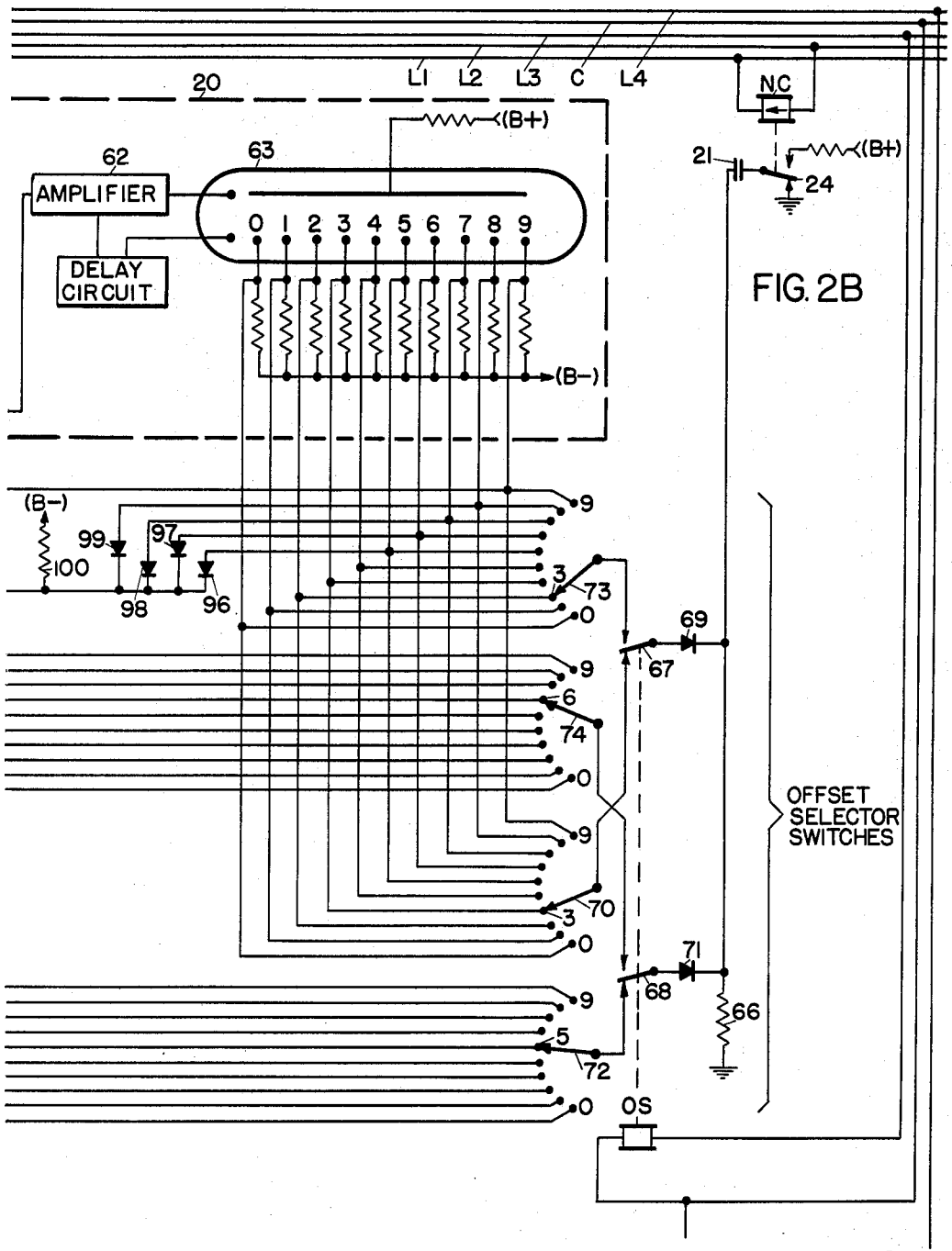

In FIG. 2A, the positive pulse responsive relay PC has its winding connected across line wires L1 and L2. This relay is a polar relay, and the required polarity connections are observed in order that relay PC will pick up in response to each positive voltage pulse appearing between wires L1 and L2. In FIG. 2B, a negative pulse responsive relay NC is shown as having its winding also connected across line wires L1 and L2. This relay is also a polar relay, but its polarity sense in respect to the energization of line wires L1 and L2 is such that relay NC will be energized only in response to each negative synchronizing voltage pulses demarcating the successive cycles of one hundred pulses each.

Returning to FIG. 2A, each picking up of relay PC charges capacitor 18 through front contact 19, and each time that relay PC drops away, capacitor 18 is discharged through back contact 19 and resistor 52 to the upper terminal of capacitor 53. The charge received by capacitor 53 from capacitor 18 is transferred through resistor 54 to the winding of the check relay CR. The various circuit components in this circuit are so selected that, if relay PC is regularly responding to the positive voltage pulses, even at their lowest expected repetition rate, the amount of charge which is repeatedly transferred from capacitor 18 to capacitor 53 will be sufficient that the discharge current supplied by capacitor 53 to the winding of relay CR will maintain this relay picked up. Thus, the fact that relay CR is picked up is an indication that the line pulses are being properly received which, in turn, means not only that the integrity of the line circuit comprising line wires L1 and L2 is being maintained, but also that the apparatus at the central office is operating properly to place the voltage pulses on the line. Front contact 55 of relay CR, when closed, causes the (B+) energy to be applied to wire 56 and thus the appearance of this energy on wire 56 not only checks that relay CR is energized to thereby provide assurance of proper operation to the extent just described, but also indicates that the (B+) voltage supply is then effective as well.

Each time that relay PC drops away, there is also a partial discharge of capacitor 18 through capacitor 57 and resistor 58 whose lower terminal is connected to the (B—) voltage supply. This causes a positive voltage pulse to be applied to the input of amplifier 59 which, in turn, causes a negative-going voltage pulse to be applied directly to one of the guide electrodes 48 of the polycathode counting tube 60 and also through delay circuit 61 to a second guide electrode 49 of this same counting tube 60.

Because of delay circuits 61, the pulse on electrode 49 is slightly delayed with respect to the pulse on electrode 48, as is required for the transfer of the glow discharge from one cathode to the next in tube 60. Counting tubes of the type exemplified by tube 60 are well-known in the art, and thus no detailed description of their operation need be given here. Tube 60 is shown as having ten individual cathodes and there exists normally a glow discharge between any one of the ten cathodes and the common plate. The glow transfers from one cathode to the next in a predetermined direction for each pair of time-spaced pulses applied to the guide electrodes and, since the cathodes are arranged in a ring, there will be a continuous glow transfer between successive electrodes and always in the same direction in response to the input pulses. Dependent upon which cathode experiences the glow discharge between itself and the plate, there will exist a current flow between that particular cathode and the common plate electrode with the result that a positive voltage will appear across the associated cathode resistor. Thus, as the tube responds to each successive actuation of relay PR by transference of the glow from one cathode to the next, each cathode in turn will experience a voltage rise above that of the (B—) voltage supply to which all the cathodes are returned through their respective cathode resistors.

Tube 60 can, by itself, count only ten line pulses but, in cooperation with an identical counting tube 63 which acts as a tens counter, the combination can count up to one hundred pulses. Thus, it can be seen that these counting tubes 60 and 63, together with the associated pulse transfer apparatus coupling the two counting tubes, correspond to counter 20 of FIG. 1. More specifically, each time that the glow between cathode and plate of tube 60 is returned to its No. 0 cathode, there is a rise in the voltage at that cathode which is applied to amplifier 62, resulting in the application of a pair of time-spaced pulses to the two guide electrodes of the tens counting tube 63, thereby causing tube 63 to register one additional count for each complete cycle of operation of tube 60.

The negative pulse-responsive relay NC, as previously mentioned, is picked up each time that a negative voltage pulse is applied to line wires L1 and L2. Each time this occurs, front contact 24 of relay NC is closed, thereby charging capacitor 21 which is normally in a discharged condition when back contact 24 is closed. The momentary charging of capacitor 21 that takes place causes a positive voltage pulse to appear across resistor 66. This positive pulse cannot have any effect upon the counting tubes 60 and 63 because of the blocking effect provided by diodes 69 and 71. However, when relay NC drops away so that capacitor 21 discharges, a negative pulse is produced across resistor 66 which can be applied through diodes 69 and 71 and have a resetting effect on counting tubes 60 and 63.

Assuming that the offset selecting relay OS is dropped away so that its back contacts 67 and 68 are both closed, the upper terminal of resistor 66 will then be connected, firstly, through diode 69, back contact 67, and switch contact 70 to a selected cathode of the tens counter tube 63 and, secondly, through diode 71, back contact 68, and switch contact 72 to a selected cathode of the units counter tube 60. Thus, dependent upon the pre-set conditions of switch contacts 70 and 72, preselected cathodes of both tubes 60 and 63 will receive negative voltage pulses at the instant that front contact 24 of relay NC opens. The selected cathode in each tube instantaneously has the glow transferred to it even though the glow discharge may, at that time, have been present on some other cathode.

Since both switch contacts 70 and 72 are ten-position switches, a resetting pulse may be applied to any electrode of each tube so that the 100-count counter comprising tubes 60 and 63 may be set to any one of its 100 different counts at the time of occurrence of the negative synchronizing pulse. Of course, if the offset selector relay OS is picked up when the synchronizing pulse occurs, a resetting pulse will then be applied instead through front contacts 67 and 68 of relay OS to selected cathodes of counting tubes 60 and 63 in accordance with the pre-set positions of switch contacts 73 and 74.

At each controller location, the offset selector switches will be pre-set to predetermined positions, thereby establishing the phase relationship between the counter at the location and all corresponding pulse counters at the other controller locations. At each controller location, one preselected offset value may be chosen when relay OS is dropped away and another different value when relay OS at that location is picked up. A desired selection of offsets for the various controllers in the system may, accordingly, be chosen by leaving line wires L3 and C deenergized and a different combination of offset values may similarly be selected for the various controllers by energizing these two line wires so as to pick up the OS relay at each controller location.

In FIGS. 2C and 2D, two additional polycathode counting tubes 75 and 76 are illustrated, and these also comprise units and tens counters, respectively exactly similar to the corresponding tubes 60 and 63 already described. These two counting tubes comprise the local counter 26 of FIG. 1. Tube 75 receives its input pulses from a modified Eccles-Jordan flip-flop circuit (corresponding to 27 of FIG. 1) which includes the interconnected triode tubes 77 and 78. The input to this flip-flop circuit is also obtained from amplifier 59, the same as for tube 60 and, in its normal condition, it operates as a one-shot multivibrator, going from its normal condition to the abnormal condition for a predetermined length of time and then reverting to the normal state in response to each pulse obtained from amplifier 59. As will be shown, one output pulse is thus generated by this circuit for each input pulse from amplifier 59 so that the number of pulses applied to tube 75 corresponds exactly to the number of pulses applied to counting tube 60. Since these pulses actually originate from the pulsing operation of relay PC, both the local counter comprising tubes 75 and 76 and the offset counter comprising tubes 60 and 63 are repetitively pulsed together, and both operate a single step in response to each positive counting pulse appearing on line wires L1 and L2.

Considering the circuit of tubes 77 and 78 at somewhat greater detail, tube 78 has its control grid returned through resistor 79 to ground but the control grid of tube 77 is not connected to ground in any manner as long as relay R is dropped away so that its front contact 80 is open and so long as relay S is dropped away so that its front contact 81 is also open. Under normal conditions, both relays R and S are dropped away and there is, therefore, a tendency for this flip-flop circuit to revert to the condition wherein tube 78 is cut off but tube 77 is fully conductive. If the flip-flop is operated by an input pulse from amplifier 59 to the opposite state wherein tube 77 is cut off, it will, after a predetermined time interval, switch itself back to the normal condition since it is not possible to maintain the control grid of tube 77 sufficiently reduced in potential to maintain tube 77 cut off. Therefore, as long as relays R and S are both dropped away, this flip-flop circuit operates as a one-shot multivibrator, going through one cycle of operation for each voltage pulse. The various time constants of this multivibrator are so selected that, when it is triggered from its normal state, it will remain in the abnormal state for a length of time which is less than half the period of the pulses appearing on line wires L1 and L2, for reasons which will later become apparent. Accordingly, upon each occurrence of an output pulse from amplifier 59, the multivibrator will be assured of having been restored to the normal state wherein tube 77 is conductive and thus such input pulse to the multivibrator will necessarily operate it to the condition wherein tube 77 becomes cut off and tube 78 becomes conductive. This will produce an abrupt drop in the potential at the plate of tube 78 so that a negative pulse is applied through capacitor 86 and resistor 82 to guide electrode 84 of tube 75 and also through delay circuit 83 to the other guide electrode 85. Shortly thereafter, the multivibrator will restore itself to the normal condition wherein tube 77 is conductive, and will wait in that condition in readiness for the next output pulse from amplifier 59.

As already mentioned, counting tubes 75 and 76 which operate as units and tens counters, respectively, operate in the same manner as counting tubes 60 and 63. Tube 76 receives time-spaced negative-going voltage pulses on its two guide electrodes each time that the glow in tube 75 is transferred to its No. 0 cathode so that one additional count is registered by tube 76 for each ten pulses counted by tube 75.

Once for each cycle of 100 counts of local counter comprising tubes 75 and 76, the condition of the local counter is checked against that of the offset counter comprising tubes 60 and 63. If they are out of step with each other, corrective action is taken to bring them back into synchronism. Assuming for the moment that there has been a change in offset control communicated to each of the controllers, and that this change in offset has produced a change in phase of the offset counter so that it is now lagging the local counter, it then becomes necessary to reduce the counting speed of the local counter so that the two counters will, over a period of time, be brought into synchronism. Such a situation is illustrated graphically in FIG. 3A where the local counter is shown to be at step No. 33 at a time when the offset counter is on step No. 18.

To accomplish the synchronizing action, an electron tube 90 is provided whose control grid voltage is governed by the local counter 26, and whose plate circuit controls the energization of a selected one of three relays F, R and S (see FIG. 1A). The control grid of this tube is connected through a capacitor 91 to ground and also through a resistor 92 and then through another resistor 93 to the No. 9 cathode of the units counter tube 75 as well as through a diode 89 to the No. 9 cathode of the tens counter tube 76. Normally, each counting tube cathode is at a negative potential since each cathode is connected through a resistor to the (B−) voltage source as shown. When the No. 9 cathode of both tubes 75 and 76 is conductive, the normally negative bias voltage is overcome so that tube 90 then conducts.

Under the assumed conditions where the local counter is running ahead of the offset counter by fifteen counts (see FIG. 3A), it will be assumed that, when the local counter reaches count No. 99 so that tube 90 becomes conductive, the offset counter 20 comprising tubes 60 and 63 registers count 84. Under these conditions, triode 94 of FIG. 2A will be conductive so that relay R1 included in its plate circuit will be picked up. The reason that tube 94 will then be conductive is that its control grid is connected through resistor 95 and through each of the diodes 96–99 to a respective cathode numbered 5 through 8 of the tens counter tube 63 of the offset counter 20. Normally, tube 94 is maintained cut off because of the negative grid bias voltage applied to its control grid from (B−) through resistor 100, but this negative bias is overcome when any of the cathodes Nos. 5–8 of tube 63 is conductive and thereby applying a positive voltage through a respective one of the diodes 96–99 to the control grid of tube 94. From this, it can be seen that relay R1 will be picked up on each cycle throughout the time that the offset counter, comprising tubes 60 and 63, is registering any of the counts from 50 to 89, inclusive.

Referring again to the assumed conditions, i.e., where tube 90 is conductive and relay R1 is picked up, a circuit will be completed through front contact 37 of relay R1 to energize the winding of relay S. This circuit through the plate circuit of tube 90 will only be maintained for the rather brief interval of time that the local counter 26 remains in step No. 99. However, immediately upon the picking up of relay S, a stick or holding circuit for this relay is completed through its winding, through front contact 101 of relay S, back contact 102 of relay F, back contact 103 of relay R, and through resistor 104, to ground.

With relay S now maintained steadily energized, a circuit becomes effective to slow the counting rate of the local counter comprising decade counting tubes 75 and 76. More specifically, each time that the units counter tube 75 of this local counter reaches the No. 5 count, there is an abrupt increase in the cathode potential of cathode No. 5, and this increase in potential is sufficient to overcome the normal cut-off bias on the control grid of tube 105. With tube 105 fully conductive, the potential at its plate is only slightly above that of its grounded cathode. Since the plate of tube 105 is now connected through front contact 81 of relay S, and through resistor 106 to the control grid of tube 77, the grid circuit for tube 77 now is substantially identical to the grid circuit for tube 78 which is grounded through resistor 79. Because of the symmetry of the grid circuits for the two tubes 77 and 78 under these circumstances, the modified Eccles-Jordan circuit will now operate as a true bi-stable state circuit in that it will remain in the condition wherein tube 78 is conductive and tube 77 cut-off and will not automatically revert to the opposite state as it normally does.

This mode of operation is shown in FIG. 3A wherein line A illustrates the voltage pulses appearing on line wires L1 and L2, line B represents the negative-going trigger pulses which are applied to amplifier 59 and result in the time-spaced trigger pulses which produce the stepping operation in counter tube 60, and line C represents diagrammatically the operation of the offset counter including tubes 60 and 63. Line D illustrates the manner in which the modified Eccles-Jordan circuit, including tubes 77 and 78, operates in response to each input pulse, with the waveform shown representing the voltage which appears at the plate of tube 78. Only the negative-going voltage variations of this waveform are effective to operate counting tube 75 and these are represented by the waveform of line E which illustrates that the input pulses which operate counting tube 75 are substantially coincident with those which operate counting tube 60 so that both the offset and local counters ordinarily operate simultaneously. At the left-hand end of line D in FIG. 3A, the Eccles-Jordan circuit comprising tubes 77 and 78 is shown as operating in its normal mode wherein it is operated to the abnormal state in response to each input pulse but reverts to the normal state after a short while so that it can again respond to the next trigger pulse which arrives.

Under the presently-assumed conditions, the local counter has its units counting tube 75 conductive on the No. 5 cathode so that tube 105 is conductive and the Eccles-Jordan circuit of tubes 77 and 78 can operate for a brief interval as a true bi-stable state circuit. In other words, it stays in the state where tube 78 is conductive until the next input pulse operates it again back to the normal condition where tube 78 is cut off. In FIG. 3A, it is shown at line D that the Eccles-Jordan circuit restores to the normal condition where it provides an elevated potential only when the next line pulse occurs which then advances counter 20 one step but cannot affect counter 26 because the Eccles-Jordan circuit is then not operated in the direction which produces the required counter operating pulse. Such next line pulse does, however, restore the Eccles-Jordan circuit so that it can operate in the normal manner in response to the pulse following which actuates relay PC. In other words, the line pulse which operates relay PC and advances the offset counter from step 20 to step 21 operates the Eccles-Jordan circuit, but not in the proper direction to cause it to produce a pulse which will operate the local counter since only that direction of operation which results in tube 78 becoming conductive provides a negative-going pulse that will operate counting tube 75. The local counter cannot operate at this time and it is not until the next line pulse occurs which operates the offset counter to step No. 22 that the Eccles-Jordan circuit will be operated again in such a direction that a trigger pulse will occur for operating the local counter from conditions 35 to 36. One count has, in effect, been missed by the local counter so that the difference between its count and that of the offset counter is now 14 counts whereas, previous to this, the difference was 15 counts. Every time the local counter has its units counting tube 75 in the number 5 counting condition, i.e., at counts 45, 55, et cetera, the same sequence of events will occur so that another count is missed by the local counter. From this, it can readily be seen that the average counting rate of the local counter has been reduced by approximately 10 percent so that the two counters can be gradually brought back into synchronism within five cycles or less.

Assume now that the local counter is running behind the offset counter so that its counting rate must in effect, be increased if it is to catch up with the offset counter. Under these circumstances, when the local counter reaches count 99 so that the control grid of tube 90 is driven into the conductive region, neither of the relays R1 or R2 will be picked up at this time since the offset counter will then be somewhere in the range of 100–149 inclusive. Consequently, a circuit will now be completed from the plate of tube 90, through back contact 37 of relay R1 and back contact 40 of relay R2 to the winding of relay F (see FIG. 1). When relay F picks up, a stick circuit is completed to hold this relay energized thereafter through the winding of relay F, back contact 110 of relay S, front contact 102 of relay F, back contact 103 of relay R, and through resistor 104, to ground.

Now, each time that the units counter tube of the local counter reaches the No. 5 step, so that tube 105 becomes conductive, the substantially grounded plate of the tube 105 will be connected through back contact 81 of relay S and front contact 111 of relay F to the plate of tube 112 and also through capacitor 113 to the junction of resistors 114 and 115 connected from the grid of tube 116 to (B+). Tubes 112 and 116 are interconnected to form a one-shot multivibrator, and the negative pulse which is applied to the control grid of tube 116 each time that the units tube 75 reaches the No. 5 step operates this flip-flop circuit from the normal condition wherein tube 116 is conductive to the opposite condition wherein this tube is cut off and tube 112 is conductive.

The operation of this one-shot multivibrator is illustrated at line H of FIG. 3B. Lines A, B and C of FIG. 3B correspond to lines A, B and C of FIG. 3A, and line D shows the operation of the Eccles-Jordan circuit comprising tubes 77 and 78 and illustrates that it is operated from the normal condition and produces a trigger pulse (line E) which advanced the local counter to step No. 55 (line F) at the same time the offset counter 20 is advanced to step No. 67. Both the flip-flop circuit comprising tubes 77 and 78 and also the one-shot multivibrator comprising tubes 112 and 116 are now in the abnormal condition so that tube 78 is conductive and tube 116 is cut off. The time constant for the one-shot multivibrator including tubes 112 and 116 is selected so that it will not revert to the normal condition until after the modified Eccles-Jordan circuit has been restored to normal with tube 78 cut off, as illustrated at lines D and H of FIG. 3B. As soon as the one-shot multivibrator restores itself to its normal state, tube 116 becomes conductive and there is an abrupt decrease in its plate potential which is applied through capacitor 117 and through the parallel combination of resistor 107 and capacitor 108 to the control grid of tube 77, and this pulse immediately drives the Eccles-Jordan circuit from its normal condition so that tube 78 again becomes conductive and another negative-going voltage variation appears at the plate of this tube. This negative-going voltage variation is applied through capacitor 86 through resistor 82 to one of the guide electrodes of tube 75 and through delay circuit 83 to the other guide electrode so that an additional step is taken by counting tube 75. After this operation of the Eccles-Jordan circuit, it again restores itself to the normal condition where tube 77 is conductive in ample time, prior to the next-occurring trigger pulse resulting from the dropping away of relay PC, so that it will produce a further operation of the Eccles-Jordan circuit and a further advance of one step by counting tube 75. Consequently, one additional input pulse has been applied to the local counter, so that it has advanced one step with respect to the offset counter. Each time that the units counting tube 75 has its No. 5 cathode conductive, one additional trigger pulse is applied to tube 75 so that, in effect, its counting speed is increased approximately ten percent above the normal rate. Therefore, it will, within a few complete cycles, catch up with the offset counter.

Assume now that the offset and local counters are initially out of synchronism by twelve counts. When the local counter reaches count 55, an extra input pulse is applied to it to drive it to step 56 so that, on subsequent steps, the difference between the two couners has been reduced to 11. Eventually, when the local counter is on count 99, the discrepancy between the two counters may have been narrowed to the point where the local counter is only slightly behind the offset counter. When this occurs, it is necessary to continue to operate the local counter fast for one more cycle so that when it next reaches count 99, it is slightly ahead of the offset counter. At this time the local counter is driven to position 00 where it is locked until the offset counter also reaches position 00. Then the local counter is released and the two counters remain in perfect agreement until a new offset change is initiated. Thus the final connection which brings the two counters into perfect agreement is obtained by stopping the local counter. This stopped condition never lasts for more than ten drive pulses and on the average is only for 5% of a cycle.

More specifically, when the local counter reaches count 99 so that a conductive voltage is applied to the control grid of tube 90, at that time relay R2 will be energized since the grid of its associated tube is connected to the number 9 cathode of the tens counting tube 63 in the offset counter. In other words, relay R2 is picked up whenever the offset counter registers any count from 90 through 99 inclusive. With relay R2 picked up and relay R1 dropped away, the plate current of tube 90 will pass through back contact 37 of relay R1 and front contact 40 of relay R2 to the winding of relay R. As soon as relay R picks up, a stick or holding circuit will be provided to maintain this relay picked up even though tube 90 becomes non-conductive as the local counter advances from step 99, and this stick circuit includes the winding of relay R, front contact 120 of relay R2, back contact 121 of relay R1, and front contact 103 of relay R through resistor 104 to ground.

With relay R now picked up, front contact 80 of this relay is closed so that ground is directly applied to the control grid of tube 77. The normal condition of the Eccles-Jordan circuit is that wherein tube 77 is conductive, and, obviously, the grounding of the control grid of this tube will drive it to cut off since the common cathode connection of tubes 77 and 78 is above ground by virtue of the plate-cathode current of the conducting tube passing through the common cathode resistor 122. Thus, as soon as relay R picks up, the Eccles-Jordan circuit is operated from its normal condition and since this requires that tube 78 become conductive, a negative-going trigger pulse is applied to both guide electrodes of the units counting tube 75, thereby causing the local counter to advance from count 99 to count 00. The delay in conduction of tube 90 created by resistor 92 and capacitor 91 assures that the modified E-J comprising tubes 77 and 78 will have reverted to the normal condition with tube 77 conducting before relay R closes its front contact 80. This assures that closing of contact 80 will create another drive pulse for the local counter and advances it to position 00.

With ground being applied directing to the control grid of tube 77, it is impossible for the Eccles-Jordan circuit to revert to its normal condition with tube 77 conductive and it must, therefore, remain in the abnormal condition throughout the time that relay R remains picked up. The length of time that relay R remains picked up is, in turn, dependent upon the length of time that relay R2 remains picked up to hold its front contact 120 closed. The energization of relay R2 is dependent, in turn, on the voltage which is obtained from the number 9 cathode of tens counting tube 63 and, from this, it is apparent that relay R2 will remain picked up until the offset counter has advanced to count 00. At that time, the offset counter will be in exact synchronism with the local counter since the latter counter was previously operated to step No. 00 at the instant that relay R first picked up and operated the Eccles-Jordan circuit from its normal condition. When the offset counter reaches step No. 00, thereby releasing relay R2 and consequently also relay R, the Eccles-Jordan circuit is free to revert to the normal condition with tube 77 conductive since front contact 80 of relay R is now open again, and this also means that this circuit is thereafter capable of going through a cycle of operation in response to each trigger pulse resulting from an actuation of relay PC so that the required input pulses can be obtained for counting tube 75 to advance the local counter step-by-step in synchronism with the offset counter.

This latter mode of operation is graphically illustrated in FIG. 3C. Lines A, B C of this FIG. 3C correspond generally to the lines A, B and C of FIGS. 3A and 3B respectively. The particular actuation of relay PC which operates the Eccles-Jordan circuit and advances the local counter to step No. 99, thereby causing tube 90 to become conductive also advances the offset counter to step No. 97 as shown at line C. Since the offset counter is clearly within the range of 90 to 99, relay R2 is picked up, and a circuit is completed to energize relay R (see line G). However, line G shows that the actual picking up of relay R is delayed for some time after the local counter has advanced to count 99, and this delay is long enough to permit the Eccles-Jordan circuit to revert to its normal condition. The delay is provided by resistor 92 and capacitor 91 in the grid circuit of tube 90 which prevent an instantaneous rise in the grid voltage and plate current of tube 90. This delay is necessary in order that the actual picking up of relay R and the closure of its front contact 80 will only occur when the Eccles-Jordan circuit is in a condition where it can be operated in response to the closure of front contact 80 and produce another trigger pulse, shown at line E, which will operate the local counter to count 00. Obviously, it can do so only when it has reverted to the normal condition in which tube 78 is cut off since, only then, can tube 78 be driven to conduction and generate a negative-going trigger pulse which will operate the local counter.

Subsequently, the local counter is prevented from further operations while relay R remains picked up because tube 77 is forced to remain cut-off and tube 78 conductive. In the meantime, the offset counter continues to operate a single step in response to each line pulse. Eventually, when the offset counter reaches 00, relay R drops away (see lines C and G), and this permits the Eccles-Jordan circuit to be restored to its normal condition so that the next trigger pulse produced upon the termination of a line pulse will produce a normal operation of the Eccles-Jordan circuit and advance the local counter from the No. 00 step to the No. 01 step at the same time that the offset counter is operated to the No. 01 step.

On any preselected count, the local counter may provide a control to the apparatus at the controller location denoting the beginning of a new signal cycle. The local counter may also provide a different control upon some other count to indicate the time of occurrence of the cycle split or to indicate, in a multi-phase system, the respective times of occurrence of the several cycle splits. Since the local counter is ordinarily in synchronism with the offset counter, and since the relative phases of the several offset counters at the respective controller locations is preselected in accordance with a desired signal progression, it is convenient to select step No. 00 of the local counter as the time for the start of a new cycle. To accomplish this, the No. 0 cathode of the units counting tube 75 is connected through a resistor 125 to the control grid of triode 126 in FIG. 2D, and the No. 0 cathode of the corresponding tens counting tube 76 is connected through a diode 127 to this same control grid. Accordingly, on step No. 00 of the local counter, the normal negative cut-off bias for tube 126 is overcome, and this tube then becomes conductive. When this happens, there is a momentary flow of charging current for capacitor 128 through the plate-cathode circuit of tube 126 so that the offset relay OR is briefly energized. When capacitor 128 becomes charged, the current decreases so that relay OR drops away again. For a brief interval, relay OR is picked up to demarcate the beginning of a new signal cycle. Relay OR does not pick up when tube 126 is subsequently cut off because the associated resistor is large enough to limit the discharge current of capacitor 128 to a value well below the pick up current of relay OR.

As previously mentioned, the time of occurrence of any cycle split may be preselected to occur upon any one of the hundred different steps registered by the local counter throughout each complete cycle since the local counter registers one hundred discrete counts on each cycle and the occurrence of any phase may be made to take place upon any preselected count of the local counter. In addition, the one or more cycle splits demarcated by the local counter may be varied in their timing in dependence upon a control signal received at each controller location from the central office as previously pointed out. Thus, if line wires L4 and C are deenergized, the split selector relay SS will be dropped away and one particular cycle split value will be chosen (or one particular set of cycle split values in the event that the controller is for use at a multiple phase intersection). However, if these same line wires are energized so that relay SS is picked up, a different cycle split or set of cycle split values will be selected.

It is undesirable to vary the desired value of cycle split in the middle of a cycle since this might well cause a particular portion of the cycle to be skipped or, alternatively, to be repeated. It is recognized that the cycle split will, under foreseeable conditions, never occur contemporaneously with the beginning of any signal cycle which is when the local counter is at step No. 00. For this reason, the control of the relay S which actually selects the cycle split is so arranged that the condition of this relay can only be altered at the time of step No. 00 of the local counter even though the split selector relay SS may change its condition at any time in the cycle, i.e., whenever a new cycle split control is transmitted from the control office. To effect this arrangement, the split relay S is shown as having an energizing circuit which includes a front contact 133 of relay OR (see FIG. 2D). When the local counter reaches step No. 00 and relay OR is momentarily picked up as previously described, and assuming that at that same time relay SS is picked up so that its front contact 134 is closed, then relay S will be energized through this front contact 134 and through front contact 133 of relay OR. When relay S picks up it will, thereafter, remain picked up throughout that cycle since, upon the dropping away of relay OR as the local counter advances to step No. 01, a stick or holding circuit is completed for relay S through its own front contact 135 and through back contact 133 of relay OR. (It will be recognized that relay S must be provided with sufficient slow-releasing characteristics so as to remain picked up during the cross-over time of contact 133.) If, however, at the time that relay OR momentarily picks up to close its front contact 133, relay SS is dropped away so that its front contact 134 is open, there will be no circuit completed to energize relay S and this relay will drop away. Thereafter, when relay OR drops away, relay S will remain dropped away even though back contact 133 closes since front contact 135 of relay S will now be open. Thus, it will be seen that throughout any given cycle demarcated by the local counter as it steps through the various steps from Nos. 00 to 99, relay S will be either picked up or dropped away, in accordance with whether relay SS was picked up or dropped away, respectively, at the time that the local counter went through step No. 00. There is no opportunity, therefore, for relay S to change its condition in the middle of any signal cycle demarcated by local counter 26.

In FIGS. 2D and 2F, two split relays SR1 and SR2 are shown, each being actuated at a different preselected point in the cycle and thereby demarcating, together with the offset relay OR, three distinct phases. Only a single split selector relay is shown, however, and this one split selector relay SS can, therefore, select either of two alternative times of operation of relays SR1 and SR2. In other words, when relay SS is dropped away so that relay S will be dropped away throughout any cycle, then both relays SR1 and SR2 will operate upon preselected times $t_1$ and $t_2$ of the local counter; but if relay S is picked up, then relays SR1 and SR2 will operate at different time $t'_1$ and $t'_2$ in the cycle.

Considering now the specific circuits shown in FIGS. 2C and 2D and the particular switch positions shown, it will first be assumed that relay S is dropped away. Tube 130 can then become conductive only when the local counter reaches step No. 56. More specifically, the control grid of this tube is connected through resistor 131 and through back contact 132 of relay S to a rotary contact 136 which is shown, for purposes of illustration, as being in a position where it is connected to cathode No. 5 of the tens counter tube 76. At the same time, the grid of tube 130 is also connected through diode 137 and back contact 138 of relay S to rotary contact 139 which is shown as connecting to cathode No. 6 of the units counter tube 75. It is only when the local counter registers count 56 so that cathodes 5 and 6 of the tens and units counting tubes 76 and 75 are conductive that the normal cut-off bias on the grid of tube 130 will be overcome. This tube then conducts plate current through capacitor 129 and energizes the winding of relay SR1.

As soon as the local counter advances to step No. 57, the grid voltage of tube 130 again goes to cut-off. Even if the local counter should stay for a time on step No. 56, as may occur when the local and offset counters are being synchronized, the energization of relay SR1 will be momentarily because of the effect of capacitor 129 connected in series with the winding of this relay.

At a later time in the cycle, when the local counter has reached count 86, relay SR2 is momentarily energized. More specifically, the control grid of triode 140 is connected through resistor 141, back contact 142 of relay S, and through rotary contact 143 to cathode No. 8 of tens counting tube 76. At the same time, this same control grid is connected through diode 144 and back contact 145 of relay S and also through rotary contact 146 to cathode No. 6 of the units counting tube 75. Both these counting tube cathodes are normally at a negative potential and, as long as either is negative, tube 140 is biased to cutoff. However, on step No. 86, both these cathodes go positive and tube 140 becomes conductive so that relay SR2 picks up momentarily.

From the description given thus far, it will be apparent without further detailed description that if relay S is picked up, both relays SR1 and SR2 will operate upon different preselected counts of the local counter, dependent entirely upon the pre-established positions of the respective rotary switches which will then be included in the grid circuits of tubes 130 and 140. The actuation of relay SR1 will be dependent upon the positions of tens and units selecting switches 147 and 148, respectively, and the actuation of relay SR2 will be dependent upon the actuation of tens and units selecting switches 149 and 119, respectively.

To one skilled in the art, it will be apparent that the apparatus thus far described for controlling the offset relay OR and the split relays SR1 and SR2 will have considerable utility by itself when used in connection with various presently-known types of traffic signal controllers. Thus, it may be considered that one aspect of the present invention lies in the provision of a control system comprising, at each controller location, a means which is operated to demarcate the starting time of each signal cycle for that particular controller and another means which is operated at the time of the desired split between the respective phases of the cycle. Moreover, it is contemplated that the relative offset times at the various controller locations shall be maintained by means of a control signal which is repeatedly transmitted from the central office to each controller location and that there shall, moreover, be means provided by which, at the central location, a different arrangement of offset values for the different controller locations can be selected at will and also different predetermined values of cycle split.

Another aspect of the present invention is, however, concerned with novel controller apparatus using electronic timing circuits and being especially adapted for use with the centralized control apparatus thus far described. Moreover, the invention is further concerned with controller apparatus which is especially adapted for use in a semi-actuated system wherein, although the offsets and cycle splits are positively controlled from the central location, considerable flexibility is nevertheless provided at any controller location so that it becomes possible to skip a phase if there is no traffic detected on the corresponding approaches and also to so arrange the system that the duration of the green time will be a function of the amount of traffic detected on those approaches, thereby making it possible to shorten the vehicle-actuated phase and lengthen the amount of green time displayed on other phases.

Before considering the detailed circuits of FIGS. 2E–2H, reference will be made to FIG. 4 which diagrammatically illustrates a typical intersection of three streets which lends itself to a three-phase signal system at the intersection. Signals SA are provided for the artery and signals SB for the cross street. Signals SC are provided for the diagonal, and vehicle detection apparatus 150 is provided to detect vehicles approaching the intersection while travelling along the cross street. A diagrammatic representation is shown in the right-hand lane of the cross street to denote the vehicle detection zone, which, when occupied by a vehicle, causes the detection apparatus 170 to provide a distinctive output signal which will be utilized in a manner described hereinafter. The street arrangement shown in FIG. 4 is, of course, intended to be merely typical of the many different kinds of arrangements that may be encountered, and this drawing has been provided merely to facilitate in the description of the circuit details of the system shown in FIGS. 2A–2H.

Figure 4:
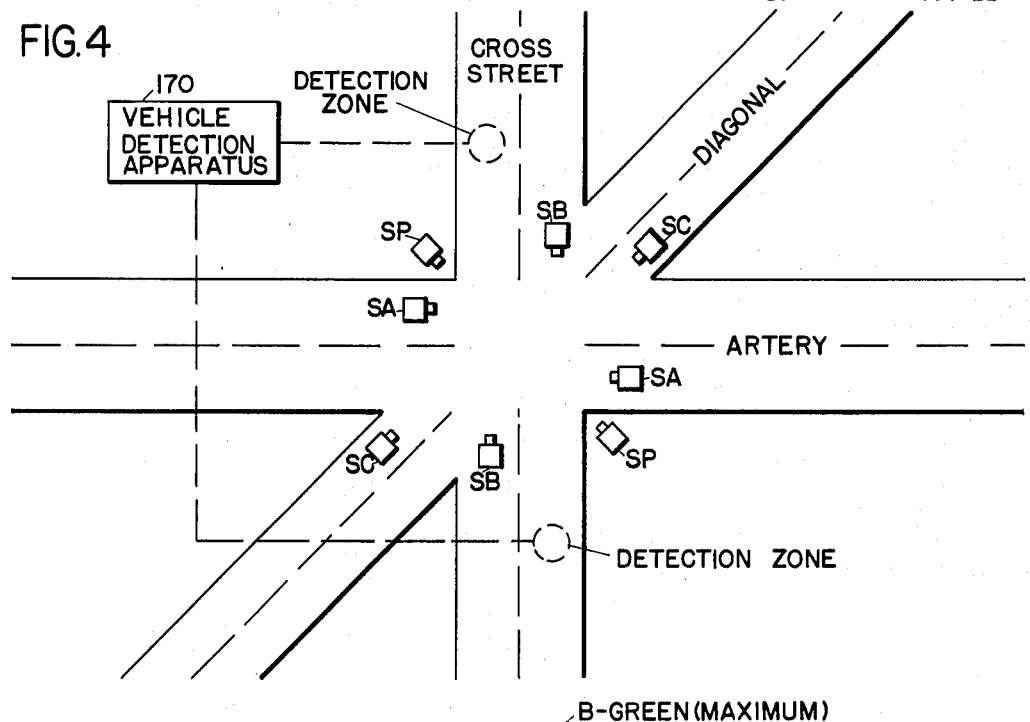
FIG. 4 is a diagrammatic illustration of a typical intersection having traffic signals which may be controlled by the controller shown in FIGS. 2A–2H.
Figure 5:
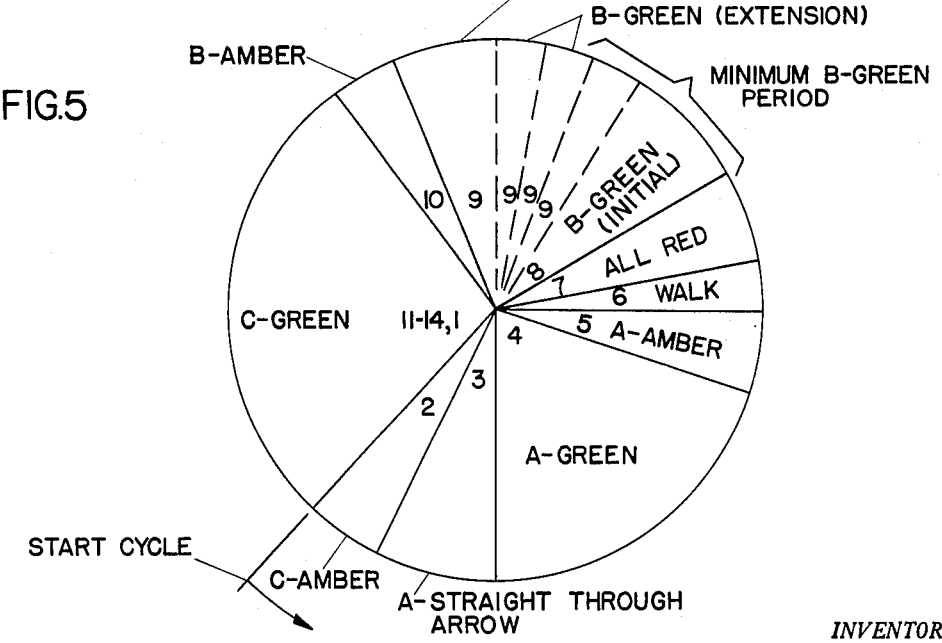
FIG. 5 is a polar diagram illustrating the sequence of operation of the signals of FIG. 4.

This latter comment applies equally well to the polar diagram of FIG. 5 which illustrates one possible sequence of signal conditions which may be provided for the intersection of FIG. 4. Thus, if a typical cycle is considered as starting, where indicated, with the termination of the C-green phase, it is shown that this is followed by a relatively short, fixed amber period for the C-phase and it will be recognized, of course, that all other signals are red at this time. At the end of the amber period for this phase, there occurs a short period which is devoted to a straight-through green for the artery. Only the fixed, predetermined time of the C-amber phase intervenes between the occurrence of the cycle-start time and the display of the green arrow which permits traffic to flow along the artery. In effect, therefore, the start of traffic flow along the artery is governed by the occurrence of the cycle start signal and is thus determined by the time of starting of the local cycle as demarcated by local counter 26. From this, it also follows that the relative artery-green starting times for successive controllers is determined by their relative offset times, as is required if vehicles are to encounter successive green signals while travelling along the artery.

At the termination of this straight-through green period for the artery, a green signal is provided for all artery traffic and, following this, an amber signal. When traffic on the artery receives a red signal, the pedestrian "walk" signal SP is displayed for a brief interval and, as is practiced in many municipalities, pedestrians are now permitted to cross the intersection in any direction while all vehicular traffic is halted. Following the predetermined "walk" time, all signals are red including the pedestrian signal for a predetermined length of time to give an opportunity for pedestrians to clear the intersection, and following this, signal SB is controlled to display a green aspect. The cross street is vehicle-actuated as shown in FIG. 4 and thus the green time displayed by signal SB is a function of the traffic on the diagonal. In any event, the green time consists of an initial interval followed by at least one vehicle extension period. If no further vehicles are detected, the green time will then terminate on the cross street; however, if additional vehicles are detected, the green time will be extended a predetermined amount for each vehicle detection. This will continue until a maximum green signal time has elapsed, at which time the green signal will terminate and be followed by a predetermined length of amber time for signal SB. Following the completion of this amber period, a green signal is displayed by signal SC to the diagonal traffic, and this period is terminated by the beginning of the next signal cycle as already explained. It will, of course, be appreciated that the succession of signals shown in this FIG. 5 is also entirely arbitrary and that any desired arrangement of signals may be provided, and that the control system of the present invention will operate in the required manner to effect the desired signal display.

FIG. 2H illustrates a cam unit which actually controls the energization of the various signal lamps for the individual signals SA, SB, SC and SP. Included in the cam unit are a plurality of cams, each represented diagrammatically in the drawings by a corresponding one of the contacts 150–162. A typical one of these cams is shown in FIG. 6. All of the thirteen different cams represented by the contacts 150–162, respectively, are preferably assembled into one rotatable unit which is revolved by the cam drive 166 through fourteen successive rotary positions. As shown, each cam may have any number of segments from 0 through 14 so that, on each of the fourteen different rotational positions thereof, an associated movable contact 163 may either make or break a circuit with a fixed contact 164 dependent upon whether the cam segment then opposite the cam follower 165 is present or has been broken out. Preferably, the cam is formed of a plastic material and the various segments are so formed that any may readily be broken out. If the cam segment is broken out, cam follower 165 falls into the recess and contacts 163 and 164 close, but if the cam segment has not been broken out, the cam follower rides upon the segment, and the contacts will open. In FIG. 2H, a numeral or series of numbers adjacent each pair of these contacts designates the particular rotational positions of the respective cam in which the contacts are closed. Thus, contact 150 is closed only when the assembly of cams is in position No. 1, but contact 156, for example, is closed whenever the various cams are in positions Nos. 1, 2 or 6 through 14, inclusive.

The cam drive 166 operates the plurality of cams from one position to the next successively. Each momentary closure of front contact 167 of step relay SL (see FIG. 2H), followed by an opening of this same contact, actuates the cam drive 166 to advance the various cams from one position to the next. The cam drive 166 also operates a rotary contact 168 so that it will, on each successive one of the fourteen different rotational positions of the cam assembly, make contact with a different fixed contact, thereby permitting electrical energy from the (B+) source to be applied to a selected one of the fixed contacts 1 through 14. For example, if the assembly of cams represented by contacts 150–162 is in position No. 4, contact 168 is then in contact with the fixed contact designated "4," and so on.

It will be assumed that the cam unit is initially in position 1. At such time, contact 150 is closed so that energy is applied to the green lamp of signal SC. As for signals SA and SB, their red signal lamps are energized through closed cam contacts 156 and 162, respectively. Also the pedestrian signal SP has its "Don't Walk" sign illuminated through closed cam contact 158.

As described previously in connection with FIG. 5, it is the start of each new signal cycle as represented by the picking up of relay OR, that terminates the green period for signal SC. Accordingly, this picking up of relay OR must operate the cam unit from position No. 1 to position No. 2, closing cam contact 151 and opening cam contact 150 and thereby terminating the green period of signal SC. Thus, since only the fixed amber time of signal SC intervenes between the green signal period of signal SC and the green signal period of signal SA, it may be considered that the picking up of relay OR determines, in effect, the starting time of the green period of signal SA. This is as it should be in order that the artery green period will start with the desired offset as previously stated.

Since the cam unit is assumed to be initially in position No. 1, rotary contact 168 is also in position No. 1, and energy from (B+) is applied over wire 175 and through closed front contact 176 of relay CK and then over wire 177 to the heel of contact 178 of the offset relay OR. Front contact 178 is normally open but is closed momentarily, as previously described, when the local counter reaches step No. 00 denoting the beginning of a new cycle at the controller. When contact 178 closes, the (B+) energy is applied over wire 179 and through resistor 180 to the control grid of triode tube 181. As will shortly be described, this application of positive voltage to the grid of tube 181 results in a momentary picking up of relay SL. Front contact 167 of this relay then closes and energizes the cam drive 166 so that the assembly of cams will operate from position No. 1 to position No. 2. Thus, it can be seen that the actuation of the offset relay OR has been effective to initiate a new cycle by terminating a display of a green indication by signal SC and causing a closure of contact 151 so that an amber signal will now be displayed by signal SC for a short, fixed interval, following which a green indication will be displayed by the artery signal SA.

Referring now to the circuit diagram shown in FIGS. 2E and 2F which includes tubes 181 and 182 as well as relays SL and SLP, tube 182 is provided merely in order that a substantially fixed cathode voltage will be provided for tube 181. Thus, the control grid of tube 182 is connected to the junction of voltage dividing resistors 183 and 184 connected in series between (B+) and ground. Tube 182 is, therefore, conductive and, with a fixed grid voltage, its cathode voltage is then also substantially fixed so that a predetermined cathode voltage is available for the cathode of tube 181.

Normally, the cathode voltage of tube 181 is sufficiently high that this tube will be cut off and no current will flow in the plate circuit and through the winding of relay SL to pick this relay up. However, when a positive grid voltage is applied to the control grid, as through resistor 180, tube 181 conducts a high-level of plate current so that relay SL picks up. Capacitor 185 is normally maintained in a discharged condition since it is connected in parallel with resistor 186 through closed back contact 187 of relay SL. However, once relay SL picks up and closes its front contact 187, this capacitor 185 is connected through resistor 188 in series with the winding of relay SL. A charging current thus flows through the winding of the relay and through capacitor 185, thereby maintaining relay SL energized for a predetermined interval dependent upon the time constant for the charging of capacitor 185. In other words, once tube 181 has become conductive so as to pick up relay SL, this relay will be maintained in a picked-up condition for a predetermined interval thereafter even though the grid voltage of tube 181 may drop below the level required to maintain tube 181 sufficiently conductive. As previously mentioned, the picking up of relay SL causes a pulse of electrical energy to be applied to cam drive 166 to advance all the cams one step.

When relay SL picks up, its front contact 189 closes, and this completes an obvious circuit through the winding of relay SLP so that this relay also picks up. As long as relay SL is picked up, this circuit through the winding of relay SLP will be maintained. When relay SL drops away, however, the circuit will be opened but relay SLP cannot immediately drop away since the then-charged capacitor 190 will discharge for a brief interval through the winding of relay SLP. Therefore, relay SLP can only drop away some predetermined time after relay SL has dropped away.

Basically, relay SLP serves four functions. When it becomes energized it opens both possible pick-up circuits for relay SL by grounding the grid of tube 181 thus cutting off the tube completely and by opening the circuit from the manual switch 191. Thus, whenever relay SL is picked, relay SLP follows and quickly disconnects the SL pick up circuit. Relay SL then remains up until charging current to capacitor 185 is sufficiently reduced to release the relay. Therefore, every operation of relay SL is of a closely controlled predetermined duration, adequate to operate the cam drive 166 and short enough to provide snappy operation of the system.

Secondly, relay SLP serves to discharge capacitor 204 so that fixed timing provided by this capacitor and subsequently described will be consistent.

Third, relay SLP guarantees a minimum interval between pulses of relay SL to allow the cam drive 166 to release. Thus, if resistor 180 is returned directly to B(+) in several adjacent positions of switch 168 in order to skip quickly over these positions, a procedure resorted to for using up extra cam positions as will subsequently be described, relay SL will release shortly after relay SLP picks up as was just described. Relay SL will then remain down only until relay SLP falls, since falling of relay SLP will remove the ground from tube 181 grid and allow tube 181 to again conduct. Thus, the time it takes for relay SLP to fall will determine the interval between pulses to cam drive 166; and, the time it takes for relay SL to fall will determine the length of the pulses. The cam unit will continuously step until a position is reached in which switch 168 does not apply energy directly to resistor 180.

Fourth, relay SLP is provided in association with relay SL in order to permit a manual step-by-step operation of the cam unit. Thus if the manual stepping switch 191 is actuated, a ground is applied through this contact and through back contact 192 of relay SLP to the left-hand terminal of relay SL, thereby causing relay SL to pick up. When relay SL does pick up, relay SLP is also picked up as previously described and, when this occurs, a stick or holding circuit is completed through front contact 192 of relay SLP, whereby ground is applied to the left-hand terminal of relay SLP as long as switch 191 is maintained closed. Relay SLP remains picked up, but ground is now removed from the left-hand terminal of relay SL by reason of the open back contact 192. Therefore, relay SL will now drop away, but additional actuations of relay SL cannot occur even though the switch 191 is maintained closed since, with relay SLP picked up, a ground cannot be applied through back contact 192 to the left-hand terminal of relay SL. It is not until the switch 191 is opened to permit relay SLP to drop away that a ground can again be applied to complete a circuit through the winding of relay SL and thereby actuate this relay again. In other words, a single closure of switch 191, followed by an opening thereof, will advance cam drive 166 one step. However, if switch 191 is maintained in a closed position, there can still be no more than a single actuation of cam drive 166.

It has already been described how the actuation of the offset relay OR has initiated the beginning of a new cycle by energizing cam drive 166, thereby opening contact 150 and closing contact 151 in the cam unit. At the same time that contact 151 is closed, rotary contact 168 makes contact with fixed contact No. 2. At such time, the (B+) energy applied through contact 168 is also applied over wire 200, through potentiometer 201, over wire 202, and through resistor 203 to the control grid of tube 181. This application of a positive potential through the resistance provided by potentiometer 201 will again result in driving the control grid of tube 181 sufficiently positive that the plate current of this tube will pick up relay SL. However, tube 181 will, under these circumstances, not become conductive immediately upon the application of this voltage to wire 202 because of the fact that capacitor 204 must first be charged. Normally, this capacitor is substantially fully discharged and there can thus be no instantaneous increase of voltage on wire 202. However, as capacitor 204 charges exponentially, the voltage on wire 202 rises and finally the control grid of tube 181 is driven sufficiently far positive that this tube will conduct and pick up relay SL. The length of time that it takes for capacitor 204 to charge sufficiently to provide the required conduction level in tube 181 is, of course, dependent upon the time constant for the charging of this capacitor 204. This, in turn, is dependent not only upon the amount of capacitance provided by capacitor 204 but also by the amount of resistance provided by potentiometer 201. Accordingly, potentiometer 201 is adjusted so that the time that elapses from the time the cam unit moves to position No. 2 until relay SL picks up equals the desired amber time for signal SC which may be in the order of three seconds.

Assuming now that relay SL has picked up and that cam unit 195 has been operated to position No. 3, contact 152 will be closed and the red signal lamp of signal SC will be energized. At the same time, contact 153 of the cam unit will be closed, and this will energize the through-traffic arrow signal lamp of signal SA. Rotary contact 168 now completes a circuit through the No. 3 fixed contact to apply electrical energy to wire 205 and thence through potentiometer 206, to wire 202. The operation now will be the same as that previously described in connection with amber period of signal SC in that the length of time required for tube 181 to become conductive and actuate relay SL will depend upon the resistance provided by potentiometer 206. This potentiometer is, accordingly, adjusted so that the desired through-traffic signal time will be displayed by signal SA. At the end of this predetermined interval, relay SL will pick up and operate cam unit 195 to position No. 4 where contact 154 is closed so that the green signal lamp G of signal SA will be illuminated.

With cam unit 195 in position No. 4, energy is applied through rotary contact 168 to wire 207. The energization of wire 207 is not applied through a potentiometer to the grid circuit of tube 181 in such a manner as to charge capacitor 204, however, but is instead routed through a contact of split relay SR1. In other words, it is desired that the time of termination of the green signal by SA shall denote a division point between successive phases and shall be governed by the actuation of one of the two cycle split relays, in this case, the first split relay SR1. In this way the amount of time allotted to the A phase can be controlled by the cycle split control then in effect and can be adjusted as desired; it is not restricted to a single value as would be the case if the timing for this phase were only governed locally by the controller. Accordingly, the energy on wire 207 is applied through front contact 208 of the check relay CK and over wire 209 to the heel of contact 210 of split relay SR1. When relay SR1 picks up at the predetermined count of the local counter, the energization is further applied through closed front contact 210 of relay SR1 to wire 179, from whence it is applied, as previously explained, through resistor 180 directly to the control grid of tube 181. Since the energy is applied directly to the control grid of tube 181, it is not necessary to charge capacitor 204 and tube 181 thus becomes instantaneously conductive so that relay SL will operate immediately and advance cam drive 166 a step further to position No. 5. This opens contact 154 to extinguish the green signal by signal SA, but at the same time closes contact 155 so that an amber signal is, instead, displayed by signal SA.

In position No. 5 of the cam unit, contact 168 applies energy through wire 211 and again through potentiometer 201 which, as previously explained, has its resistance value so adjusted as to provide the desired amber signal time. In other words, this same potentiometer 201 may be used to effect the amber timing for all of the phases and not only one. Alternatively, of course, different potentiometers could be provided and each set to a different value so that different amber times could be provided for the respectively different phases.

At the end of the preselected amber time interval for signal SA, relay SL operates again and actuates the cam drive 166 to position No. 6 in which a red signal is displayed by signal SA because contact 156 is then closed. Also, contact 157 is closed and this causes the "Walk" sign in pedestrian signal SP to be illuminated, thereby providing a "Walk" period during which pedestrians may cross the intersection in any desired direction. The duration of this walk period may also be adjusted by the setting of a respective potentiometer 215. Contact 168 is now in position No. 6 so that energy is applied to wire 216 and through potentiometer 215 to wire 202. Accordingly, the length of time required for tube 181 to become conductive is now a function of the resistance provided by potentiometer 215.

When cam drive 166 reaches position No. 7, contact 157 opens to terminate the "Walk" signal and instead contact 158 is then closed so that the "Don't Walk" signal is displayed once more.

From the circuits which are provided for the control of signals SA, SB and SC, it will be noted that the cam arrangement is such that the red signal lamp for each of these signals will be energized when the cam unit is on position No. 6. When the cam unit reaches position No. 7, contact 157 opens to thereby turn off the "Walk" signal and instead energize the "Don't Walk" signal. Each of the other signals continues to display a red aspect, however, in order that pedestrians who have entered the intersection will have time in which to make their way across the intersection.

The length of time during which the "Don't Walk" signal is displayed is also demarcated by a timing circuit in the control grid circuit of tube 181. Thus, the cam unit is in position No. 7 when the "Don't Walk" signal is displayed and, at such time, energy is applied through rotary contact 168, over wire 220, to the winding of a check relay CS, causing this relay to pick up. When relay CS picks up, energy is applied through its front contact 221 and through potentiometer 222, to wire 202, and thence to the control grid circuit of tube 181. Again, the length of time required for tube 181 to become conductive and thus pick up relay SL is dependent upon the preadjusted setting of potentiometer 222, and this adjustment is made to give the desired time for the cam unit to remain in position No. 7.

In the preceding instances, when it has been desired to effect a timing operation in the control grid circuit of tube 181, the energy which was applied through rotary contact 168 was applied directly through a respective one of the timing potentiometers to the control grid circuit. However, in the last-mentioned case where the timing circuit is to demarcate the "Don't Walk" signal period, the energy was not applied directly to a potentiometer from rotary contact 168 but was used instead to energize a relay CS, and a contact of this relay was then used to apply energy through the timing potentiometer to the control grid circuit of tube 181. The reason for doing this comes about as a result of the fact that the controller is intended to operate in the semi-actuated mode with respect to control of signal SB. Accordingly, it is desired to check, ahead of the time that the controller causes signal SB to display a green aspect, whether or not traffic has been detected by the vehicle detectors since the last time that a green signal was displayed to the cross street traffic. If no vehicles have been detected since the last time that a green signal was displayed by signal SB, it will be permissible to skip this phase of the cycle and immediately go to the next phase. As will appear from the description that follows, the actuation of relay CS on that portion of the cycle which immediately precedes the cycle portion which is ordinarily allotted for the display of a green signal by signal SB, makes it possible to determine whether or not the controller should skip the next phase of the cycle. Thus, at the time that relay CS picks up, the condition of relay CR1 is ascertained. If relay CR1 is picked up at the time relay CS picks up, the impending phase cannot be skipped, but if relay CR1 is then dropped away, it is permissible to skip that phase. More specifically, if relay CR1 is picked up, this is an indication that a vehicle on the cross street is awaiting the display of a green aspect by signal SB; however, if relay CR1 is dropped away, no vehicle has been detected and it is then permissible to skip the display of a green signal by signal SB in the coming cycle. When relay SR is picked up, it may be said that this relay is registering a "vehicle call."

The condition of relay CR1 is transferred to the skip phase relay SR which relay actually governs whether or not the next phase is to be skipped. Relay SR can only be operated to one or the other of its two conditions during the time that the check relay CS is picked up which, as previously stated, is during that part of the cycle which immediately precedes the semi-actuated phase. Assuming that relay CR1 remains dropped away indicating that no vehicle is waiting on the cross street, a circuit will then be completed for relay SR through the winding of this relay, through front contact 219 of relay CS, back contact 223 of relay CR1, contact 260, and through back contact 224 of relay EX, to ground. When relay CS drops away at the ends of the "Don't Walk" signal period, a stick or holding circuit holds relay SR through its own front contact 225 and through back contact 219 of relay CS, to ground. Subsequent picking of relay CR1 will then not release relay SR. In other words the position of relay SR is definitely fixed for the next cycle once relay CS falls.

If, on the other hand, at the time that relay CS is picked up, relay CR1 is also picked up, then the just-described pick-up circuit for relay SR cannot be completed since back contact 223 of relay CR1 will be open. When relay CS drops away, relay SR will remain dropped away because, with its front contact 225 open, the stick circuit cannot be completed for relay SR.

Assuming that relay SR is dropped away, denoting that the controller must not skip the next phase of the cycle, and assuming further that the cam unit has just been operated to position No. 8 to terminate the "Don't Walk" period, electrical energy will be applied through rotary contact 168 and through fixed contact No. 8, over wire 226, through back contact 227 of relay SR, through potentiometer 228, to wire 202, and to the grid circuit of tube 181. Another timing operation is thereby effected in the grid circuit of tube 181, and a predetermined fixed time interval demarcated whose length is determined by the setting of potentiometer 228 and which establishes an initial interval for the green period of signal SB. Throughout this time period, the cam unit remains in position No. 8 with contact 159 closed so that energy is applied through back contact 261 of relay KP to the green signal lamp G of signal SB.

At the end of the initial green interval for signal SB, tube 181 becomes conductive to pick up relay SL and this advances the cam unit to position No. 9. In this position, contact 160 is closed so that the green signal lamp of signal SC remains energized over the same circuit as was effective on position No. 8. Also, energy is applied over rotary contact 168 in its No. 9 position, over wire 235, back contact 236 of relay SK, through the winding of the extension relay EX, and through back contact 237 of relay SLP, to ground. Since relay SLP dropped away, the just-described circuit is completed and the extension relay EX picks up. With relay EX now picked up, front contact 240 of this relay is closed, connecting the hub of contact 241 of relay CR to wire 202 and the grid circuit of tube 181. With back contact 224 of relay EX now open, relay CR1 is no longer stuck up and is now free to respond to relay VR as will now be described.

Relay CR1 has its energization governed, in part, by a circuit through back contact 242 of the vehicle detector relay VR which is controlled by the vehicle detection apparatus 170 of FIG. 4. Relay VR is picked up normally, but is momentarily dropped away when a vehicle passes through either of the detection zones interposed in the path of vehicles approaching the intersection along the cross street (see FIG. 4). Each time that relay VR drops away as a vehicle is detected, a circuit is completed through the winding of relay CR1 and through back contact 242 to energize relay CR1.

When relay CR1 picks up, its front contact 241 closes and this connects the heel of contact 241 through resistor 243 to ground. Since contact 241 is now connected through front contact 240 of relay EX to wire 202, each picking up of relay CR1 grounds wire 202 and produces a rapid discharging of capacitor 204 in the grid circuit of tube 181. This ensures that capacitor 204 will first be fully discharged in response to each vehicle detection. When relay VR picks up as a detected vehicle leaves the respective detection zone, back contact 242 opens and relay CR1 drops away. Back contact 241 of relay CR1 then closes, and this connects wire 202 through contacts 240 and 241 and through resistor 244 to the (B+) source. Capicitor 204 charges, with the charging rate being dependent upon the resistance of potentiometer 244. During the time required for capacitor 204 to charge to the point where tube 181 becomes conductive and picks up relay SL the cam unit 195 must stay in position No. 9, maintaining the green lamp of signal SB energized so that the detected vehicle receives a green signal and can enter the intersection. The duration of this vehicle extension interval can be adjusted by varying the value of potentiometer 244 which should at least equal the maximum expected travel time for a vehicle from the time that it leaves the detection zone until it enters the intersection. This ensures that a vehicle detected during the green signal period will ordinarily extend the green period sufficiently to enable it to encounter a green signal when it actually reaches the intersection.

As long as relay EX remains picked up so that its front contact 240 remains closed, each actuation of relay CR1 in response to a further vehicle detection will produce an additional vehicle extension time to the green signal period. Every time that relay CR1 picks up, capacitor 204 is fully discharged, but each time relay CR1 drops away, a new charging action is started which will eventually result in the picking up of relay SL if in the interim, there is no further vehicle detection so that the time interval is permitted to run out. On the other hand, if additional actuations of relay VR continue with the required frequency, the charge on capacitor 204 will not reach a sufficient level to permit tube 181 to conduct and thereby pick up relay SL to terminate the cross street green signal.

If it is assumed that there is a gap in the stream of traffic on the cross street shown in FIG. 4 and that this gap is sufficient to permit the charge on capacitor 204 to increase to the point where relay SL will be picked up, then the momentary closure of front contact 167 of relay SL that results will advance cam unit from position No. 9 to position No. 10. Contact 160 in the cam unit will open to extinguish the green signal lamp of signal SB and contact 161 will close to energize the yellow signal lamp through back contact 245 of relay KP.

At the same time, the rotary contact 168 applies energy through fixed contact No. 10 to wire 246, through back contact 247 of relay SK to wire 248, and through potentiometer 249 to wire 202. From the description already given, it can be observed that potentiometer 249 may be adjusted to give the desired amber time for the signal SB. When the amber time has terminated, relay SL picks up as a result of tube 181 becoming conductive and this advances cam unit 195 a further step to position No. 11 and terminates the amber period of signal SB.

When the amber time for signal SB has terminated and the cam unit has operated to position No. 11, cam contact 162 closes to energize the red signal lamp R of signal SB. At the same time, cam contact 150 closes and energizes the green lamp G of signal SC.

The cam unit is constructed with a predetermined number of rotational positions and fourteen have been illustrated for the cam unit of the present invention. At any controller location, the full 14 positions may be used, but, many times, less than the full number will be used. Unused positions must, nevertheless, be operated through on each cycle and this is accomplished in the present invention by allocating all or some of the unused cam positions to one or more phases of the cycle. In the illustrated embodiment, the extra cam positions 11, 12, 13 and 14 have been allocated to the green phase of signal SC. Thus, as soon as the cam unit has operated to position No. 11, relay SL is operated and this operates the cam unit to position No. 12. More specifically, with rotary contact 168 now in position No. 11, energy is applied to wires 253 and 179 (of FIG. 2E) and through resistor 180 to the control grid of tube 181, thereby immediately making tube 181 conductive and picking up relay SL. When relay SL picks up and falls, the cam unit is operated to position No. 12. In position No. 12, energy is again supplied directly to the grid of tube 180, and this advances the cam unit a further step to position No. 13, and a similar operation takes place to advance the cam unit to position No. 14, and then to position No. 1. Once the cam unit is in position No. 1, it remains in that position until, as previously described, the offset relay OR is actuated which terminates the green phase for signal SC and operates the cam unit to position No. 2.

It will now be assumed that the vehicle-actuated unit, while demarcating the green signal period for signal SB, did not experience any appreciable gap in the traffic on the cross street so that there was at no time sufficient charge accumulated on capacitor 204 to drive tube 181 conductive and thereby advance the cam unit. Obviously, in the event such heavy traffic conditions are encountered, it is, nevertheless, undesirable that the cross street continue to receive an unduly long green signal period since this will lessen the green time for the other phases unreasonably. To prevent this, the green time for the third phase is extended by further vehicle actuations only to some predetermined maximum time denoted by actuation of the second cycle split relay SR2 which demarcates the end of the phase for signal SB and the beginning of the green phase for signal SC. More specifically, since relay EX will be picked up under these circumstances, a circuit is completed through front contact 226 of relay EX, through the winding of relay MX, over wire 214, through front contact 250 of relay SR2, wire 258, front contact 251 of relay CK2, over wires 252 and 235 and through the No. 9 fixed contact, to the rotary contact 168. This circuit is completed when the cycle split relay SR2 picks up to denote the beginning of the third phase. The inclusion of front contact 224 of relay EX in this circuit is for the purpose of ensuring that relay MX will not be operated each time that the split relay SR2 picks up, but only under those circumstances where the volume of traffic detected has produced continued vehicle extensions and the green phase for signal SB has not yet been terminated by the completion of the timing operation in the grid circuit of tube 180. As soon as relay MX picks up, a circuit is completed through its front contact 255 to apply the (B+) energy directly to the control grid of tube 181 over wires 257 and 179 (of FIG. 2E), thereby producing an immediate actuation of the cam unit to the No. 10 position and terminating the the green indication displayed by signal SB.

The fact that the green phase of signal SB has been terminated by operation of relay MX rather than by a gap in the traffic which permitted the completion of a vehicle extension period, means that at least one vehicle approaching the intersection was detected by the vehicle detector but was not afforded sufficient time to actually enter the intersection. This fact must be stored in the system by picking up and holding in the picked-up condition the check relay CR, thereby indicating to the system that, on the next cycle, this phase must not be skipped even though there may be no vehicle detections from that time on until the B-green phase is to start again. Actuation of relay CR1 is accomplished through front contact 256 of relay MX. When this front contact 256 closes, a direct circuit is completed through the winding of relay CR1. As just described, the picking up of relay MX advances the cam unit to position No. 10. However, the energization circuit for relay EX is circuited through rotary contact 168 in its No. 9 position. Therefore, actuation of cam unit 195 to the No. 10 position opens this circuit for relay EX so that it will drop away. As soon as this occurs, a stick or holding circuit is completed for relay CR1 to maintain this relay energized. This stick circuit includes the winding of relay CR1, its own front contact 223, and back contact 224 of relay EX, to ground. This circuit will maintain relay CR1 steadily energized until relay EX picks up in the next cycle in the manner already described. Return of relay EX coil through back contact 237 of relay SLP removes energy from the coil of relay EX before energy is removed from the coil of relay MX. It is the falling of EX which first removes energy from the coil of relay MX. It is therefore assured that a stick will be applied to relay CR1 in ample time since the crossover of relay EX is much faster than the release time of relay MX.

The minimum green signal period for signal SB equals the initial period and one extension period even when there are no vehicle detections after the initial interval has expired. Thus, when the initial period ends, cam unit 195 is operated to position No. 9 and relay EX picks up. A charging of capacitor 204 in the grid circuit of tube 181 will immediately commence, irrespective of whether or not there are any further actuations of relay CR in response to actuations of relay VR. Capacitor 204 will start out in an uncharged condition because relay SLP has removed any charge present thereon during its just completed operation.

It has been described that relay CR1 will be picked up and thereafter maintained in that condition if the phase should terminate as a result of actuation of relay MX upon expiration of the maximum phase time interval. An alternative way of pickup relay CR1 is to have a vehicle detection at any time after the end of the phase B green period which momentarily drops away relay VR and closes back contact 242. Thus, any vehicle detected subsequent to the termination of the vehicle-actuated phase picks up relay CR1 and establishes a stick circuit through back contact 224 of relay EX to maintain the relay up, thereby registering a "vehicle call," and requiring the controller to go through the vehicle-actuated phase on the next cycle.

If the two-position switch contact 260 is moved from the position shown in FIG. 2G to the "Recall" position, front contact 223 of relay CR1 will be shunted and a circuit will be completed to energize relay CR1 through back contact 224 of relay EX whenever the latter relay is dropped away. This ensures that relay CR1 will always be energized at the end of the green phase for signal SC as soon as relay EX has dropped away, and not merely only when the phase has been terminated by actuation of the maximum time relay MX. Under such circumstances, whenever relay CS picks up, relay CR1 will be picked up and this will cause relay SK to be dropped away so that the controller will be required to go into the B phase of the cycle and cannot skip that phase.

It will now be assumed that, throughout the all-red signal period of the cycle just prior to the beginning of the vehicle-actuated phase, relay CR1 is dropped away so that no "vehicle call" is registered and it is thus permissible to skip this phase. When this happens, relay SK is picked up as already described upon the picking up of relay CS and is held up by a stick circuit when its own front contact 225 closes. A circuit is also completed to energize relay KP in parallel with relay SK. When relay KP picks up, its back contacts 245 and 261 open, thereby preventing energization of either the amber or green signal lamps of signal SC as the cam unit steps through positions Nos. 8, 9, and 10. Moreover, front contact 229 of relay KP closes and this applies energy directly to the red signal lamp R of signal SB, thereby ensuring that signal SB will display a red signal all the time that relay KP is picked up.

At the end of the all red interval, the cam unit moves to position No. 8. Energy applied by switch 168 to wire 226 passes through front contact 227 of relay SK to the grid of tube 181 via resistor 180 to immediately terminate dwell-on position 8.

The cam unit is now in position No. 9 and energy is applied through rotary contact 168 to wire 235, through front contact 236 of relay SK, to wire 257, which then produces an immediate actuation of relay SL, driving the cam unit to position No. 10. In position No. 10, energy is applied to wire 246 and through front contact 247 of relay SK again to the same skip bus 257 so that another actuation of relay SL occurs, thereby advancing the cam unit to position No. 11. Once the cam unit reaches position No. 11, further energization is applied to the skip bus 257 so that it advances the cam unit to position No. 12 and from there to positions Nos. 13, 14 and 1 successively in the same manner as previously described. Thus, if relay SK has been picked up on that portion of the cycle immediately preceding the vehicle-actuated phase, the entire third phase will be skipped and the controller will immediately be advanced to the next phase.

If switch 254 is closed, phase B when called for will contain no extension since energy will be applied to tube 181 as soon as the EX relay picks. This feature might be used if phase B were a pedestrian walk phase. It would then be of definite length when called for by operation of a push button and would be skipped when not required. The green interval would consist entirely of the initial period.

In the description given thus far, it has been assumed that the green period for each of the several signals will be properly terminated by an actuation of one of the split relays SR1 or SR2 or the offset relay OR. It is desirable, however, that the system not be dependent exclusively upon the operation of these relays since a failure in the pulse transmission equipment at the central office, a break or short in the line wires, or a failure in any of the apparatus required to actuate these relays at the controller location would produce a complete breakdown in operation of the signals governed by that controller. In order that this situation may be prevented, it is desirable to provide a dial unit which is normally inoperative but will automatically go into operation when there is a failure of the equipment preventing actuation of the split relays and offset relay.

The dial unit is shown in FIG. 2E and comprises a drive mechanism 265 which is normally deenergized but which, when energized, will operate with a synchronous speed and produce synchronous rotation of each of the four dials 266–269. Although the several dials are individually illustrated, they are ordinarily concentric and all rotate together. Each of these dials has a key inserted in its periphery and this key may be located in any of one hundred different radial positions about the dial so that a movable contact such as contact 270 associated with dial 266 may be closed against a corresponding fixed contact 271 when dial 266 reaches a predetermined position as shown in which the key in dial 266 abuts against contact 270.

The normal position of the several dials is that wherein dial 266 closes its movable contact against fixed contact 271. The reason that this is the normal position is that if the drive mechanism has been energized through back contact 273 of deenergized relay CK1, relay CK1 can subsequently be energized and thereby open back contact 273 only when the dial unit reaches the particular rotational position in which dial 266 closes contacts 270 and 271, thereby completing a circuit through the winding of relay CK1. When this happens, the drive unit 265 is immediately deenergized and further rotation of any of the dials is prevented.

From the description that follows, it will be seen that the effect of dials 267–269 as they rotate is to successively close respective contacts at predetermined portions of the signal cycle, and that these contact closures automatically take the place of actuations of the split and offset relays when these relays become inoperative for any reason. More specifically, the dial unit can only be prevented from operating when wire 272 is energized so that relays Ckl and CK2 can be energized, and the presence of electrical energy on wire 272 is, in turn, dependent upon relay CR1 being picked up. It has previously been described that the fact that relay CR1 is picked up and causes energy to be applied to wire 272 is an indication that the counting pulses are being generated by the central office equipment, are properly transmitted over the line wires L1 and L2 to the controller location, and are effective to pulse the relay PR up and down. When these conditions are obtained, it is deemed proper for the dial unit to be locked out of operation and this is attained by actuating relay CK1 in response to the energization of line wire 272, thereby deenergizing dial 265.

The particular position in which the key is placed on dial 266 will determine the rotational position of the dial unit in which it is stopped and thereafter maintained until such time as it is again allowed to rotate. At each controller location, the key in the respective dials 266 is so placed that, if all the dial units should start to rotate simultaneously because of a system failure affecting all the controller locations, they will operate with a predetermined offset for each controller so that some preselected progression can be maintained. Thus, assuming that there is a break in the line wires so that all of the controller locations beyond the break become inoperative in the sense that they can no longer receive the line pulses over line wires L1 and L2, at each such controller location relay CK2 and also relay CK1 will drop away because of a lack of energy on wire 272 and each dial will start rotating. Since each dial will be driven from the commercial 60-cycle power sources that are normally available, each will rotate with synchronous speed and the relative positions of the dials at the various locations will ordinarily be maintained in accordance with their relative starting position of the key on dial 266 at each controller. Although the signal progression which automatically comes into effect when the dials at the several locations start to rotate may not be the most favorable one at that particular time, it is ordinarily considered preferable to having no predetermined progression whatsoever. The offset provided by the dials may be set up as would be desired for nighttime operation. Then by disconnecting the line in the evening, maintenance or shutdown of the central office equipment may be accomplished.

If the controller becomes self-operating with relay CK2 dropped away, a circuit will be established through back contact 176 of this relay and through contact 274 when this contact is closed by dial 267, and this contact closure will take the place of the closure of contact 178 of relay OR. In other words, the termination of the C phase of the cycle will then be dependent upon contact 274 becoming closed in response to rotation of dial 267 to a predetermined rotational position instead of being dependent upon an actuation of relay OR and a closure of front contact 178 of this relay. In this same manner, contacts 275 and 276 which are actuated, respectively, by dials 268 and 269 on different rotational positions of the dial unit will take the place of actuations of cycle split relays SR1 and SR2 since they will provide alternate circuits for energizing skip bus 257 as compared to the circuits which are normally routed through the cycle split relay contacts.

DESCRIPTION OF MODIFICATION—FIGS. 8–11

FIGURES 8 through 11 illustrate a modification of a portion of the invention shown in FIGURES 1 and 2. In the form of the invention shown in FIGURES 1 and 2, it will be recalled that the series of counting pulses which, together with the periodic synchronizing pulses, constitute each successive cycle are transmitted over a pair of line wires L1 and L2 and that additional communication circuits, represented by line wires L3, L4 and C have been shown for the purpose of transmitting additional control information to each of the controller locations. One of the additional communications circuits is used for selecting at the central office the particular offset which is to be in effect at each controller, and another communication circuit is provided to select the desired cycle split.

When an integrated, progressive signal system is being newly installed, if there are sufficient unused communication circuits available between the central office and the various controller locations, it is then quite practical to use the arrangement of FIGURES 1 and 2. However, when such additional communication circuits are not available, it may then be preferable to use the alternative means of FIGURES 8–11 whose outstanding feature is that offset and cycle split controls for each of the various controller locations may be transmitted over the same communication circuit which transmits the positive counting pulses and the negative synchronizing pulses.

In FIGURE 1, it was diagrammatically shown that each cycle was signified by 100 positive pulses which established the clock rate for the system, and that a single negative voltage pulse was transmitted for each 100 positive pulses to signify the end of one complete cycle and the beginning of the next cycle. In the apparatus shown in FIGURES 8–11, no changes are made with respect to the transmission of the 100 positive clock pulses on each cycle, but the number of negative pulses is made variable and governs the offset and cycle split and other additional functions at each controller location. The central office equipment is so organized that the number of negative pulses which are transmitted, starting at the beginning of the cycle, represents both the desired offset and cycle split, and, at each controller location, the number of negative pulses is counted and the offset and cycle split selected in accordance with the registered count. The negative pulses are preferably interspersed between the positive pulses so that the absence or presence of a negative pulse has no effect upon the positive pulse repetition rate. Also, the maximum number of negative pulses which may be transmitted is never as great as the number of positive pulses and all of the negative pulses occur consecutively, with the first one starting at the beginning of the cycle as already mentioned. Because of this, there is always a gap in the occurrence of negative pulses at the end of each cycle, and this makes it possible for the first-occurring neagtive pulse to always be recognized as such and thereby establish, at each controller location, the system zero time.

Numerous coding methods may, of course, be used whereby the number of negative pulses transmitted may represent the desired offset and cycle split controls for the various controller locations. It should be considered that the particular system used here is merely representative of the large number of possible systems which can be used and that the invention is not intended in any way to be limited to the specific organization illustrated. One practical scheme, and the one illustrated here, is for the decimal representation of the number of negative pulses transmitted to represent, by its units digit, the desired cycle split and by its tens digit, the desired offset control. To illustrate, if 43 consecutive negative pulses are transmitted, each interspersed between a pair of positive counting pulses, and with the first occurring at the beginning of the cycle, these negative pulses, upon being counted at each controller location, will indicate that the No. 4 offset and the No. 3 cycle split are to be selected at each controller location. At any specific controller location, the circuit connections may be so arranged that the No. 4 offset will represent a particular offset count and may establish, for example, that local time zero at that controller location shall start upon the occurrence of the 71st positive counting pulse. At the same time, at some other controller location, offset No. 4 when thus selected may establish local time zero as coinciding with the reception of the 14th positive counting pulse. Similarly, the reception of the No. 3 cycle split command may be effective to select any predetermined value of cycle split at any controller location.

In the example illustrated in FIGS. 8 through 11, the size of the group of negative pulses is limited to a maximum of 89 pulses so that there will always be a sufficient gap between the successive groups of negative pulses to ensure that the first will always be recognized as such and thereby be able to establish the system time zero at each controller location. If a maximum of 89 negative pulses is used, this means that it is possible to transmit any of nine different offset commands, i.e., 0–8, and also any of ten different cycle split commands, i.e. 0–9. Since combination 00 cannot be used, it would be more likely to consider the possibility of only 9 cycle split commands, i.e. 1–9, although it would be possible to use units digit 0 with any tens digit other than 0. In many instances, there is no need to be able to transmit as many as ten different split commands and, where this occurs, it is possible to use only the digits 1 through 5, for example, for split commands and to use the digits 6 through 0 for various additional special circuits. To illustrate, if it is desired to transmit a command which will cause the controller to display flashing red and yellow signals for the cross street and artery, respectively, the number of negative pulses transmitted may contain the digit 6 in the units position so that the number of negative pulses may be 06, 26, or 56, etc., dependent entirely upon the particular offset control in effect and governing the particular tens digit which has been selected. Similarly, the units digit 7 may be used when it is desired to have each controller govern its respective signal to display an artery green signal for emergency vehicles while at the same time each cross street receives a red signal.

It will be apparent to one skilled in the art that various other combinations may be used. Thus, if it is necessary to transmit only three different split commands, the units digit of the number representing the negative pulses transmitted may convey not only split command information but other independent information as well. Thus, split A may be represented by any one of the units digits 1, 4 or 7; split B by units digits 2, 5 or 8; and split C by units digits 3, 6 or 9. The particular one of the three digits which is actually employed to convey the desired split command may then be selected from the available group of three in accordance with a particular speed limit command which is to be also transmitted. Thus, a speed limit sign could be controlled by each signal controller and governed so as to indicate that a 20 m.p.h. speed limit is in effect when the units digit shows 1, 2 or 3; a 30 m.p.h. speed command might be represented by units digits 4, 5 or 6; and a 40 m.p.h. speed with units digits 7, 8 or 9. With such a coding system in effect, if it were desired that split A and a 30 m.p.h. speed should be in effect, the units digit 4 would be used. Use of the units digit 7 would indicate to each controller that split A and a speed limit of 40 m.p.h. should be in effect. Similarly, use of units digit 6 would indicate split C and a speed limit of 30 m.p.h. In the specific embodiment illustrated in FIGS. 8 through 11, however, this refinement has not been illustrated in order to avoid undue complications, but it will be obvious to one skilled in the art and having a knowledge of the present invention how the illustrated embodiment might readily be modified to effect multiple controls of this sort. Merely for the purposes of simplicity in illustration, the illustrated embodiments of FIGS. 8 through 11 show the tens digit (0–8) as selecting any one of nine different available offset commands and, with respect to the units digits, they illustrate that the digits 1–5 select corresponding cycle split commands designated 1 through 5, and that the units digits 6–0 select special circuits such as the flashing signal lights previously referred to.

FIG. 8 illustrates in block form the apparatus which may be employed at the central office for transmitting both the positive and negative voltage pulses over line wires L1 and L2 to each of the controller locations. Trigger pulse generator 300 generates repetitive voltage pulses with their frequency being governed by the repetition rate control unit 301. Since a complete signal cycle comprises 100 successive pulses, and since the frequency of these pulses is governed by the repetition rate control unit 301, the time required to transmit 100 successive pulses may be made to equal the desired length of a signal cycle.

Each trigger pulse from generator 300 is applied to the positive pulse former 302 which produces a generally rectangularly shaped positive voltage pulse for each input trigger pulse and applies its output to the input of a buffer amplifier 303. The trigger pulses provided by generator 300 are also applied to a decade counter 304 which comprises both a units counter 305 and a tens counter 306, which may both be polycathode decade counting tubes similar to the two tubes used in both the local and offset counters shown in FIG. 2. For simplicity in the illustration, the amplifier and delay circuit which are provided between the units and tens counting tubes have been omitted from block diagram of FIG. 8.

Since both counters 305 and 306 are capable of counting up to ten, the combination of them is capable of counting to one hundred of the trigger pulses provided by generator 300. Each time the counter 304 reaches an initial counting position such as its 00 count, gating voltages appear on both wires 307 and 308, and in response thereto the "And" gate 309 produces a positive voltage on its output wire 310. In response to the occurrence of this positive voltage on wire 310, flip-flop 311 is operated from its normal condition to an abnormal state, remaining in such abnormal state until reset to the normal condition by an external signal. For convenience, the normal state of flip-flop 311 may be termed its "0" state, and the abnormal state may be termed the "1" state. To summarize, the flip-flop 311 is operated from the 0 condition to the 1 condition at the instant that counter 304 reaches its 00 count.

As soon as the flip-flop 311 has been actuated to its 1 state, it provides a gating input to the negative pulse former 312. The negative pulse former also receives trigger voltage pulses from delay unit 313 which receives an input from the trigger pulse generator 300. Thus, each trigger pulse provided by generator 300 initiates a timing action by delay unit 313 which, after a predetermined and fixed time interval, produces an input pulse to the negative pulse former 312, causing such pulse former to produce a negative voltage pulse which will be applied to the buffer amplifier 303. However, the negative pulse former 312 can produce such negative pulses only when it has been properly gated by flip-flop 311 and it receives this gating input only when flip-flop 311 is in its 1 condition. Accordingly, throughout the interval that flip-flop 311 is in its 1 condition, the negative pulse former will produce one negative-going voltage pulse for each trigger pulse provided by generator 300, and the delay unit 313 will delay each negative pulse so generated by a sufficient amount to cause it to be properly interspersed between the last-occurring and the next-occurring positive pulses provided by positive pulse former 302.

From the foregoing description, it will be apparent that each time counter 304 reaches count 00, negative-going voltage pulses will start to appear on line wires L1 and L2 and they will only cease when the flip-flop 311 has been restored to its 0 condition so as to remove the gating voltage input which has been applied to the negative pulse former 312.

Restoration of flip-flop 311 is produced by a reset pulse appearing on wire 318 which connects the output of "And" gate 314 to an input of flip-flop 311. Interposed between the "And" gate 314 and counter 304 is the reset count selector 315 which connects to both the units counter 305 and tens counter 306. The reset count selector 315 includes switching circuits which are manually or automatically adjustable so that connections may be made to any desired cathode of each of the units and tens counters 305 and 306. When counter 304 reaches a predetermined count, whereupon both the selected cathodes are elevated in potential, gating voltages appear both on wires 316 and 317 and, in response thereto, the "And" gate 314 provides the required resetting voltage on wire 313. To illustrate, if offset No. 5 and split No. 3 commands are to be transmitted to each controller location, the offset selector switch and the split selector switch will respectively be set to positions 5 and 3 as shown in FIG. 8, and a connection will then be made to the No. 5 cathode of the tens counter 306 and to cathode No. 3 of units counter 305. Accordingly, whenever counter 304 reaches count No. 53 so that the No. 5 and No. 3 cathodes of the respective polycathode counting tubes go positive, gating voltages appear on both wires 316 and 317. This will produce a resetting of flip-flop 311, thereby removing the gating voltage which has heretofore been provided for the input of negative pulse former 312 starting with count No. 00 and terminating the generation of negative pulses.

FIG. 9 shows in block diagram form a portion of the apparatus at a typical controller location. The complete apparatus is not shown, but only that portion thereof which is different from that shown in FIGS. 2A–2H. In both FIG. 9 and in the corresponding circuit diagram of FIG. 10, it is clearly shown how the disclosed apparatus is to be used in place of corresponding apparatus in the previously described embodiment of FIGS. 2A–2H. An understanding of the system of FIGS. 9 and 10 will be facilitated by keeping in mind that the apparatus shown there is primarily intended to respond to the pulsations of the negative pulse responsive relay NR, shown also in FIG. 2B, and to control thereby the energization of one of a plurality of offset relays and split relays which are, in FIGS. 2A–2H, instead controlled by separate communication circuits.

Relay NC of FIG. 9 is a polar type relay connected to line wires L1 and L2 in such a manner that it will pick up only in response to each negative line pulse, while being entirely non-responsive to the positive counting pulses. Relay NC controls the negative pulse decoder 320. One function of the decoder 320 is to recognize the first-occurring of the group of successive negative pulses, and in response thereto to provide a resetting control over lead 321 to the negative pulse counter 322. The first of the negative pulses to occur is intended to represent the system zero time and thus the resetting control applied over lead 321 resets the negative pulse counter 322 to its No. 00 count. If this counter 322 comprises two polycathode counting tubes of the type shown for the offset counter in FIG. 2A, the reset control will transfer the glow to the zero cathode of each counting tube.

Another function of the decoder 320 is to provide a voltage pulse on lead 323 for each negative-going pulse which actuates relay NC. Each such pulse on lead 323 is applied to the split selector counter 324 which is actually the units counting means of the negative pulse counter 322. This counter 324 counts from zero through 9, and, for each complete cycle of operation, provides one pulse to the offset selector counter 333 to advance that counter one step. The function of amplifier 325 and delay unit 326 has already been established in the preceding description of the offset counter 26 and need not be repeated here.

The offset relays F0 through F9 are operated in accordance with the count registered at any instant by the offset selector counter 333. To illustrate, once counter 322 has been reset at system time zero and then starts to count the negative line pulses, the tens counter or offset selector counter 333 will register zero throughout the time the first nine negative pulses are received and, during this time, relay F0 included in the offset relays, is picked up. From the tenth to the nineteenth negative pulse, a "1" is registered by counter 333 and relay F1 is then picked up. The count which is registered by counter 333 when system time zero is reached corresponds to the tens digit of the number of negative pulses which were received in the just completed system cycle and the corresponding F relay is then picked up.

At system zero time, the decoder 320 provides another function by producing a reset pulse on the offset reset bus 328, and this resetting pulse is applied through the contacts of whichever one of the F relays is then picked up, and through the patch cord connector 327 to the units and tens counters included in offset counter 20. Thus, if the total number of negative pulses received in a system cycle lies within the range of 10–19, inclusive, relay F1 will be picked up at the next system zero time when the resetting pulse is applied by decoder 320 to the offset reset bus 328. This resetting pulse may then be applied through contacts of relay F1 to a selected stage of the units counter 329 and to a selected stage of tens counter 330, thereby setting the offset counter 20 to a particular count and thereby also determining the offset which shall then be in effect at that controller location. If relay F2 had been picked up instead at the time of the resetting pulse because the number of negative pulses previously received had been in the range of 20 through 29, then the resetting pulse could have been applied to different stages of the units and tens counters 329 and 330, dependent upon the particular connections selected by patch cord connector 327.

Although the offset command is a function of the number of negative pulses which have been transmitted, this command need not actually be executed at any controller location immediately after the complete number of negative pulses have been received but may instead conveniently be executed at system time zero when the next series of negative pulses starts. At system time zero, a selected offset relay will be energized according to the number of negative pulses which were previously received and one can be assured that all the negative pulses have been received at that time. Moreover, since system time zero is recognized at each controller, this is the appropriate time to each offset counter so that it will have the desired phase relationship or "offset" with respect to the corresponding counter at every other controller. Consequently, at system time zero, each offset counter is checked to see that its then-existing count is that called for in accordance with the particular F relay which is then picked up. The reset pulse provided on offset reset bus 328 must of course be generated prior to the reset pulse on wire 321 in order that the offset counter be reset properly before the offset selector counter is reset. In like manner, as will now be described, the pulse on wire 332 must precede that on wire 321. This timing is all accomplished by negative pulse decoder 320.

The operation of the system with respect to the reception and execution of the cycle split command is quite different however. The selection as to which cycle split shall be in effect at a controller throughout any local cycle must be determined at local time zero (not system time zero) since it is certain that the cycle split will not occur at local time zero. As previously explained, if a change in cycle split were effected at about the time of actual occurrence of the cycle split, this could result in skipping or repeating the phase terminating pulse. On the other hand, local time zero may occur anywhere in the complete system cycle. Another complicating factor is that cycle split information is also dependent upon the number of negative pulses received and is thus accurate only from the time of complete reception of all the negative pulses and until the beginning of the next system cycle, i.e., at system time zero; at local time zero it is very possible that negative pulses are currently being received and that, obviously, the then existing count registered by negative pulse counter 322 cannot produce reliable cycle split information. To provide apparatus which will accommodate these several requirements, it is proposed by the present invention to provide storage means, typified by the split memory relays 331 of FIG. 9, which will at any instant store information as the units count occurring in the last-received group. These relays will be "follow" the count registered by units counter 324 but will instead, only at system time zero, be controlled to register the particular number of counts then registered by counter 324. More specifically, a control is provided over wire 332 to the split memory 331 to maintain in an energized condition a particular one of the split memory relays, and normally the split memory 331 will be responsive to counter 324. However, at system time zero, as detected by decoder 320, the particular split memory relay which was previously held energized will be released as a result of the control received over wire 332, and immediately thereafter, a particular one of the split memory relays will be energized dependent upon the then-existing condition of counter 324 which will, as yet, not have been reset by any control appearing on wire 321, and will thus be registering the unit count occurring in the last-received group. The then-actuated memory relay will again be held energized by a control appearing on wire 332, and the split selector counter 324 will immediately thereafter be reset by a control appearing on wire 321. From then on, until the next system zero time, the selected split relay will be held energized, and this relay will indicate the units digit of the number of negative pulses in the just-completed group and thereby indicate the split command to be in effect on the next cycle demarcated by the local counter.

At local time zero, the split command is transferred from the selected memory relay to one of the split storage relays S1–S0. Local time zero is registered by local counter 26 when it goes through its 00 count. When this occurs, a control is effective over lead 334 to the transfer circuits 335, permitting a selected one of the split storage relays to be energized, with the particular one energized depending upon which of the M relays is then energized. From then on, and until the next local time zero is demarcated by the local counter 26, the selected split storage relay is maintained energized to indicate which of the various split commands is then in effect.

The contacts of the split relays are selectively connected through path cord connector 336 to the units and tens counter stages of local counter 26. Dependent upon the specific connections made, split relay SR1 will be momentarily energized when the local counter reaches a particular count at which the cycle split is to occur. For example, if the relay S3 has been energized at local time zero, and assuming that connections are made through contacts of relay S3 and through patch cord connector 336 to the No. 4 step of the unit stage and No. 3 step of the tens stage, then when local counter 26 reaches count 34, the split relay SR will be momentarily picked up and this will then provide the desired control for the apparatus of FIGS. 2A–2H to indicate when the second phase of the cycle is to commence. For a three-phase system such as is shown in FIGS. 2A–2H, a second split relay SR2 may be employed and the proper connections made by the patch cord connector 336 so that this second split relay will pick up at a later time in the local cycle and thereby demarcate the ending of the second phase and the beginning of the third phase.

In accordance with the previously established assumption that only units digits 1 through 5 should be used for split commands and that the remaining units digits shall be used for other special commands, it is shown in FIG. 9 that special function circuits 337 may be provided and controlled as, for example, by relay S0 included in the split storage relays 338.

DETAILED CIRCUIT OF FIG. 10 AND WAVE FORM DIAGRAM OF FIG. 11

The negative pulse responsive relay NC has one terminal of its winding connected to wire L2 and the other terminal connected through a combination of relay contacts to wire L1. Normally, a circuit is completed through these contacts so that relay NC, a polar relay, can be energized and picked up in response to each negative-going voltage pulse applied to line wires L1 and L2.

At system time zero, when relay NC responds to the first-occurring negative line pulse, a circuit is completed through front contact 350 of this relay and through back contact 351 of relay K2 to energize the winding of relay K3. The winding of this relay has a resistor 352 connected in series therewith, and also the series combination of resistor 353 and capacitor 354 is connected in shunt with the winding and with resistor 352 to provide a predetermined amount of slow release time for relay K3. Consequently, when relay NC drops away, relay K3 will remain picked up for a brief interval thereafter as is illustrated at lines B and C of FIG. 11.

When relay NC first picks up, another result is the charging of capacitor 355 through front contact 356 of this relay. When relay NC drops away at the end of the first line pulse, this charged capacitor is connected through back contact 356 to the left-hand terminal of the winding of relay K2, but the pick-up circuit for this relay cannot be completed at this time because relay K3 is now picked up, thereby maintaining its back contact 357 open. However, when relay K3 does drop away and closes this back contact 357, the winding of relay K2 will be energized and this relay will then pick up as shown at line D of FIG. 11.

The slow release characteristics provided for relay K2 by reason of the series combination of capacitor 358 and resistor 359 shunting its winding, are substantially greater than that for relay K3. In fact, the slow release characteristics of relay K2 are sufficient that this relay will remain picked up in response to the repeated actuations of relay NC, each of which supplies additional energy to its winding by reason of the intermittent connection of charged capacitor 355 in series therewith. In order for relay K2 to have had the opportunity to become energized, relay K3 must have dropped away as already described. Once this happens, however, relay K3 cannot pick up again as relay NC repeatedly is actuated by the negative line pulses since relay K2 will remain picked up as just stated and this will cause back contact 351 of relay K2 to remain open so that the circuit for the winding of relay K3 remains open.

To summarize this situation with respect to these several relays, relay NC, of course, responds to each negative line pulse, relay K3 operates in response to the first-occurring of the negative line pulses only so that its actuation may be said to represent the occurrence of system time zero; and relay K2, which picks up only after relay K3 drops away, remains steadily energized as long as the negative line pulses are received and thus indicates that the full count of negative line pulses has not yet been received.

At system time zero, both the decade counting tubes 324 and 333 are in respective conditions dependent entirely upon the number of negative line pulses which were received since the last system zero time. Dependent upon the then-existing condition of tube 333, a particular one of the F relays is picked up. To illustrate, assume that tube 333 then is on its No. 0 step so that the first or No. 0 cathode is conductive. This means that the cathode will be elevated in potential so as to overcome the negative potential which ordinarily would be on that cathode as a result of the fact that each cathode of the tube is connected through a resistor such as resistor 360 to the (B—) source of potential. Each counting tube cathode is connected through a respective resistor such as resistor 361 to the control grid of a corresponding triode amplifier tube represented by the block 362. In addition to the grid electrode illustrated by the letter "g," the tube has plate and cathode electrodes represented respectively by the reference characters "p" and "k." The negative voltage which is normally present on any cathode of the counting tube normally biases the associated triode to cutoff, but when that cathode is elevated in potential, this cutoff bias is overcome and the triode then conducts plate current through the winding of the associated F relay to the (B+) terminal. Thus, under the assumed conditions wherein the first or No. 0 cathode of tube 333 is conductive, the associated triode tube 362 conducts plate current through resistor 363 and through the winding of relay F0 to the (B+) terminal.

During the course of a system cycle, i.e., from one system time zero to the next, the F relays are operated in turn. To illustrate, if 34 negative line pulses are transmitted, relays F0, F1, F2 and F3 are picked up sequentially as the series of negative line pulses are received. At the end of the series and until the next system time zero when another series of these pulses starts, tube 333 stands in the condition where its No. 3 cathode is conductive and, of the several F relays, only relay F3 is picked up.

At system time zero, it is desired that the offset counter 20 should be assured of being in a predetermined count which is dependent upon the particular offset command then in effect. The F relay which happens to be energized at system time zero indicates which of the several possible offset commands is then in effect and it is thus possible to utilize the contacts of such F relay to make connections to preselected cathodes of the units and tens counting tubes included in offset counter 20 and thereby reset the offset counter to the predetermined count.

The source of the resetting pulse for offset counter 20 is the initial actuation of relay NC as it picks up in response to the first of the series of negative line pulses. At that time, relay K2 is still dropped away as graphically illustrated at lines B and D of FIG. 11. Therefore, when front contact 364 of relay NC closes, a circuit is completed from (B—), through back contact 365 of relay K2, front contact 364 of relay NC, to the offset reset bus 366. Assuming that from 40–49 negative pulses have been received so that relay F4 is picked up, the negative pulse is applied through diode 367, over wire 368, through front contact 369 of relay F4 to terminal 370, and from there via patch cord connector 371 to cathode No. 7 of the units counting tube 60. At the same time, the negative pulse on bus 366 is applied through diode 372, through front contact 373 of relay F4 to terminal 374, and thence via patch cord connector 375 to cathode No. 1 of the tens counting tube 63. Consequently, at system time zero, counter 20 is operated to count No. 17 if it is not already on that step.

From the description already given and by an examination of FIG. 10 which shows various other patch cord connections, it will be apparent that if a different F relay were picked up at system time zero by reason of a different number of negative counting pulses having been received since the last system time zero, the offset counter 20 would be operated to a different count so that a correspondingly different phase relationship would be established between the offset counter 20 and the system cycle as demarcated by the successive occurrences of system time zero.

It is, of course, also necessary to reset the negative pulse counter including counting tubes 324 and 326 to zero each cycle at system time zero. However, from the description just given wherein it was pointed out that the then-existing count of this counter was always checked at system time zero in order to determine which offset command was then in effect, it is obvious that a resetting of this counter to step No. 00, although occurring generally at system time zero, must actually not occur until the resetting pulse on bus 366 has been applied through the contacts of whichever F relay was then picked up and has been effective to reset the offset counter 20. This is readily accomplished by providing that the resetting of the counting tubes 324 and 333 can only occur when relay K2 picks up. By making this a condition for the resetting action, it will be assured that any necessary resetting of the offset counter 20 will already have occurred since the resetting pulse to accomplish this is provided through a back contact of relay K2, namely back contact 365. Thus, when relay K2 picks up after both relays K1 and K3 have dropped away as illustrated by lines B, C, and D of FIG. 11, capacitor 376, which has prior thereto been positively charged through back contact 377 of relay K2 and through resistor 378, now abruptly discharges through front contact 377. This discharging of capacitor 376 produces a negative voltage pulse on wire 379 which is applied through diode 380 to the No. 1 cathode of tube 324 and through diode 381 to the No. 0 cathode of tube 333. Consequently, at the end of this first negative line voltage pulse, the negative pulse counter 322 registers count No. 01, thus signifying that one negative pulse has been received.

As just described, the picking up of relay K2 at system time zero but after relay NC has released at the end of the first negative pulse, resets both counting tubes 324 and 333 to register count No. 01. Also, it will be remembered that relay K2, because of its slow release characteristics, remains picked up thereafter as long as relay NC continues to respond to the negative-going line pulses. Consequently, on each subsequent actuation of relay NC, a positive pulse appears on wire 366 as a result of the closure of a circuit from (B+), through front contact 365 of relay K2, and front contact 364 of relay NC. These positive pulses on wire 366 cannot be effective as resetting pulses to the offset counter 20 because of the blocking effect of diodes 367 and 372. However, each of these positive pulses energizes amplifier 385 which produces an amplified and inverted negative-going trigger pulse in its output circuit, thereby producing time-spaced trigger pulses on the guide electrodes of decade counting tube 324. Each negative line pulse advances tube 324 by one count and for each complete cycle of ten counts counted by tube 324, a pulse is applied from the No. 0 cathode of tube 324, through amplifier 386, to the guide electrodes of counting tube 333. The particular cathode of tube 333 which is conductive then registers the tens digits of the number of negative pulses which have been received, and tube 324 similarly registers the units digit of the number of such pulses.

Throughout the time that the negative-going line pulses are being received, relay K2 is picked up. Of course, it will be remembered that this relay K2 does not immediately pick up upon the occurrence of the first of the negative line pulses, but is delayed in picking up until relay K3 has dropped away. However, from then on, and until the negative line pulses have ceased for some time, relay K2 remains picked up and its front contact 387 remains closed so as to maintain wire 388 steadily energized. Because of this, a holding or stick circuit is completed through the winding of whichever one of the cycle split memory relays M had previously been energized. To illustrate, if relay M4 had previously been energized through a circuit whose nature will presently be described, then the energization on wire 388 causes current to flow through the winding of M4, through resistor 399, and through front contact 400 of relay M4, to ground. Once the negative line pulses have ceased so that relay NC remains dropped away, the above-described energization of wire 388 continues since, even though relay K2 then drops away and opens front contact 387, back contact 350 of relay NC is continually closed. In this manner, the particular M relay which had been energized continues to remain energized through the remainder of the system cycle.

It is certain that, at system time zero, the counting tubes 324 and 333 will accurately indicate the number of negative pulses which were received since the last system time zero and it is, therefore, desirable to check the condition of counting tube 324 at this time, prior to its being reset, and selectively energized a respective one of the split memory relays M1–M0. Before selecting one of these memory relays for energization, it is necessary to "clear" the memory by releasing whichever of the relays is then picked up. This "clearing" occurs at system time zero when relay NC picks up and relay K2 has not yet picked up. At such time, back contact 350 of relay NC is open as is also front contact 387 of relay K2. Bus 388 is then deenergized so that all of the M relays must be deenergized. When relay K3 picks up and closes its front contact 357, the cathode of each of the triode tubes that are associated respectively with the cathodes of counting tubes 324 is grounded. Each of these tubes is represented in FIG. 10A by a rectangle having diagrammatic representations for the usual grid, plate and cathode electrodes. The control grid of each triode tube is connected to a respective cathode of counting tube 324, and its plate is connected through a resistor and through the winding of a respective M relay to wire 388. Dependent upon which cathode of tube 324 is conductive, the corresponding triode tube has its grid elevated above cut-off so that the tube is prepared to conduct as soon as a circuit is completed for its cathode by the closure of front contact 357 of relay K3. No plate current flows through the associated relay coil however until relay NR falls thereby providing (B+) energy to wire 388 through back contact 350. During the interval following the fall of relay NR and before the fall of relay K3 as illustrated at B and C of FIG. 11, the proper M relay picks up. Once it makes its front a stick is established so that it no longer depends on the associated triode to be held up. When relay K3 falls no more M relays can be picked. Relay K2 then picks to maintain energy on wire 388 as relay NR continues to pulse. To illustrate, if tube 324 has its cathode No. 4 conductive at system time zero, tube 404 becomes conductive as soon as front contact 357 of relay K3 closes and grounds the cathodes of all such triodes. When relay NR first is released the plate current of tube 404 energizes relay M4 which is thereafter maintained energized through its own closed contact 400 as long as wire 388 is energized.

In FIG. 11, it is graphically illustrated at line E that the split selector counter comprising counting tube 324 rests in its No. 3 step upon the occurrence of system time zero and line I shows that relay M3 is energized at system time zero when relay NC first falls in accordance with then-existing condition of counting tube 324 whereas relay M5 has previously been energized and became released when relay NC first picked.

It has previously been stated that it is expedient to put into effect at local time zero rather than system time zero the last-received cycle split command. As will be described, this is accomplished by ascertaining, at local time zero as established by local counter 26, which of the several split memory relays is then picked up. Since local time zero may occur anywhere in the system cycle and since, at such time, counting tube 324 may currently be responding to negative counting pulses, it is necessary that the M relays not be responsive to the condition of counting tube 324 after system time zero. Only in this way will the memory relays accurately reflect at local time zero what the status of counting tube 324 was at the last time of occurrence of system time zero. This is readily accomplished by providing that the cathode circuits for the plurality of tubes associated with counting tube 324, such as triode tube 401, for example, shall be completed through a front contact 357 of relay K3. As shown at line C of FIG. 11, relay K3 picks up at system time zero but drops away after the first negative line pulse is terminated and cannot thereafter pick up again until the next system time zero occurs. Therefore, after system time zero, none of the various triode tubes, such as tube 401, can possibly become conductive and none of the respective relays M1 through M0 can be energized except the one that was selected at the last system time zero. The only memory relay which will ever be energized, therefore, is the one which was selected at the last occurrence of system time zero, and it retains its energized condition steadily until the next occurrence of system time zero.

As previously stated, it is convenient to determine at local time zero just which of the various cycle split commands shall be in effect on the forthcoming cycle since at this time one can be assured that the cycle split will not occur and thus be interfered with by a change in the cycle split. A cycle split command is, as already explained, stored in the memory relays M1–M0, and it is thus necessary to scan the memory relays at local time zero and determine therefrom which cycle split command shall be in effect on the then-starting signal cycle. The occurrence of local time zero is registered by the local counter 26; when this counter reaches step No. 00, it is known that local time zero has arrived. This condition of the local counter 26 is used to control the conduction of a triode tube 405 whose plate current governs the energization of relay K4. More specifically, when the local counter reaches step No. 00, the elevation in potential at the No. 0 cathodes of both the units and tens counter tubes diagrammatically shown in FIG. 10C overcomes the normal cut-off bias for tube 405 so that it conducts a pulse of plate current through capacitor 406 which momentarily picks up relay K4. As soon as relay K4 picks up, its front contact 407 closes, thereby completing a circuit through the winding of relay K5. With relay K5 picked up, a stick or holding circuit is completed through its own front contact 408 and through back contact 409 of relay K7, and this stick circuit maintains relay K5 picks up. This operation of relays K4 and K5 is illustrated at lines K and L, respectively, of FIG. 11.

When the pulse of current through the winding of relay K4 subsides to the point where this relay drops away, a circuit is completed through the back contact 407 of relay K4, and through front contact 410 of relay K5, to energize the winding of relay K6. This latter circuit may be completed through either of two parallel paths, one of which includes front contact 411 of relay K2 and the other which includes in series back contacts 412 and 413 of relays NC and K3, respectively. Ordinarily, one or the other of these alternate circuits is completed, so that relay K6 can pick up.

The only time that neither of these circuits is completed is when the memory relays, M1–M0, are subject to being changed at system time zero. The particular interval that this can occur commences when relay NC is actuated by the first negative line pulse and opens its back contact 350 to release whichever of the M relays has theretofore been picked up. The interval ends when relay K3 drops away since, by that time, the selected M relay has been picked up as a result of the closure of front contact 357 of relay K3 and is now being held energized by the stick circuit through back contact 350 of relay NC. Thus, as soon as both relays NC and K3 are dropped away with their back contacts 412 and 413, respectively, closed, one can be assured that the M relays are not subject to immediate actuation and that it is permissible to pick up relay K6 and select the designated split storage relay.

Once relay K6 picks up to start the transfer of cycle split command from the memory relays M1–M0 to the storage relays S1–S0, relay NC is prevented from responding to the first of new group of negative pulses until the transfer is complete. This prevents system time zero from being recognized and thus also prevents any change in the M relays. This result is accomplished by including back contacts 430 and 431 of relays K6 and K7 respectively in series with the winding of relay NC so that relay NC cannot pick up until both relays K6 and K7 have been restored to their normal conditions. Relay NC will not be delayed in response to the first negative pulse in a group because relays K6 and K7 are picked up for more than a very short time in comparison with the duration of a single pulse. Therefore, the transfer can readily be effected before the end of the first negative pulse.

Normally, while relay K6 is dropped away (B+) energy is applied through back contact 414 of relay K6 to the right-hand terminal of each of the split selector relays S1–S0. As will be seen from the description that follows, this energization through back contact 414 has been maintaining energized a selected one of these relays through its own front contact, but, obviously, this circuit will now be opened at back contact 414 so that the then-picked up relay will drop away. The first action taken, therefore, with respect to the split selector relays is to ensure that all are deenergized at local time zero.

An additional effect of the picking up of relay K6 is the completion of a circuit through front contact 414 to energize the winding of relay K7. When relay K7 picks up, as indicated at line N of FIG. 11, its back contact 409 opens and this interrupts the stick circuit which has been holding relay K5 energized. Relay K5 then drops away, and this causes relay K6 to be deenergized as a result of the opening of front contact 410 of relay K5. When relay K6 drops away, the pick-up circuit for relay K7 is again broken so that relay K7 also drops away. The sequence of relay operations, however, is such that relay K7 first picks up, following which relay K5 drops away, and thereafter relay K6 drops away. Relay K7 is, however, provided with slow release characteristics by reason of the series of combination of capacitor 415 and resistor 416 shunting its winding. Therefore, there exists a brief interval after relay K6 has dropped away when relay K7 still remains picked up. At such time, energy is again applied through back contact 414 to the right-hand terminal of the winding of each of the relays S1 and S0 and, at the same time, the closure of front contact 409 of relay K7 ensures that bus 417 is grounded. Dependent upon which of the relays M1–M0 is then picked up, a circuit is completed to a corresponding relay S1–S0. Assuming, for example, that relay M4 is picked up, a circuit is then completed through front contact 418 of relay M4, through the winding of relay S4, and through back contact 414 of relay K6 to the (B+) terminal so that relay S4 is energized. As soon as this relay picks up, a stick circuit is completed through its front contact 419 to maintain it picked up until the next time that relay K6 picks up again.

Starting at local time zero, therefore, a particular one of the split storage relays is energized, dependent upon which of the M relays is energized, and retains that condition until the next occurrence of local time zero. The selected relay governs the occurrence in the local cycle of the cycle split and does this by controlling the energization of a triode tube 420 together with an associated relay SR3. The grid circuit of this tube 420 is connected through a resistor 421 to a bus 422 and, dependent upon which of the relays S1–S0 is picked up, connections are made through the corresponding front contact of that relay to selected cathodes of the tens counter tubes, respectively in local counter 26. Assuming again, for example, that relay S4 is picked up throughout the local cycle, then bus 422 is connected through front contact 423 of relay S4 to the No. 3 cathode of the tens counting tube included in counter 26. At the same time, the control tube 420 is connected through diode 424 to bus 425. With relay S4 picked up, this bus 425 is connected through front contact 426 of relay S4 to the No. 3 cathode of the units counting tube included in counter 26. Consequently, when the local counter 26 reaches its step No. 33, a positive potential is applied to both buses 422 and 425, thereby raising the grid potential of the tube 420 above its normal cut-off value so that this tube conducts. When this happens, there is a pulse of current through capacitor 427 and through the winding of relay SR3 to pick this relay up momentarily. Any selected patch cord connection may be made so that relay SR3 may be picked up upon any desired count of counter 26, with the selection being entirely dependent upon which of the split selector relays is energized.

When it is desired that there be additional cycle splits, such as in a three-phase system where two different cycle splits must be provided, an additional relay comparable to relay SR3 may be provided and corresponding connections made through additional contacts of the split selector relays to the local counter 26. Consequently, relay SR3 shown in FIG. 10C may be picked up at one time in the local cycle and the additional relay, not shown, may be momentarily picked up at some later time in the cycle to denote the beginning of the third phase. These two relays may be used to provide the functions which are otherwise provided by relays SR1 and SR2 of FIG. 2D. Relay K4 of FIG. 10 may contain an additional contact to perform the function of relay OR of FIG. 2H.

Figure 10C:
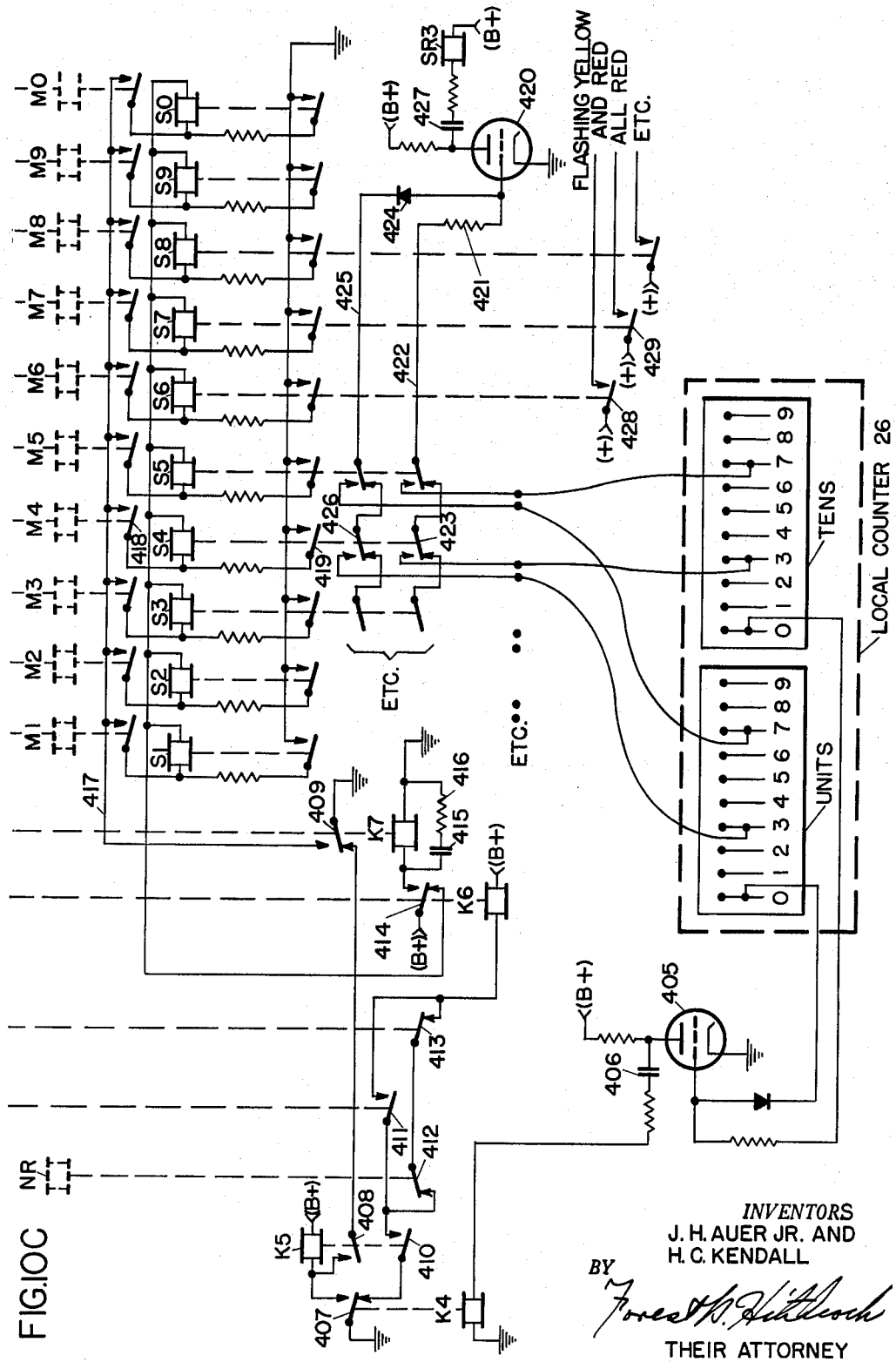

In FIG. 10C it is shown that only the first five split selector relays S1–S5 are used to provide different connections to the local counter and it is obvious from the foregoing description that any one of five different split commands may thus be executed at any controller location. If desired, the additional split selector relays S6–S0 may be used to execute special commands. If, for example, relay S6 is picked, a circuit may be completed through its front contact 428 to provide a flashing red for each of the side streets and a flashing yellow for the artery signals. Similarly, if relay S7 is picked up, a circuit may be completed through its front contact 429 to control all the signals at each intersection to display a red aspect. Additional commands may be provided for as desired, as will be obvious on one skilled in the art. It is also significant that any such command will always be executed at each intersection at a known point in the signal cycle, i.e. at local time 0. Thus the signal operation may be organized so that transition into special displays will occur smoothly and not indiscriminately.

The apparatus disclosed in FIGS. 8–10 provides for the transmission of a considerable number of offset and cycle split controls from the control office to each controller location. In many practical installations, however, it is not necessary to provide such a large capacity for transmitting different kinds of controls, and it is then possible to reduce the amount of apparatus accordingly. For example, if it is necessary to provide for only four different offsets, it is then necessary to provide only the relays F0–F3 and the other F relays shown in the drawings may then be dispensed with. Similarly, if only three different cycle split controls are desired, only three M-memory relays are required and also only three S-storage relays, thereby considerably simplifying the apparatus.

Having described an integrated traffic signal control system, we wish it to be understood that various adaptations and modifications may be made to the specific forms shown without departing in any manner from the spirit or scope of our invention.

What I claim is:

1. A system for controlling a plurality of traffic signals respectively governing traffic at spaced intersections from a control office comprising in combination, controller apparatus for the traffic signal at each of said intersections, at least one communication circuit extending between said control office and each said controller apparatus, means at said control office for transmitting over said communication circuit to each said controller apparatus successive groups of repetitive discrete signals of a predetermined number and with the successive groups demarcated by a distinctive synchronizing signal, digital counting means included within each said controller means for counting the discrete signals received from said control office and including means responsive to each said distinctive synchronizing signal for operating said counting means to a predetermined count, means for each said controller apparatus and operable to each of a plurality of different conditions for selecting the means responsive to the attainment by said counting means of a first predetermined count for governing the respective traffic signal to initiate the display of a first combination of signal indications and being also responsive to the attainment by said counting means of a different second predetermined count for governing the respective traffic signal to initiate display of a second combination of signal indications.

2. The system as defined in claim 1 wherein each of said discrete signals comprises a voltage pulse of a first predetermined polarity and each synchronizing signal comprises a voltage pulse of a second opposite polarity, means for advancing said counting means included in each controller apparatus a single count only in response to each said voltage pulse of said first polarity, and means responsive only to said voltage pulse of said opposite polarity for setting said counting means to said predetermined count.

3. The invention of claim 1 wherein said counting means is a cyclic counter having a counting capacity equalling the number of said discrete signals occurring between a successive pair of said synchronizing signals.

4. In a system for the control from a control office of a plurality of traffic signals respectively controlling traffic at a plurality of intersections the combination comprising, controller means for each intersection for controlling the signal indications sequentially displayed to the different directions of traffic, means at said control office operatively connected to each said controller means via at least one communication circuit for transmitting to each controller means successive cycles each comprising a predetermined number of discrete signals and with successive cycles being demarcated by a distinctive synchronizing signal, first digital counting means included in each controller means and being reset to a predetermined count in response to each said synchronizing signal and counting each of the discrete signals in each cycle, selector means included in each controller means for selecting the particular count to which said first counting means is to be operated upon the occurrence of said synchronizing signal, second digital counting means also responsive to said discrete signals received from said control office, counter control means governed by both said counting means for periodically ascertaining any difference in the counts instantaneously being registered by the respective counting means and acting on said second counting means to reduce the differential to zero, and signal operating means responsive to the attainment by said second counting means of respectively different counts for controlling the change of signal indications displayed by the respective traffic signal.

5. The combination defined in claim 4 wherein said counter control means varies the counting rate of said second counting means in a direction to narrow the differential between its count and that registered by said first counting means.

6. The invention of claim 4 wherein said counter control means renders said second counting means inoperative upon ascertaining that said second counting means is ahead of said first counting means by less than a predetermined amount, said counter control means restoring said second counting means to an operative condition to permit it to respond to further of said discrete signals when said first and said second counting means have been brought into synchronism.

7. The invention as defined in claim 4 and further including means at said control office and communicating with each said controller apparatus for governing said selector means to thereby adjust the count to which said first counting means is set upon the occurrence of said synchronizing signal, whereby said first counting means may be abruptly shifted in its count registration upon the occurrence of said synchronizing signal, said counter control means varying the counting rate of said second counting means upon ascertaining that a difference exists between the counts registered by said first counting means but varying the counting rate of said second counting means by only a relatively minor percentage of its normal countnig rate, whereby any abrupt shift in count registration of said second counting means is avoided.

8. The combination of claim 4 wherein each said traffic signal is cyclically operable through at least two successive phases on each of which a green signal indication is displayed to a different direction of traffic, said signal operating means operating said traffic signal to a first of its phases upon the attainment by said second counting means of a first predetermined count which is the same for each said controlled means, said signal operating means operating said traffic signal to a subsequent one of its phases upon the attainment by said second counting means of a second predetermined count which is selectively adjustable for the different controllers.

9. In a system for governing the operation of a plurality of traffic signal controllers from a control office the combination comprising, a cyclical digital counting means included in each said controller, means coupling each said controller with said control office for operating each said controller repeatedly step-by-step through successive counting cycles, means at said control office and coupled to each said controller for at times substantially simultaneously operating each said counting means to a preselected count which may be different for the respectively different counting means, whereby the said different counting means all operate at the same rate but with preselected relative phase relationships dependent upon the preselected count to which each is operated by said control office means, and means operatively connected to each counting means and being responsive to the attainment by the associated counting means of a predetermined count which is the same for each said counting means for initiating the display of a first combination of signal indication by the associated traffic signal, whereby the time progression of the initiation of said first combination of signal indications is governed by the relative phase relationships of said digital counting means for the respective controllers.

10. The combination as defined in claim 9 wherein said coupling means includes plural selection means at each said controller for selecting one of a plurality of available counts to which the respective counting means may be operated, means including a communication circuit extending between said control office and each said controlled for transmitting any one of a plurality of offset controls to each said controller, and means at each controller being differently operated by each said different offset control to select a corresponding one of said plurality of available counts.

11. The combination of claim 10 wherein said plural selection means includes an electromagnetic relay and said communication circuit includes a line wire circuit extending from said control office to each said controller to selectively actuate the respective relay associated with said controller, each said relay when operated to one condition selecting a first count to which said counting means is operated upon each said periodic interval and selecting when operated to its opposite condition a second count to which said counting means is operated upon each said periodic interval.

12. In a traffic control system having a plurality of traffic signals at respective intersections all governed from a control office the combination comprising, controller apparatus for each signal including cyclically operable digital counting means, means coupling said control office with each said controller apparatus and including means at said control office for driving the respective counting means repeatedly through successive cycles of operation with the same counting rate but with a predetermined relative phase relationship, each said controller apparatus also including signal operating means governed by said counting means and being operated to a first condition wherein the respective traffic signal displays a first combination of signal indications upon the attainment by said counting means of a first predetermined count which is substantially the same for each said controller apparatus, whereby the operation of said plurality of signal operating means to their said first conditions occurs sequentially in accordance with the relative phase relationship of said plurality of counting means, said signal operating means being also responsive to the attainment by said counting means of a second predetermined one of a plurality of different conditions for controlling the respective traffic signal to display second combination of signal indications, and cycle split selector means coupling said control office with each said controller apparatus for selecting the preselected second count upon which said counting means is to control the respective traffic signal to display said second combination of signal indications.

13. The combination of claim 12 wherein said cycle split selector means includes, plural selector means being selectively operable between respectively different conditions in each of which said cycle split selector means is differently coupled to said counting means so as to be operated at least momentarily upon the attainment by said counting means of a predetermined count corresponding to the then-existing condition of said plural selector means, and means at said control office for operating said plural selector means for all said traffic signals to a selected one of its different conditions.

14. The combination of claim 12 in which said counting means preventing a change in the coupling between said selector means and said counting means except at about the time said counting means is registering said first predetermined count.

15. In a system for the control of a plurality of traffic signals from a control office the combination comprising, controller apparatus for each traffic signal including a cyclically operable digital timing means having an input, first means operatively connecting said control office with each said controller apparatus for supplying to said input of each said timing means an input signal comprising a train of discrete pulses for operating said timing means through repetitive successive cycles of operation, second means operatively connecting said control office with each said controller apparatus for at times transmitting a resetting control to each said timing means to operate said timing means to a predetermined one of a plurality of points in said cycle timed thereby to thereby establish a preselected phase relationship for the respective timing means, third means operatively connecting said control office with each said controller apparatus for at times transmitting from said control office to each controller apparatus one of a plurality of different signals according to the particular predetermined phase relationship desired for the respecitve timing means at any given time, means associated with each said controller apparatus and differently responding to said different signals for selecting a particular one of said plurality of different points in said cycle to which said timing means is to be set in response to said re-setting control, and signal changing means coupled to said timing means and responsive to the attainment by said timing means of different preselected timing conditions for changing the signal indications displayed by the respective traffic signal.

16. The invention as set forth in claim 15 in which said means for transmitting said re-setting control includes means at said control office for at times transmitting to each said controller apparatus a series of code pulses representative of said preselected phase relationship, and decoding means for each said controller apparatus responsive to said code pulses for selecting the particular point in the cycle timed by said timing means to which said timing means is operated in response to the occurrence of said resetting control.

17. The invention as set forth in claim 15 in which said controller apparatus timing means includes first and second counters and said control office first means acts only on said first counter, means for normally operating said second counter a single step for each advance of a step by said first counter, means coupled to both said counters and periodically responsive to any count differential therebetween to slowly reduce said differential to zero, means for transmitting a plurality of different cycle split controls from said control office to each said controller apparatus, and means differently responsive to said different cycle split controls for selecting a corresponding one of a plurality of different counts of said second counter upon which said second counter operates said signal changing means.

18. The invention as defined in claim 17 in which said means for transmitting said signal split controls transmits said control in the form of a series of distinctive code pulses with successive series having a substantially greater time spacing than the time spacing between successive of said pulses and with the number of said pulses in each group determining the particular cycle split control then in effect, a counter for counting at each controller apparatus the number of pulses in each group, means responsive to the first-occurring of the pulses in each group to reset said last-named counter, memory means for storing the number of pulses in the last received group, and selector means coupled between said second counter and signal changing means for operating said signal changing means when said second counter reaches a predetermined count as determined by said selector means.

19. The invention of claim 18 in which said selector means is responsive to said memory means only when said second counter registers a count upon which it is known that operation of said signal changing means cannot occur.

20. A system for controlling from a control office the offset and cycle split of each of a plurality of traffic signal controllers comprising in combination, means including a communications circuit electrically connecting said control office with each said controller for transmitting successive groups of distinctive pulses whose decimal number represents by one of its digits which one of a number of available offsets is to be effective at each said controller and by its other digit represents which particular one of a number of available cycle splits is to be effective on each said controller, counting means for each controller including both a units and a tens counter for counting the number of said pulses in each of said groups, offset control means for each said controller governed by one of said counters, and cycle split control means for each said controller governed by the other of said counters.

21. In a system for controlling from a control office the signal cycle length, offset and cycle split of each of a plurality of signal controllers respectively governing the signal indications displayed by corresponding traffic signals, the combination comprising, a cyclically operable digital offset counter, a cyclically operable digital local counter, means including a communication circuit extending from said control office to each said controller for transmitting a continuous series of discrete signal pulses of one kind each of which normally advances both the offset and local counters of each controller one step, means including also said communication circuit for transmitting from said control office to each said controller successive groups of discrete signal pulses of another kind with each interspersed between a successive pair of said signal pulses of said one kind with their repetition rate equalling that of the signal pulses of said one kind but with a time spacing between successive groups exceeding substantially the period of said signal pulses of said another kind, means at said control office for selecting the number of signal pulses of said another kind to be transmitted in each group in accordance with a coded representation of the offset and cycle split commands to be in effect at each controller, means at each said controller reponsive to said signal pulses of said another kind only for counting the number thereof in each said group, means responsive to the first-occurring of the group of said signal pulses for resetting each offset counter to a predetermined count selected in accordance with the count representation corresponding to the desired offset control and registered by the last-named counter, means periodically responsive to any differential in the counts registered by said offset and local counters for gradually reducing said differential to zero, means responsive to the attainment by said local counter of a predetermined first count for initiating the display of a proceed indication to one direction of traffic governed by the respective signal, and means responsive to the attainment by said local counter of a preselected count determined in accordance with the count registered by said last-named counter and representing the last-received cycle split control for initiating the display of a proceed indication to a different direction of traffic governed by the respective signal.

22. The system of claim 21 wherein said control office also includes means for adjusting the repetition rate of the discrete signal pulses of both said one kind and said another kind to thereby vary the counting rate of all said counters associated with each said controller for the purpose of varying the signal cycle length.

23. In a system for controlling from a control office over a single communication circuit the signal cycle length, offset and cycle split of each of a plurality of signal controllers respectively governing the signal indications displayed by corresponping traffic signals the combination comprising, a cyclically operable timing means at each controller, first transmitting means at said control office for transmitting over said communication circuit to each said controller a first signal for operating the timing means at each said controller at the same predetermined rate at any given time, second transmitting means at said control office for also transmitting over said communication circuit to each said controller once each signal cycle a second signal which is changeable to represent a desired one of a plurality of available offsets and also a desired one of a plurality of cycle splits to be effective at each of said controllers at any given time, means at each controller separately responsive to said first and second signals, storage means at each said controller for storing said second signal, and further means at each controller responsive to said storage means for controlling the offset of the respective controller and for controlling the cycle split of the signal controlled by the respective controller.

24. The system of claim 23 wherein said second signal comprises a group of discrete code pulses, said means at each said controller which is separately responsive to said first and second signals including means controlled by the reception of said second signal for resetting said cyclically operable timing means to a particular part of its timing cycle in accordance with the particular offset then stored in said storage means.

(References on following page)

References Cited by the Examiner

UNITED STATES PATENTS

| | | | |
|---|---|---|---|
| 2,834,001 | 5/1958 | Wilcox | 340—35 |
| 3,047,838 | 7/1962 | Hendricks | 340—35 |
| 3,056,946 | 10/1962 | Brockett | 340—35 |
| 3,078,441 | 2/1963 | Jeffers | 340—31 X |
| 3,110,880 | 11/1963 | Fieser et al. | 340—35 |
| 3,119,093 | 1/1964 | Willyard | 340—40 |
| 3,175,193 | 3/1965 | Willyard et al. | 340—35 X |

NEIL C. READ, *Primary Examiner.*

R. M. ANGUS, *Assistant Examiner.*